(12) United States Patent
Sakane et al.

(10) Patent No.: US 9,112,637 B2
(45) Date of Patent: Aug. 18, 2015

(54) OPTICAL TRANSMISSION DEVICE AND METHOD

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Yuichiro Sakane, Fukuoka (JP); Koji Bato, Fukuoka (JP); Tatsuya Toyozumi, Onojo (JP); Koji Matsunaga, Munakata (JP); Wataru Kawasaki, Kawasaki (JP); Tatsuhiko Saito, Kawasaki (JP)

(73) Assignees: FUJITSU LIMITED, Kawasaki (JP); FUJITSU TELECOM NETWORKS LIMITED, Kawasaki (JP)

( * ) Notice: Subject to any disclaimer, the term of this patent is extended or adjusted under 35 U.S.C. 154(b) by 27 days.

(21) Appl. No.: 14/052,086

(22) Filed: Oct. 11, 2013

(65) Prior Publication Data
US 2014/0112661 A1    Apr. 24, 2014

(30) Foreign Application Priority Data
Oct. 19, 2012    (JP) .................... 2012-231756

(51) Int. Cl.
*H04B 17/00*    (2006.01)
*H04J 14/02*    (2006.01)

(52) U.S. Cl.
CPC ............. *H04J 14/0221* (2013.01); *H04J 14/02* (2013.01)

(58) Field of Classification Search
CPC ........... H04B 10/564; H04B 2210/072; H04Q 11/0066; H04Q 2011/0032; H04J 14/0227
USPC ........ 398/38, 45, 46, 48–51, 54, 58, 195, 197
See application file for complete search history.

(56) References Cited

U.S. PATENT DOCUMENTS

| | | | |
|---|---|---|---|
| 8,625,995 B2 * | 1/2014 | Zsigmond et al. | 398/91 |
| 2002/0027686 A1 * | 3/2002 | Wada et al. | 359/128 |
| 2004/0131046 A1 * | 7/2004 | Kim et al. | 370/351 |
| 2007/0223921 A1 * | 9/2007 | Sone et al. | 398/45 |
| 2012/0148239 A1 * | 6/2012 | Mori et al. | 398/45 |
| 2013/0058645 A1 * | 3/2013 | Saito et al. | 398/34 |

FOREIGN PATENT DOCUMENTS

| | | |
|---|---|---|
| JP | 2002-84228 | 3/2002 |
| JP | 2005-136951 | 5/2005 |

* cited by examiner

*Primary Examiner* — Dalzid Singh
(74) *Attorney, Agent, or Firm* — Staas & Halsey LLP

(57) ABSTRACT

An optical transmission device that receives a wavelength division multiplexed optical signal obtained by dividing an optical packet signal and performing wavelength multiplexing and that transmits via an optical switch the received wavelength division multiplexed optical signal includes an optical power level measurement unit configured to measure respective optical power levels of respective optical signals of wavelengths included in the wavelength division multiplexed optical signal, and a routing information determinator configured to determine routing information of the wavelength division multiplexed optical signal on the basis of the measured optical power levels.

18 Claims, 32 Drawing Sheets

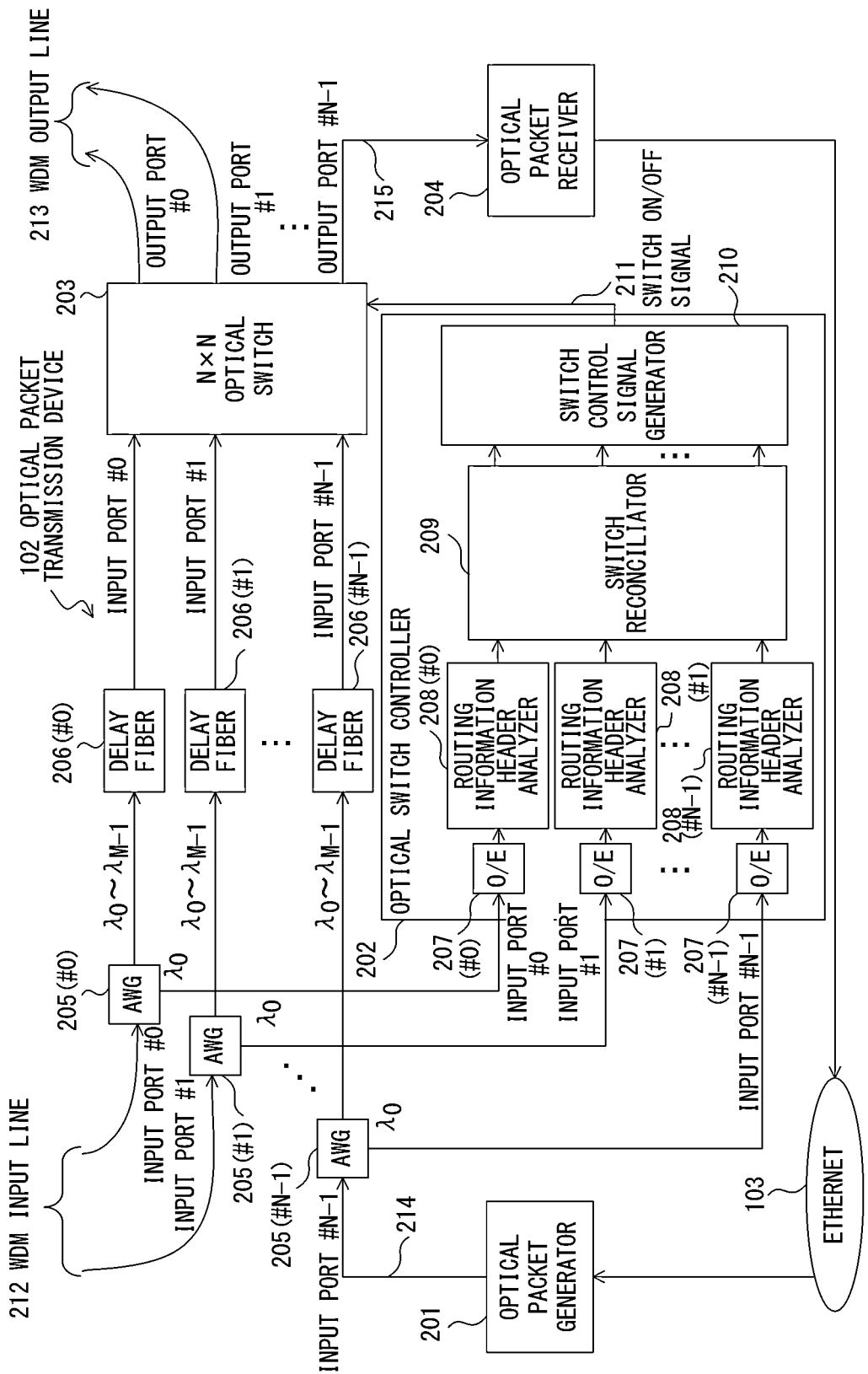
F I G. 2

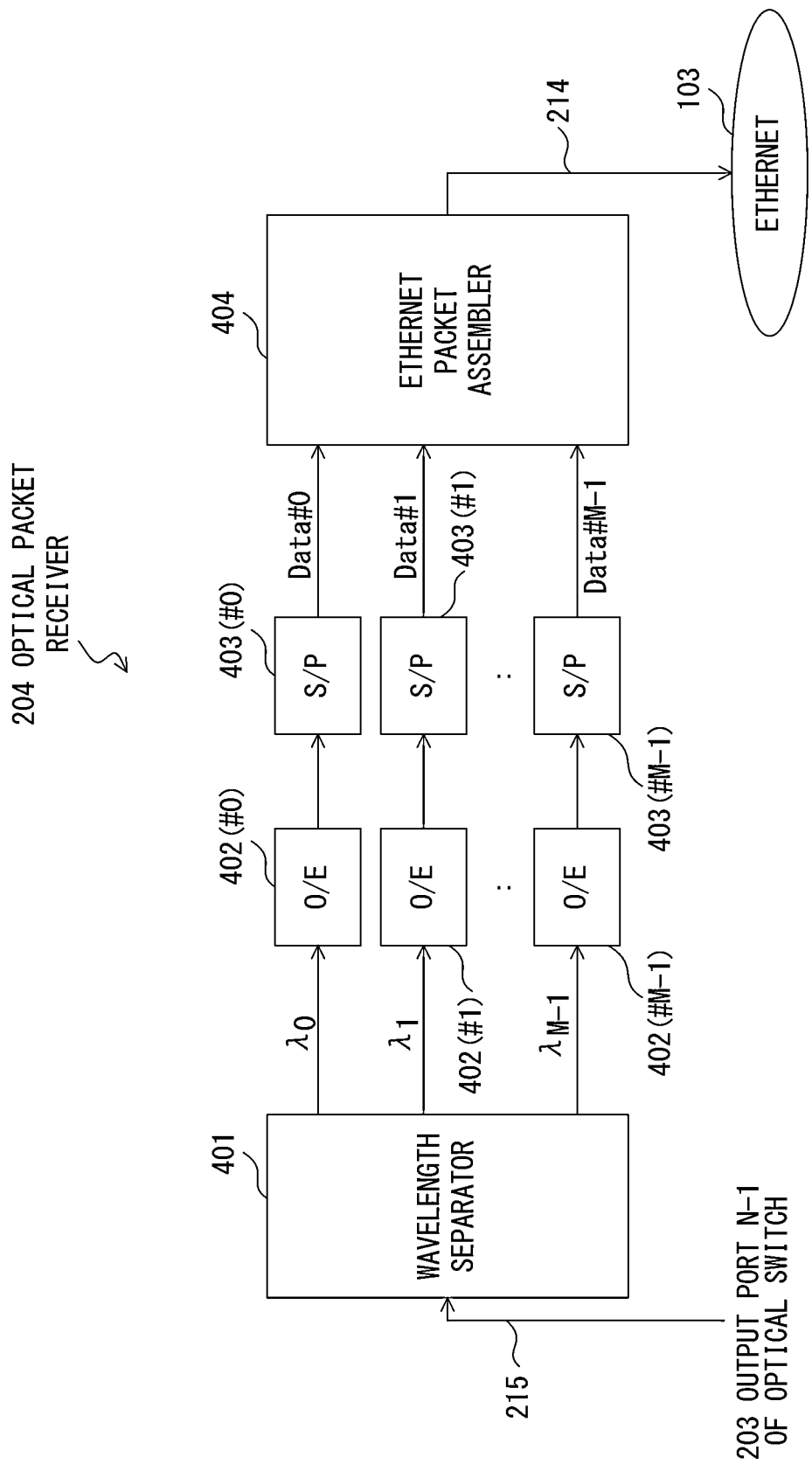
F I G. 4

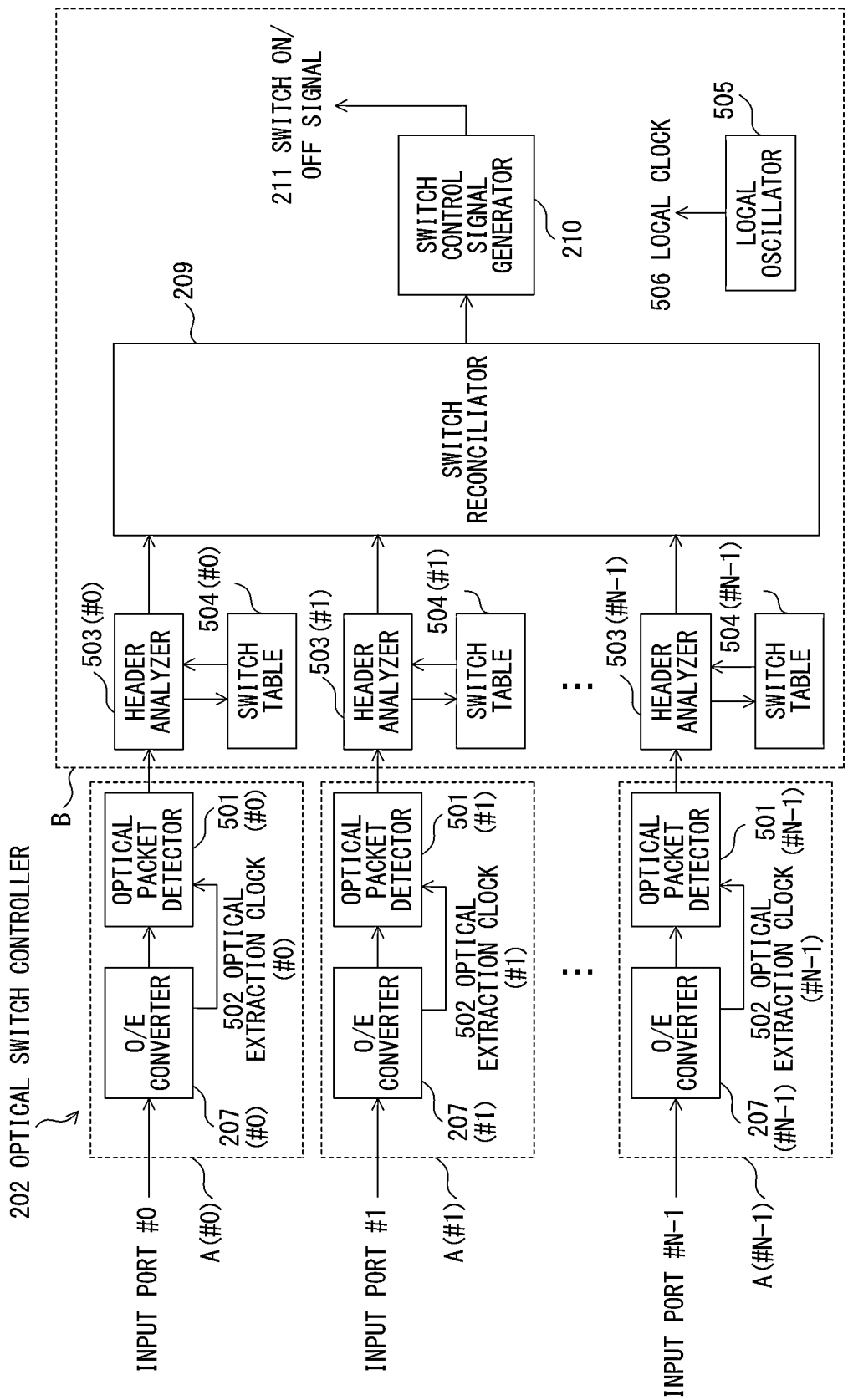
F I G. 5

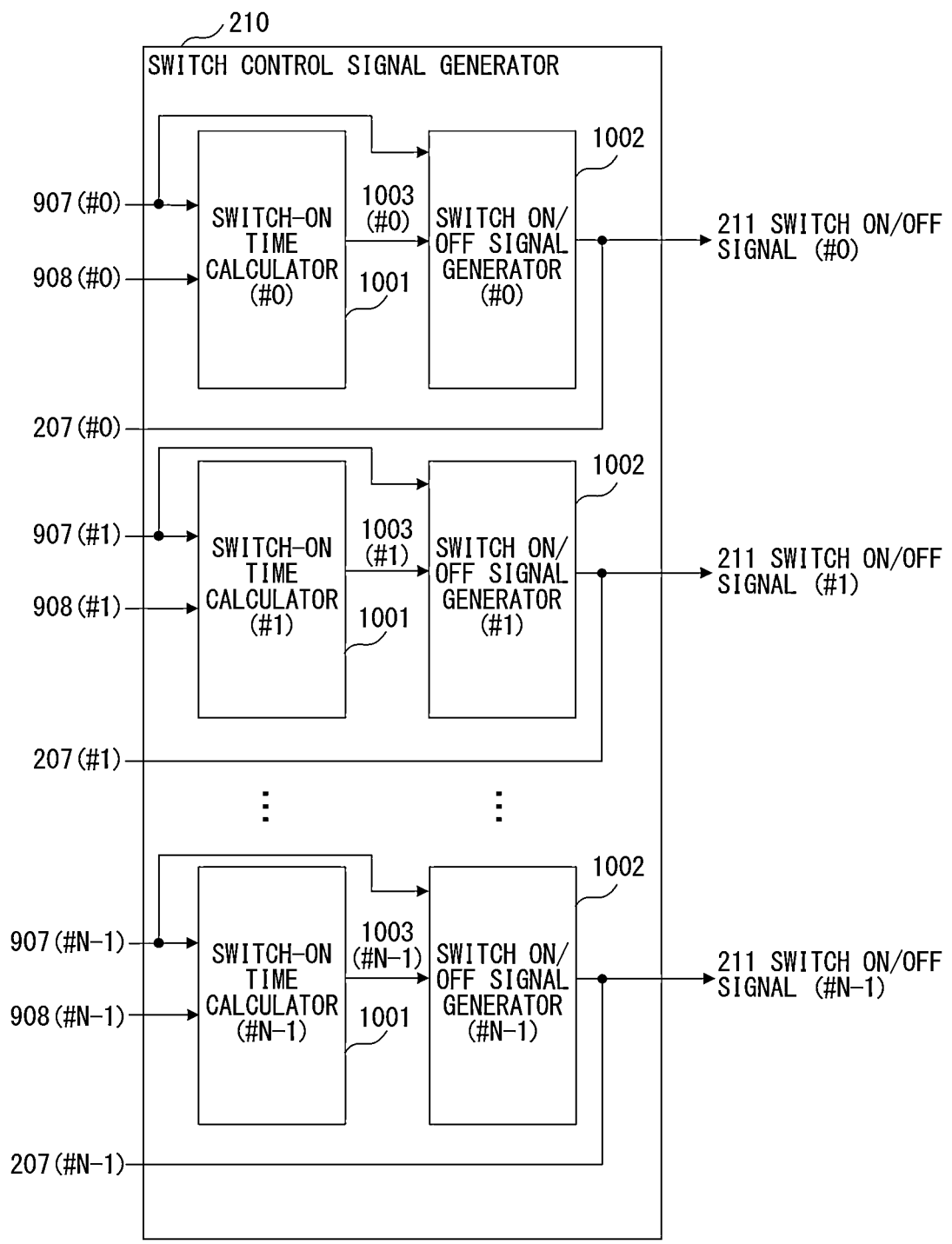
F I G. 1 0

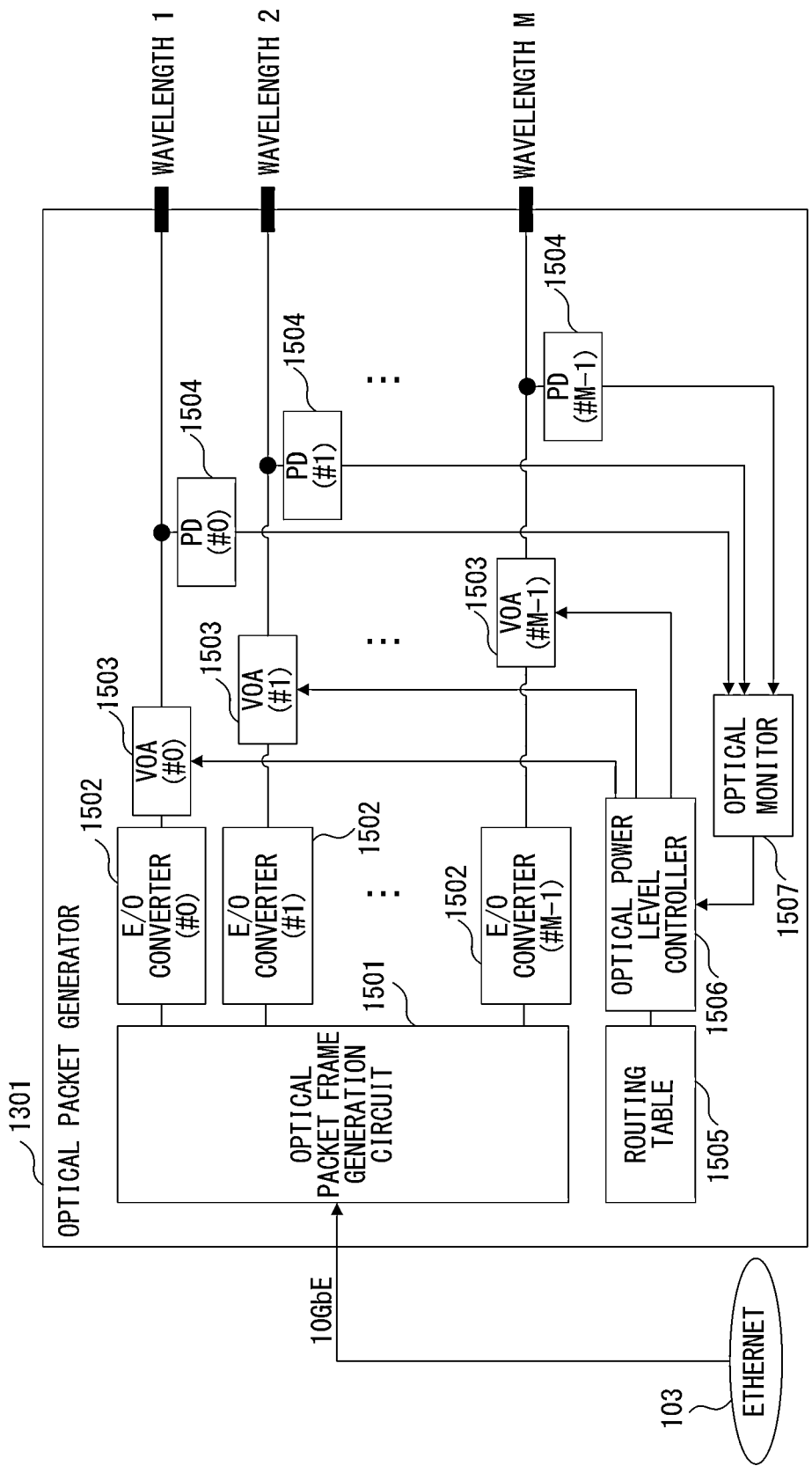
F I G. 15

| DESTINATION NODE ID | TRANSMISSION SOURCE NODE ID | OPTICAL POWER LEVEL | | | | | |
|---|---|---|---|---|---|---|---|
| | | $\lambda_0$ | $\lambda_1$ | $\lambda_2$ | $\lambda_3$ | ... | $\lambda_{M-1}$ |
| 1 | 4 | 1 | 0 | 0 | 1 | ... | 1 |
| 2 | 3 | 1 | 0 | 0 | 0 | ... | 1 |

F I G. 1 6

| DESTINATION NODE ID (Hex) | TRANSMISSION SOURCE NODE ID (Hex) | OPTICAL POWER LEVEL (WAVELENGTH) | | | | | | | | | | |
|---|---|---|---|---|---|---|---|---|---|---|---|---|
| | | $\lambda_0$ | $\lambda_1$ | $\lambda_2$ | $\lambda_3$ | ... | $\lambda_{M-7}$ | $\lambda_{M-6}$ | $\lambda_{M-5}$ | $\lambda_{M-4}$ | $\lambda_{M-3}$ | $\lambda_{M-2}$ | $\lambda_{M-1}$ |
| F0 | 11 | 1 | 0 | 1 | 0 | ... | 0 | 0 | 1 | 1 | 1 | 1 | 0 |
| ROUTING INFORMATION EXPRESSED BY POWER LEVEL DIFFERENCE | | — | 1 | 1 | 1 | ... | × | 0 | 1 | 0 | 0 | 0 | 1 |
| A3 | 2D | 1 | 0 | 0 | 1 | ... | 1 | 0 | 0 | 1 | 0 | 0 | 1 |
| ROUTING INFORMATION EXPRESSED BY POWER LEVEL DIFFERENCE | | — | 1 | 0 | 1 | ... | × | 1 | 0 | 1 | 1 | 0 | 1 |

F I G. 1 8

| DESTINATION NODE ID | SENDING DESTINATION |
|---|---|
| xxxxxxxx | PORT 1 |
| yyyyyyyy | PORT 2 |
| : | |
| zzzzzzzz | PORTS 1, 2, 3 |

FIG. 22

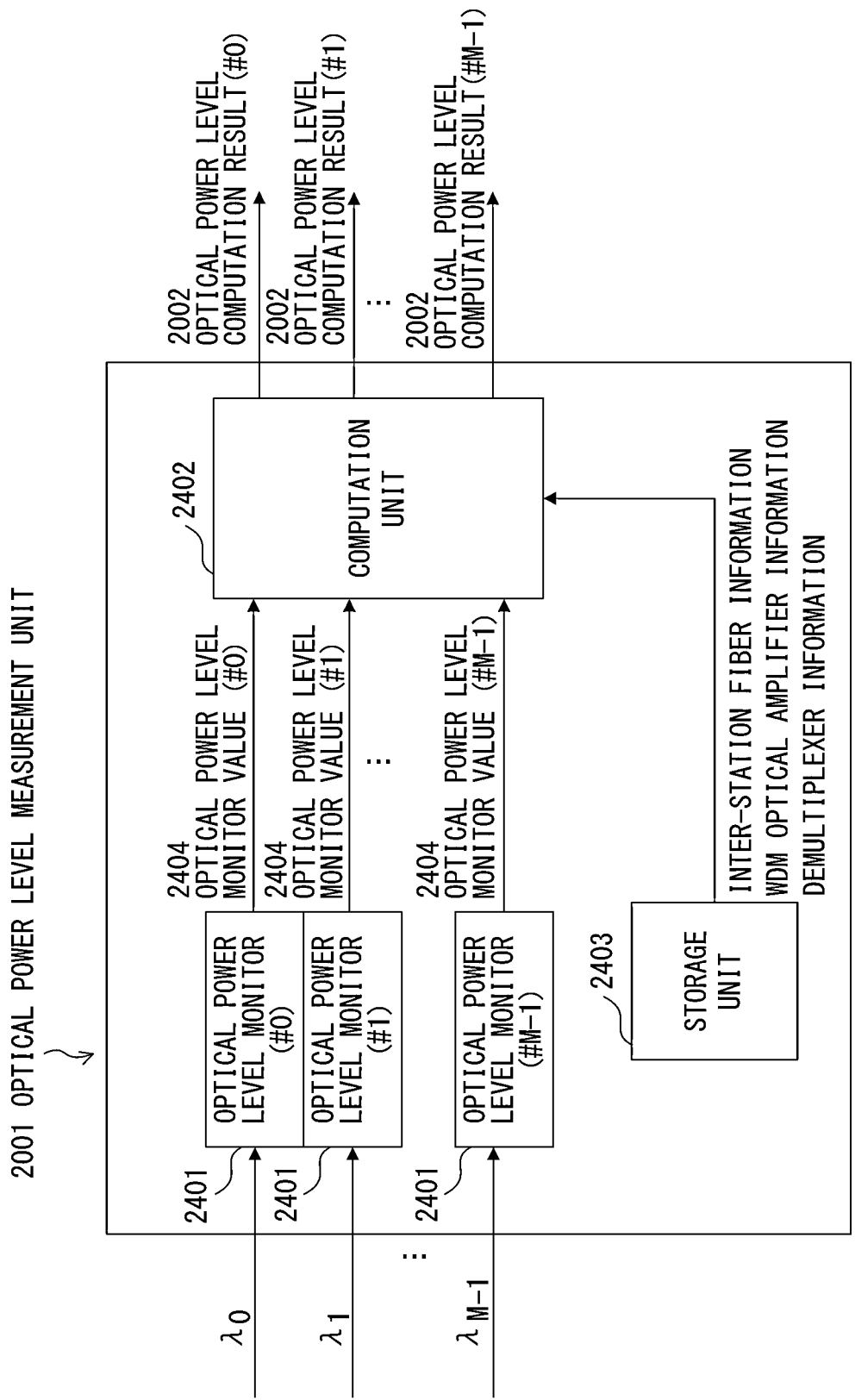
F I G. 24

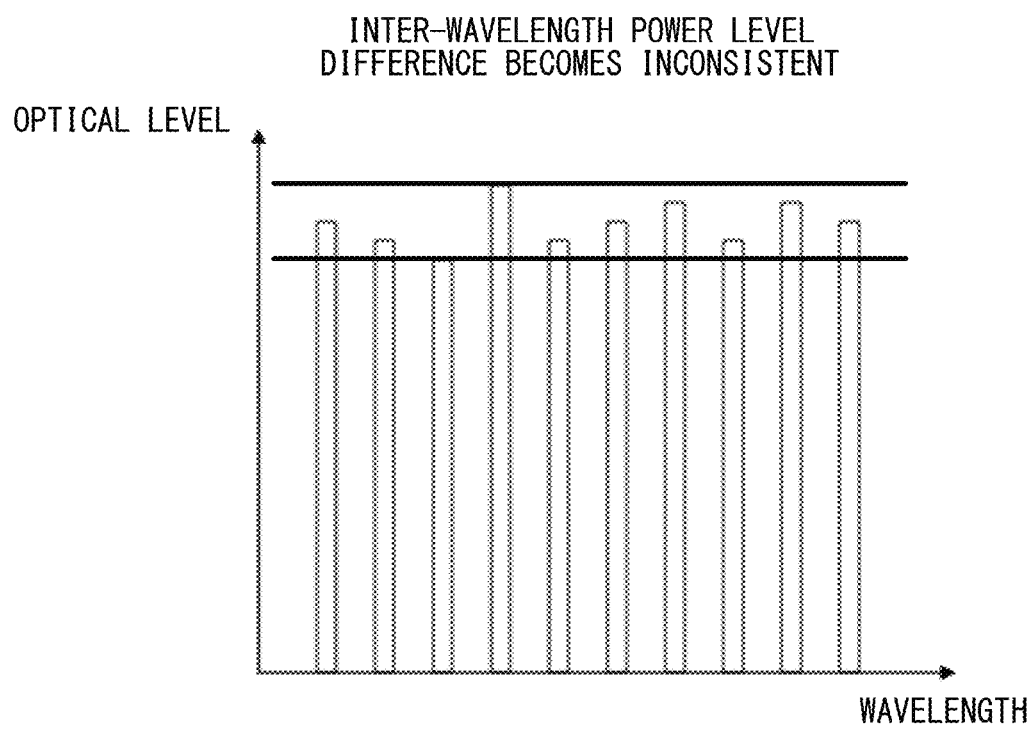
F I G. 2 5 B

OPTICAL TRANSMISSION DEVICE AND METHOD

CROSS-REFERENCE TO RELATED APPLICATION

This application is based upon and claims the benefit of priority of the prior Japanese Patent Application No. 2012-231756, filed on Oct. 19, 2012, the entire contents of which are incorporated herein by reference.

FIELD

The embodiments discussed herein are related to an optical transmission device and an optical transmission method.

BACKGROUND

In optical transmission, routing information is transmitted after being added to an optical signal. Also, in optical transmission that is practiced generally, Wavelength Division Multiplexing (WDM) is performed so that a plurality of wavelengths is transmitted in a multiplexed state. In optical transmission devices that perform this type of optical transmission, a received WDM optical signal is assigned to one of a plurality of routes (optical switching) so as to be transmitted on the basis of routing information extracted from the received WDM optical signal.

As a conventional technique, an optical packet routing device has been disclosed that includes an O/E converter that converts an optical packet into an electric signal, a header detector that detects information included in a header on the basis of the electric signal obtained by the conversion, an optical label generator that generates a corresponding optical label on the basis of information in the header, an E/O converter that converts an electric signal into an optical signal, and an optical wavelength multiplexed signal generator that combines the optical label and the optical signal so as to obtain an optical wavelength multiplexed signal (for example, Patent Document 1: Japanese Laid-open Patent Publication No. 2005-136951).

As another conventional technique, an optical packet routing task that uses optical signal data of a signal system as a multi wavelength label and that also uses this as an identifier for optical packet switching has been disclosed (for example, Patent Document 2: Japanese Laid-open Patent Publication No. 2002-84228).

Patent Document 1: Japanese Laid-open Patent Publication No. 2005-136951
Patent Document 2: Japanese Laid-open Patent Publication No. 2002-84228

SUMMARY

According to an aspect of the embodiments, an optical transmission device, which receives a wavelength division multiplexed optical signal obtained by dividing an optical packet signal and performing wavelength multiplexing and which transmits via an optical switch the received wavelength division multiplexed optical signal, includes an optical power level measurement unit configured to measure respective optical power levels of respective optical signals of wavelengths included in the wavelength division multiplexed optical signal, and a routing information determinator configured to determine routing information of the wavelength division multiplexed optical signal on the basis of the measured optical power levels.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration that is typically conceivable as the optical packet transmission device 102 illustrated in FIG. 1;

FIG. 4 illustrates an example of a configuration that is typically conceivable as an optical packet receiver 204 illustrated in FIG. 2;

FIG. 5 illustrates in detail a typically conceivable configuration of an optical switch controller 202 illustrated in FIG. 2;

FIG. 10 illustrates a configuration example of a switch control signal generator 210 in the optical switch controller 202 illustrated in FIG. 2;

FIG. 15 illustrates in more detail the configuration example of the optical packet generator 1301 illustrated in FIG. 13 according to the present embodiment;

FIG. 16 illustrates a data configuration example of a routing table 1505 illustrated in FIG. 15 (first);

FIG. 18 illustrates another data configuration example of the routing table 1505 illustrated in FIG. 15 (second);

FIG. 22 illustrates a data configuration example of a switch table 2006;

FIG. 24 illustrates a configuration example of an optical power level measurement unit 2001 illustrated in FIG. 20 according to the present embodiment;

FIG. 25A and FIG. 25B explain operations of a computation unit 2402;

DESCRIPTION OF EMBODIMENTS

Figure 1:
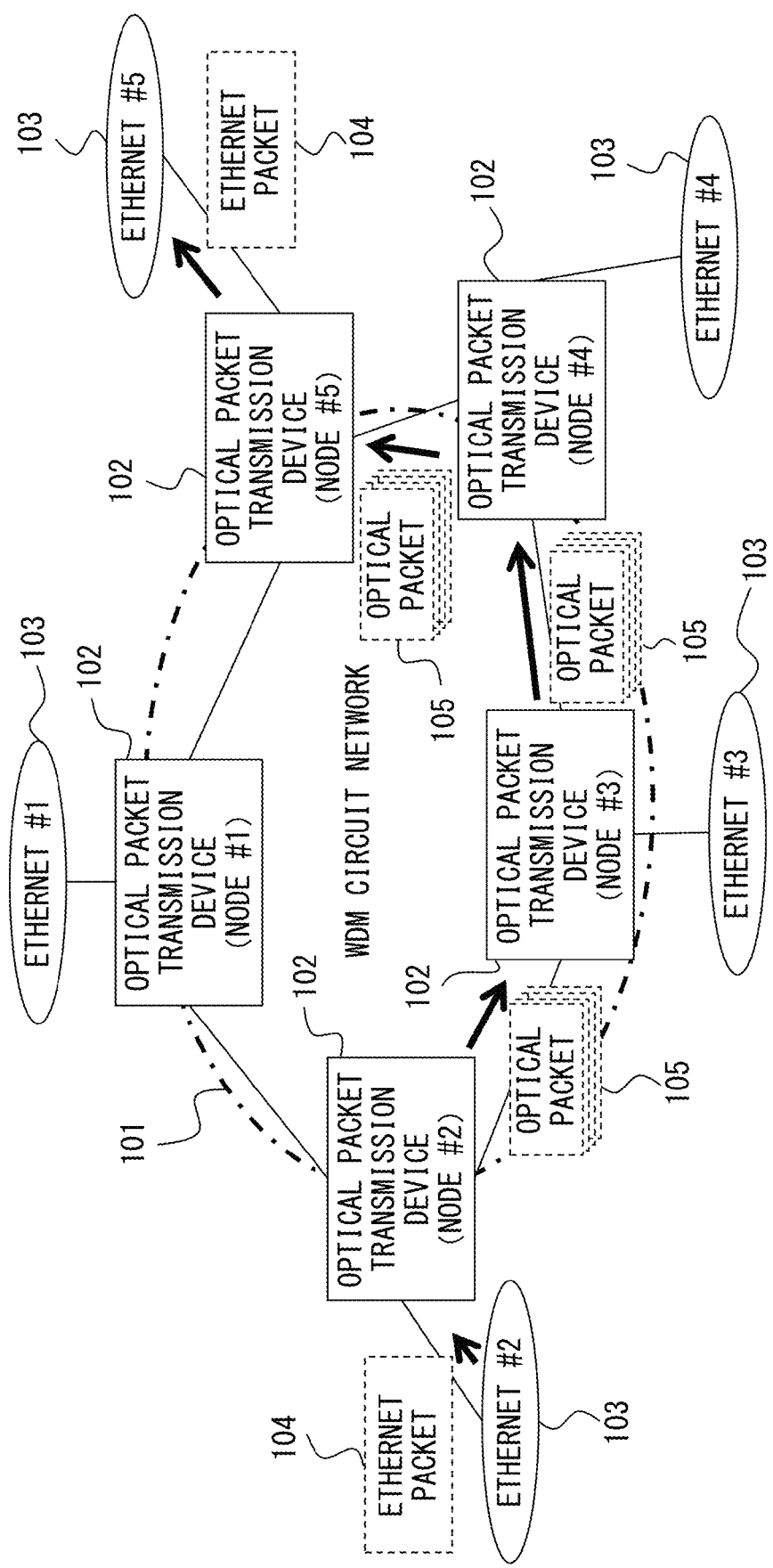
FIG. 1 illustrates a network configuration including, at its center, a WDM circuit network 101 to which an optical packet transmission device 102 of the present embodiment is to be applied.

In the above conventional examples, routing information has been obtained by analyzing headers. Accordingly, when optical switching is performed, transmission delay has occurred on the basis of a time taken to extract routing information. Further, a header including information is not always included in the first optical transmission signal among M optical signals that have been wavelength multiplexed. In other words, the conventional examples do not detect the first moment of the arrival of M optical signals. This has decreased the transmission efficiency of the line to which the M optical signals are sent out.

According to an aspect of the embodiments, it is an object to reduce transmission delay in optical switching of optical signals and to enhance the efficiency of transmitting optical signals.

Hereinafter, detailed explanations will be given for embodiments of the present invention by referring to the drawings.

FIG. 1 illustrates a network configuration including, at its center, a WDM circuit network 101 to which an optical packet transmission device 102 of the present embodiment is to be applied.

The WDM circuit network 101 has a configuration in which a plurality of optical packet transmission devices 102 exemplified by being denoted by #1 through #5 are connected through a WDM line, and constitutes, for example, a core network.

To each of, for example, the optical packet transmission devices 102 of #1 through #5, Ethernet (registered trademark) 103 for example denoted by #1 through #5 is connected as, for example, a metropolitan area network.

For example, the optical packet transmission devices 102 are disposed in a data center in an urban area, the Ethernets 103 connect the data center and companies, buildings, etc. through optical fibers, and computers such as servers, terminal devices, etc., of users and routers are connected to the Ethernets 103.

The WDM circuit network 101 connects for example data centers disposed in different urban areas.

When the optical packet transmission devices 102 function purely as relay transmission devices, the Ethernets 103 do not have to be connected to the optical packet transmission devices 102.

An Ethernet packet 104, for example, that has entered the WDM circuit network 101 from the Ethernet 103 denoted by #2 is received by the optical packet transmission device 102 denoted by #2, to which the Ethernet 103 of node #2 is connected.

The optical packet transmission device 102 of node #2 converts the Ethernet packet 104 into a WDM optical signal 105 that consists of a plurality of optical packets, and sends out the signal to, for example, the WDM line connected to the optical transmission device of node #3, as represented by a thick arrow in the FIG. 1.

In the above sending out, the optical packet transmission device 102 of node #2 includes, in the WDM optical signal 105, routing information containing respective pieces of information of "final destination information" (destination node #5 in the example of FIG. 1), "transmission source information" (node #2 of the optical packet transmission device 102 in FIG. 1), and "packet length" of the Ethernet packet 104, and thereafter sends out the WDM optical signal 105.

The optical packet transmission devices 102 of nodes #3 and #4 that have received the WDM optical signal 105 analyze the routing information header, and transfer the signal to the output ports to which the corresponding WDM lines are connected.

The optical packet transmission device 102, which is final destination node #5, analyzes the routing information header similarly to the above, and because the WDM optical signal 105 is directed to the node that includes the optical packet transmission device 102 itself, the optical packet transmission device 102 restores the original Ethernet packet 104 from the received WDM optical signal 105 and outputs the Ethernet packet 104 to the Ethernet 103 of #5, which is connected to the node that includes the optical packet transmission device 102 itself, without transferring the WDM optical signal 105 to the WDM line on the output side.

Next, explanations will be given for a typically conceivable configuration of the optical packet transmission devices 102 constituting the above WDM circuit network 101 and its problems, before explanations based on a configuration of the present embodiment are given.

FIG. 2 illustrates a configuration that is typically conceivable as the optical packet transmission device 102 illustrated in FIG. 1. This optical packet transmission device 102 roughly includes four blocks, specifically an optical packet generator 201, an optical switch controller 202, an N×N optical switch 203, and an optical packet receiver 204.

The optical packet transmission device 102 having the configuration illustrated in FIG. 2 receives a WDM optical signal consisting of a plurality of optical packets that have received WDM 105 (corresponding to the plurality of optical packets illustrated in FIG. 1) through WDM input lines 212 and 214. The WDM input lines 212 are input-side optical lines connected to another optical packet transmission device 102. The WDM input line 214 is an optical line connected to the optical packet generator 201 at the node including the optical packet transmission device 102 itself.

A plurality of wavelengths ranging from $\lambda_0$ through $\lambda_{M-1}$ have been multiplexed onto the received WDM optical signal. The optical packet of each wavelength stores data obtained by dividing, by M, the Ethernet packet 104 received from the Ethernet 103 in FIG. 1.

A routing information header storing routing information representing the route used for transmitting a WDM optical signal has been added to the head of an optical packet of specified wavelength $\lambda_0$. A routing information header includes, for example, the length of the Ethernet packet 104 (FIG. 1) transmitted by the WDM optical signal, the destination node ID representing the identification information of the destination node of the WDM optical signal, and the transmission source ID representing the identification information of the transmission source node.

The optical packet transmission device 102 receives WDM optical signals through the WDM input lines 212 and 214, and transmits the signal to a WDM output line 213 or 215 that corresponds to the routing information extracted from the WDM optical signal from among a plurality of routes. The WDM output line 213 is an output-side optical line connected to another optical packet transmission device 102. The WDM output line 215 is an optical line connected to the optical packet receiver 204 at the node including that optical packet transmission device 102.

Array Waveguide Gratings (AWGs) 205 of #0, #1, . . . , #N−1 are provided to input ports #0, #1, . . . , #N−1 of the WDM input lines 212 and 214, respectively.

Each AWG 205 separates only optical signal having wavelength $\lambda_0$ from respective WDM optical signals input through the WDM input line 212 or 214, and inputs the separated signal to the optical switch controller 202.

The optical switch controller 202 illustrated in FIG. 2 includes Optical/Electric (O/E) converters 207 and routing information header analyzers 208 of #0, #1, . . . , #N−1, a switch reconciliator 209, and a switch control signal generator 210.

Each optical signal having wavelength $\lambda_0$ separated by the respective AWGs 205 of #0, #1, . . . , #N—1 is input to the respective O/E converters 207 of #0, #1, . . . , #N−1 from respective input ports #0, #1, . . . , #N−1 of the optical switch controller 202, and is converted into an electric signal.

Respective electric signals output from the O/E converters 207 of #0, #1, . . . , #N−1 are input to the routing information header analyzers 208 of #0, #1, . . . , #N−1. The routing information header analyzers 208 extract the routing information headers from the heads of the input electric signals and analyze the routing information stored therein.

As a result of this, the routing information header analyzers 208 output destination output port numbers that specify which of the output ports of #0, #1, . . . , #N−1 of the N×N optical switch 203 is to be the output destination.

Also, the routing information header analyzers 208 output the lengths of the Ethernet packets 104 (Ethernet packet lengths) stored in the WDM optical signals input through the input ports that correspond to themselves, in accordance with the routing information headers.

The switch reconciliator 209 inputs respective pairs of a destination output port number and an Ethernet packet length from the respective routing information header analyzers 208 of #0, #1, . . . , #N−1.

For each of destination output port numbers #0, #1, . . . , #N−1, the switch reconciliator 209 executes the following process when one of the routing information header analyzers 208 has input a pair of its destination output port number and the Ethernet packet length. The switch reconciliator 209 outputs a switch execution instruction for switching the input port corresponding to the routing information header analyzer 208 that output the above pair, to the output port of the destination in the N×N optical switch 203. Also, the switch reconciliator 209 outputs the Ethernet packet length included in the above pair, as an execution packet length for executing the above switching.

For each of the destination output port numbers #0, #1, . . . , #N−1, the switch reconciliator 209 performs reconciliation so as to select one pair and selects an input port that corresponds to the pair when a plurality of pairs of the destination output port number and the Ethernet packet length thereof were input simultaneously. Thereafter, the switch reconciliator 209 outputs a switch execution instruction and an execution packet length that correspond to the selected pair and input port.

For each of the output ports #1, . . . , #N−1, the switch control signal generator 210 generates a switch ON/OFF signal 211 as described below on the basis of the above switch execution instruction and the execution packet length input from the switch reconciliator 209, and outputs the signal to the N×N optical switch 203. The switch control signal generator 210 generates the switch ON/OFF signal 211 for switching the input port specified by the above switch execution instruction to the output port of each destination during a switch-ON time that corresponds to the execution packet length.

Respective WDM optical signals obtained by multiplexing a plurality of wavelengths ranging from $\lambda_0$ through $\lambda_{M-1}$ that passed through the respective AWGs 205 of #0, #1, . . . , #N−1 on main lines of respective input ports #0, #1, . . . , #N−1 are input to respective delay fibers 206 of #0, #1, . . . , #N−1. The delay fibers 206 delay input WDM optical signals by the time that elapses before the switch ON/OFF signals 211 corresponding to those WDM optical signals start to be input from the optical switch controller 202 to the N×N optical switch 203. In other words, the delay time by the delay fibers 206 corresponds to the processing time in the optical switch controller 202.

The respective WDM optical signals output from the respective delay fibers 206 of #0, #1, . . . , #N−1 are input to respective input ports #0, #1, . . . , #N−1 of the N×N optical switch 203.

The N×N optical switch 203 includes, for example, semiconductor optical amplifiers (SOAs). More specifically, the N×N optical switch 203 includes N×N SOAs that connect output ports #0, #1, . . . , #N−1 and respective input ports #0, #1, . . . , #N−1. For each SOA, the N×N optical switch 203 performs ON/OFF control by using the switch ON/OFF signal 211 that corresponds to the input ports and output ports corresponding to the SOA output from the optical switch controller 202.

Figure 3:
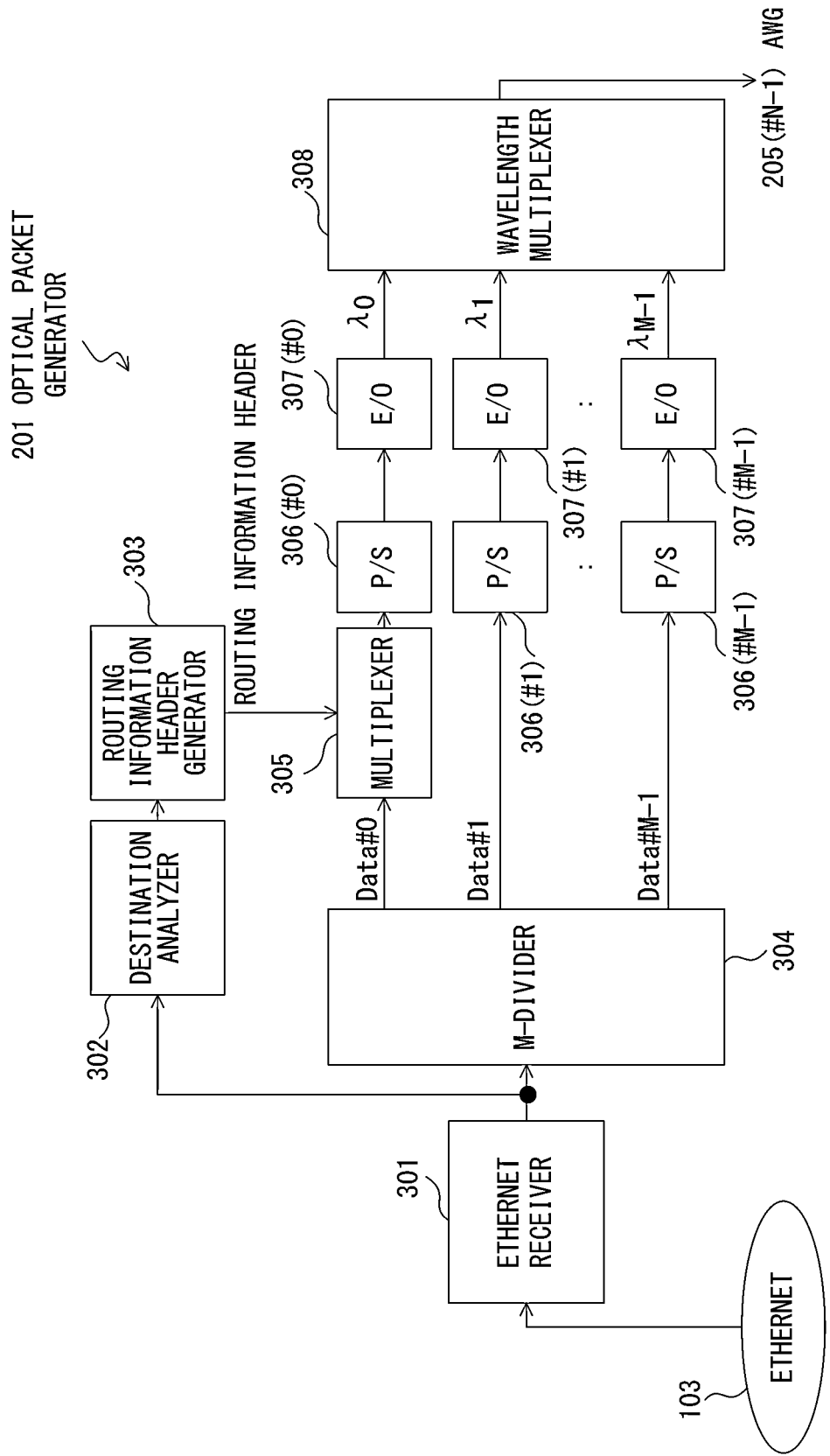
FIG. 3 illustrates an example of a configuration that is typically conceivable as an optical packet generator 201 illustrated in FIG. 2.

FIG. 3 illustrates an example of a typically conceivable configuration as the optical packet generator 201 illustrated in FIG. 2.

The Ethernet packet 104, which is an optical signal received from the Ethernet 103 (see FIG. 1), is received by an Ethernet receiver 301, and is converted into an electric signal.

This electric signal of the Ethernet packet 104 is converted by an M-divider 304 into pieces of parallel data of M electric signals of #0, #1, . . . , #M−1 (denoted by "Data #0", "Data #1", "Data #M−1", etc. in FIG. 3).

The respective parallel data of #0, #1, ..., #M−1 are input to respective parallel/serial (P/S) converters 306 of #0, #1, ..., #M−1, and are converted into respective pieces of serial data of electric signals of #0, #1, ..., #M−1.

Respective pieces of serial data of electric signals output from the P/S converters 306 of #0, #1, ..., #M−1 are input to electric/optical (E/O) converters 307 of #0, #1, ..., #M−1. The respective E/O converters 307 of #0, #1, ..., #M−1 generate respective optical packet signals having wavelengths $\lambda_0, \lambda_1, \ldots, \lambda_{M-1}$, respectively.

Respective optical packet signals having wavelengths $\lambda_0, \lambda_1, \ldots, \lambda_{M-1}$ that were output from the respective E/O converters 307 are wavelength divisions multiplexed by a wavelength multiplexer 308, and are sent out as a WDM optical signal to the AWG 205 of #N−1 through the WDM input line 214 illustrated in FIG. 2.

In this configuration, the electric signal of the Ethernet packet 104 output from the Ethernet receiver 301 is also input to a destination analyzer 302, in which the destination of the Ethernet packet 104 is analyzed.

A routing information header generator 303 generates a routing information header in accordance with the destination analyzed by the destination analyzer 302. As described above, a routing information header includes, for example, the length of the Ethernet packet 104 transmitted by a WDM optical signal output from the wavelength multiplexer 308, the destination node ID representing the identification information of the destination node of that WDM optical signal, and the transmission source node ID representing the identification information of the transmission source, which is the node itself that transmitted the packet. In the example of FIG. 1, the destination node is the optical packet transmission device 102 of node #5, and the transmission source node is the optical packet transmission device 102 of node #2.

The routing information header generated by the routing information header generator 303 is added to the head of the data of #0 by a multiplexer 305. Thereby, the routing information header of the optical signal is added to the head of the output of wavelength $\lambda_0$.

When the analysis result by one of the routing information header analyzers 208 in the optical switch controller 202 illustrated in FIG. 2 indicates that the destination node ID specified by the routing information header in a WDM optical signal received through the input port corresponding to that routing information header analyzer 208 is the node including the routing information header analyzer 208, the following control is performed. The switch control signal generator 210 in the optical switch controller 202 generates a switch ON/OFF signal 211 that makes the N×N optical switch 203 perform switching from the above input port to output port #N−1, and supplies the signal to the N×N optical switch 203.

As a result of this, the WDM optical signal received through an input port of one of the WDM input lines 212 receives switching in the N×N optical switch 203, and is input to the optical packet receiver 204 from above output port #N−1 and through the WDM output line 215.

FIG. 4 illustrates an example of a configuration of the optical packet receiver 204 illustrated in FIG. 2.

In FIG. 4, a wavelength separator 401 separates respective optical packets having wavelengths $\lambda_0, \lambda_1, \ldots, \lambda_{M-1}$ from the received WDM optical signal.

Respective O/E converters 402 of #0, #1, ..., #M−1 convert the respective optical packets having respective wavelengths $\lambda_0, \lambda_1, \ldots, \lambda_{M-1}$ output from the wavelength separator 401 into respective pieces of serial data of the electric signals of #0, #1, ..., #M−1. The O/E converter 402 perform conversion inverse to that performed by the E/O converters 307 in the optical packet generator 201 illustrated in FIG. 3.

The respective pieces of serial data of #0, #1, ..., #M−1 are input to respective serial/parallel (S/P) converters 403 of #0, #1, ..., #M−1, and are converted into respective electric signals of #0, #1, ..., #M−1.

An Ethernet packet assembler 404 assembles the original Ethernet packet 104 from the respective pieces of parallel data of #0, #1, ..., #M−1 (denoted by "Data #0", "Data #1", "Data #M−1", and so on in FIG. 3). The assembled Ethernet packet 104 is output to the Ethernet packet 104 connected to the node including the Ethernet packet assembler 404 itself.

FIG. 5 illustrates a detailed configuration of the optical switch controller 202 illustrated in FIG. 2. In FIG. 5, the O/E converters 207, the switch reconciliator 209, and the switch control signal generator 210 are the same as those illustrated in FIG. 2, and operate similarly. The optical packet detectors 501, header analyzers 503, and switch tables 504 constitute the routing information header analyzers 208 illustrated in FIG. 2. Each type of the above units exists in plural similarly to the routing information header analyzers 208, i.e., with symbols of #0, #1, ..., #N−1.

As described above, the respective optical signals of wavelength $\lambda_0$ separated by the respective AWGs 205 of #0, #1, ..., #N−1 are input to the respective O/E converters 207 of #0, #1, ..., #N−1 in FIG. 5, and are converted into electric signals.

The respective electric signals output from the respective O/E converters 207 of #0, #1, ..., #N−1 are input to the respective optical packet detectors 501 of #0, #1, ..., #N−1. The respective optical packet detectors 501 extract electric signals corresponding to the respective optical packets by synchronizing with an optical extraction clock 502 extracted in the O/E converters 207 that is connected to the optical packet detectors 501 at an earlier state, and extract routing information headers added to the heads of the signals.

The respective header analyzers 503 refer to the switch tables 504 connected to the header analyzers 503, on the basis of the destination node IDs (and transmission source node IDs) in the routing information headers extracted in the optical packet detectors 501 that are connected to the header analyzers 503, respectively. As a result of this, each of the header analyzers 503 determines the output port of the destination of the N×N optical switch 203 corresponding to the routing information header analyzed by each of the header analyzers 503, and reports the destination output port number to the switch reconciliator 209.

The operations of the switch reconciliator 209 and the switch control signal generator 210 illustrated in FIG. 5 are as described above.

In the configuration illustrated in FIG. 5, as represented by dashed-line frames A of #0, #1, ..., #N−1, the optical packet detectors 501 of #0, #1, ..., #N−1 operate in synchronization with the optical extraction clocks 502 extracted by the O/E converters 207 connected to the optical packet detectors 501, respectively, in an earlier stage.

In the meanwhile, the header analyzers 503, the switch tables 504, the switch reconciliator 209, and the switch control signal generator 210 in dashed-line frame B operate in synchronization with a local clock 506 oscillated by a local oscillator 505 in the optical switch controller 202 illustrated in FIG. 2. The reasons for this are described below.

<Reason 1>

Because optical packets are received in a bursting manner, the optical extraction clock 502 operates unstably when optical packets are not received and there are no optical inputs.

This means that it is not easy to use the optical extraction clock 502 as an operation clock for the members denoted by 503, 504, 209, and 210, which continue their operations even after the input of signals of optical packets have been terminated.

<Reason 2>

The switch reconciliator 209 performs output reconciliation of optical packets input through the respective ports of #0, #1, ..., #N−1, and thus it is needed for the switch reconciliator 209 to perform the process in synchronization with the local clock 506, which is dependent on neither of the optical extraction clocks 502 of #0, #1, ..., #N−1.

Accordingly, a series of processes from the analysis of routing information headers of optical packets to the generation of the respective switch ON/OFF signals 211 of #0, #1, ..., #N−1 are out of synchronization with the input of WDM optical signals. As a result of this, variations occur in the switch ON/OFF signals 211 for optical packets. Variation time S is one cycle time of the local clock 506 caused by the phase difference between the local clock 506 oscillated by the local oscillator 505 and the input optical packet (the oscillation frequency of 1/local clock 506).

Figure 6:
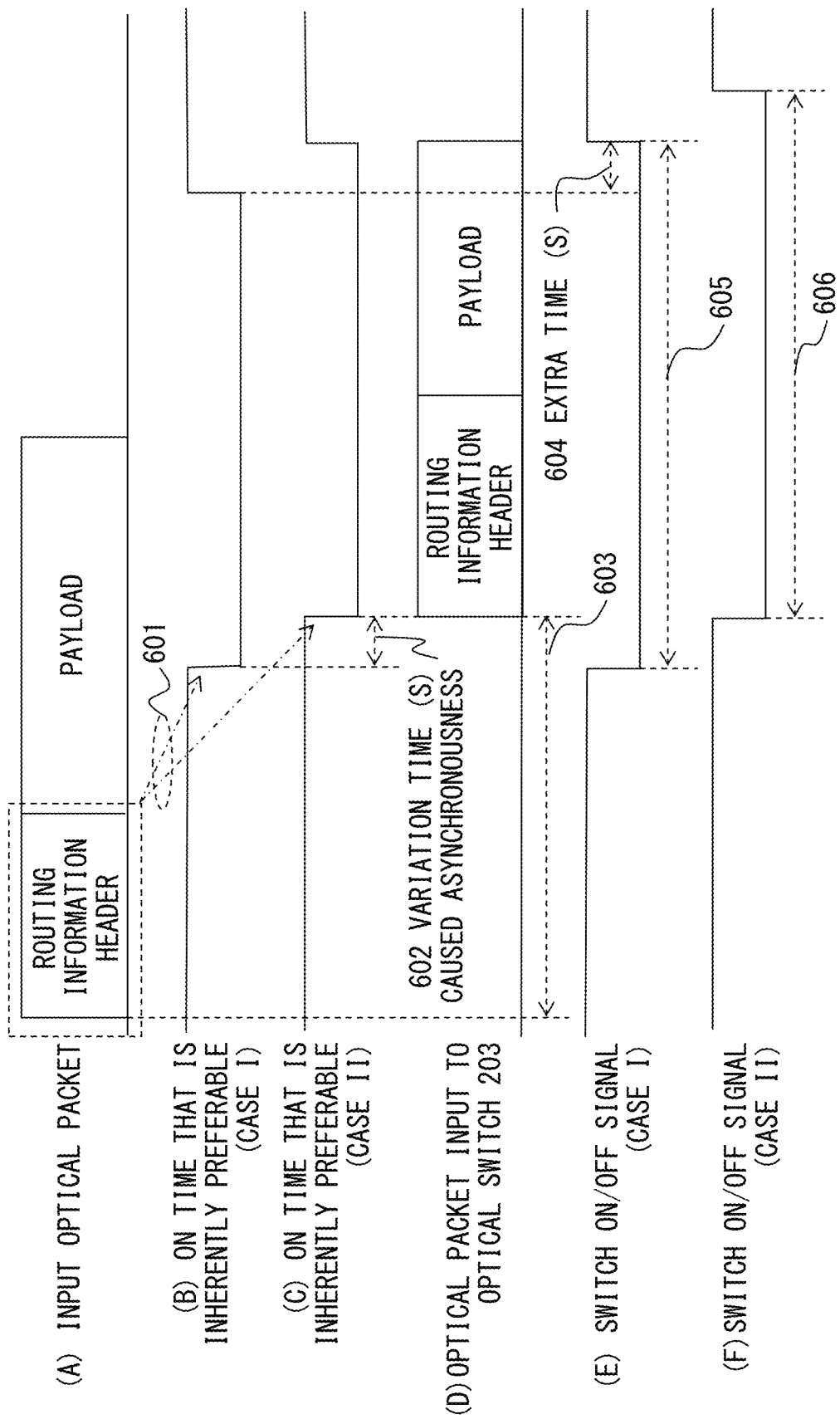
FIG. 6 depicts an influence of variation time S due to asynchronousness between an optical extraction clock 502 and a local clock 506 when routing information headers are analyzed in a typically conceivable configuration example of the optical packet generator 201 illustrated in FIG. 2.

FIG. 6 depicts an influence of variation time S caused because the optical extraction clocks 502 and the local clock 506 are out of synchronization when routing information headers are analyzed.

In FIG. 6, (A) illustrates a timing of detecting an electric signal corresponding to an input optical packet having wavelength $\lambda_0$ detected by the optical packet detectors 501 of an arbitrary input port #i (0≤i≤N−1) (FIG. 5).

In FIG. 6, (B) depicts case I, in which the inherently preferable time to turn ON the N×N optical switch 203 (ON time) is the earliest timing at which a route analysis process 601 is executed in synchronization with the local clock 506 on the electric signal of an optical packet in the portion in dashed-line frame B of FIG. 5. This corresponds to a case where the timing of starting the input of routing information headers in the electric signal of an optical packet, which is illustrated as (A) in FIG. 6, detected in the portion in dashed-line frame A of #i in FIG. 5 is identical to the timing of taking-in by the local clock 506 when the portion in dashed-line frame B takes in the electric signal.

In the meanwhile, in FIG. 6, (C) depicts case II, in which the inherently preferable time to turn ON the N×N optical switch 203 is the latest timing when the route analysis process 601 is executed, in synchronization with the local clock 506, on the electric signal of an optical packet in the portion in dashed-line frame B of FIG. 5. This corresponds to a case where the timing of taking-in by the local clock 506 is slightly earlier than the timing of starting the input of routing information headers, which is illustrated as (A) in FIG. 6, and the routing information headers are taken in at the next taking-in timing of the local clock 506 so that the route analysis process 601 was executed.

A maximum shifting amount 602 (variation time caused by asynchronousness) between cases I and II in (A) and (B) of FIG. 6 is approximately one cycle time S of the local clock 506 in accordance with the above discussion.

It is assumed in case II that optical packets input to the N×N optical switch 203 are delayed, as illustrated as (D) in FIG. 6, by "time 603=(processing time in dashed-line frame B in FIG. 5)+(variation time 602 caused by asynchronousness)" in the delay fibers 206.

In case I, when the N×N optical switch 203 is to perform switching on the optical packets delayed, as illustrated as (D) in FIG. 6, the switch ON/OFF signals 211 is preferable to be kept in an ON state for the timing of the end of the ON time in case II of (C) of FIG. 6 and by an extra time 604 in the backward direction. The extra time 604 in this example corresponds to the above variation time S caused by asynchronousness.

It is not known whether the switch ON/OFF signal 211 is generated in case I or case II, and accordingly an ON time 605 based on the assumption of case I is treated as the time during which the switch ON/OFF signal 211 is kept in an ON state. As a result of this, when this preferable time is applied to case II, an ON time 606 illustrated in (F) of FIG. 6 is treated as the time during which the switch ON/OFF signal 211 is kept in an ON state.

As described above, in the typically conceivable configuration of the optical packet transmission device 102 illustrated in FIG. 2 through FIG. 5, variation time S caused because the optical extraction clock 502 and the local clock 506 are out of synchronization during the analysis of routing information headers is problematic. Specifically, the ON time of the switch ON/OFF signal 211 is extended by the length of the above variation time S, delaying the timing of optical switching by the N×N optical switch 203, and resulting in the problem wherein the efficiency of the transmission of optical signals decreases.

As described by referring to FIG. 3, the optical packet generator 201 illustrated in FIG. 2 divides the Ethernet packet 104 into M pieces of data of #0, #1, ..., #M−1, and each of the pieces is independently converted into an optical packet by the P/S converters 306 and the E/O converters 307. This causes temporal variations (T time) between respective optical packets having wavelengths $\lambda_0, \lambda_1, \ldots, \lambda_{M-1}$. Differences or the like generated in the parallel/serial conversion by the P/S converters 306 and the process time when electric/optical conversion is performed by the E/O converters 307 (variations in processing times by devices) causes shifts in phase of the respective generated optical packets having the wavelengths of $\lambda_0, \lambda_1, \ldots, \lambda_{M-1}$.

Figure 7:
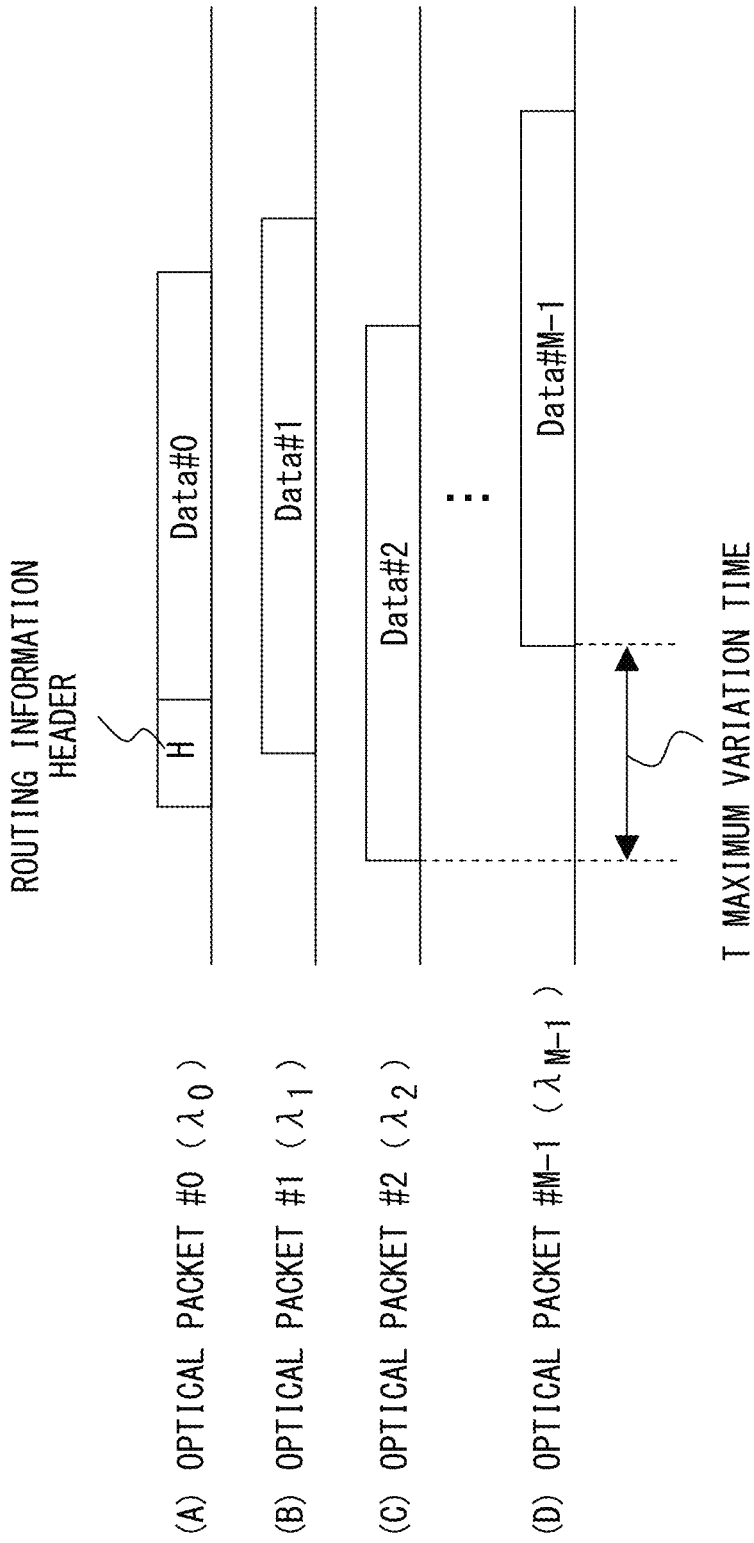
FIG. 7 explains an influence of temporal variations between optical packets that received wavelength division multiplexing in the typically conceivable configuration example of the optical packet generator 201 illustrated in FIG. 2 (first)

FIG. 7 explains an influence of temporal variations between optical packets that received wavelength division multiplexing (first).

In the example of FIG. 7, among respective optical packets of #0, #1, ..., #M−1, having wavelengths $\lambda_0, \lambda_1, \ldots, \lambda_{M-1}$, the optical packet with wavelength $\lambda_2$ having divisional data Data#2 illustrated as (C) in FIG. 7 was received first, and the optical packet of wavelength $\lambda_0$ having a routing information header H and divisional data Data#0 illustrated as (A) in FIG. 7 is received next. Next, the optical packet of wavelength $\lambda_1$ having divisional data Data#1 illustrated as (B) in FIG. 7 is received. The last packet to be received is, for example, the optical packet of wavelength $\lambda_{M-1}$ having divisional data Data#M−1 illustrated as (D) in FIG. 7.

In such a case, the phase difference between the optical packet of #2, illustrated as (C) in FIG. 7, which was received first, and the optical packet of #M−1, illustrated as (D) in FIG. 7, which was received last is treated as maximum variation time T.

The optical switch controller 202 illustrated in FIG. 2 inputs only the optical packet of wavelength $\lambda_0$, analyzes the routing information header included in the packet, and generates the switch ON/OFF signal 211 that makes the N×N optical switch 203 perform switching. Originally, the switch ON/OFF signal 211 may be turned ON in accordance with the length of an optical packet (time), which is referred to as optical packet length L. Optical packet length L is the sum of the length of the routing information header and the payload, which is the stored data in a divided state.

However, as described in FIG. 7, there is a possibility that the respective optical packets of #1 through #M−1 of other wavelengths $\lambda_1$ through $\lambda_{M-1}$ are at positions that are shifted by the maximum variation time T from the optical packet of wavelength $\lambda_0$, it is preferable that switch ON/OFF signal 211 is kept in an ON state for a time that is longer by the length of T time.

Also, it is not known what position optical packet #0 of wavelength $\lambda_0$ exists at in the entire optical packet, and accordingly it is preferable that the switch ON/OFF signal 211 is kept in an ON state for a time that is further longer by the length of T time.

Figure 8:
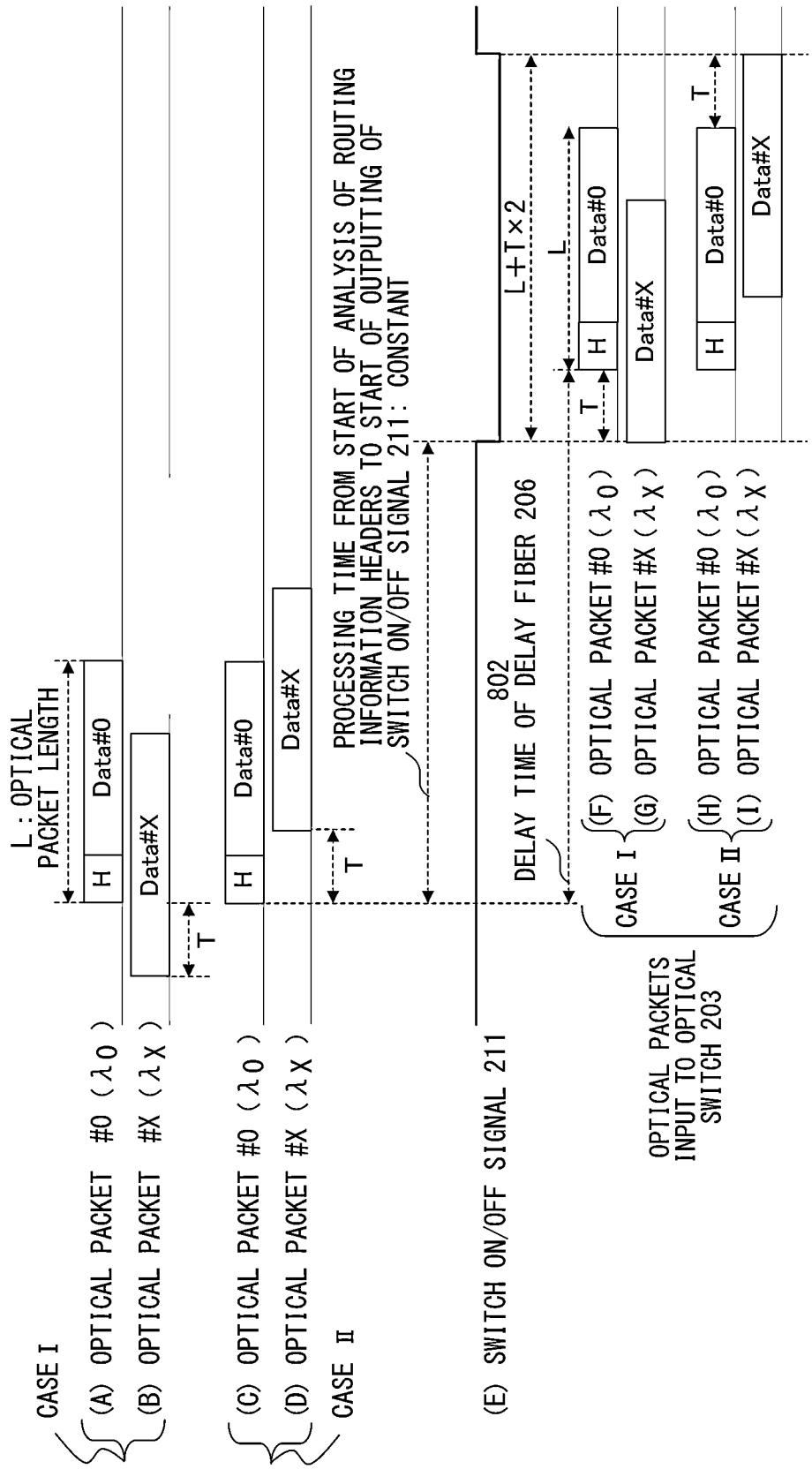
FIG. 8 explains an influence of temporal variations between optical packets that received wavelength division multiplexing in the typically conceivable configuration example of the optical packet generator 201 illustrated in FIG. 2 (second)

FIG. 8 explains an influence of temporal variations between optical packets that received wavelength division multiplexing (second).

The processing time from the start of the analysis of routing information headers in the optical switch controller 202 illustrated in FIG. 2 to the start of outputting of the switch ON/OFF signal 211 is a consistent time denoted by 801 in FIG. 8.

In FIG. 8, (A) depicts a case where the optical packet #0 of wavelength $\lambda_0$ storing the routing information header H and divisional data Data#0 is received latest in case I. In such a case, as illustrated as (B) in FIG. 8, the optical packet received first is treated as optical packet #X ($1 \leq X \leq M-1$) of $\lambda_x$ that stores divisional data Data#X.

In case I, optical packet #X is received earlier than optical packet #0 by maximum variation time T. Accordingly, as illustrated as (F) and (G) in FIG. 8, the time at which optical packet #X of wavelength $\lambda_x$ is input to the N×N optical switch 203 from the delay fiber 206 is earlier, by maximum variation time T, than the time at which optical packet #X of wavelength $\lambda_x$ is input.

Accordingly, it is preferable to turn on the switch ON/OFF signal 211 earlier, by maximum variation time T, than the time at which optical packet #0 of wavelength $\lambda_0$ is input to the N×N optical switch 203 from the delay fiber 206.

Then, time obtained by adding maximum variation time T to the fixed processing time 801 in the optical switch controller 202 is treated as a delay time in the delay fiber 206. Also, the optical switch controller 202 turns on the switch ON/OFF signal 211 immediately after the fixed processing time 801 has elapsed.

As a result of this, the switch ON/OFF signal 211 illustrated as (E) in FIG. 8 is turned on earlier, by maximum variation time T, than the time at which optical packet #0 of wavelength $\lambda_0$ is input from the delay fiber 206 to the N×N optical switch 203, which is represented as (F) and (G) in FIG. 8. Thereby, in case I, where optical packet #0 of wavelength $\lambda_0$ is received latest, the time at which the switch ON/OFF signal 211 is turned on is adjusted to the time at which optical packet #X of wavelength $\lambda_x$ is input from the delay fiber 206 to the N×N optical switch 203.

Also, as a time length during which the switch ON/OFF signal 211 is kept in an ON state in case I, at minimum a time that correspond to "(maximum variation time T)+(optical packet length L of optical packet #0 of wavelength $\lambda_0$)" is preferable after the switch ON/OFF signal 211 is turned on.

In the meanwhile, in FIG. 8, (C) depicts a case where the optical packet #0 of wavelength $\lambda_0$ is received earliest in case II. In such a case, as illustrated as (D) in FIG. 8, the optical packet received latest is treated as optical packet #X ($1 \leq X \leq M-1$) of $\lambda_x$ that stores divisional data Data#X.

In case II, optical packet #X is received later than optical packet #0 by maximum variation time T. Accordingly, as illustrated as (H) and (I) in FIG. 8, optical packet #X of wavelength $\lambda_x$ is input from the delay fiber 206 to the N×N optical switch 203 later by maximum variation time T than the timing when optical packet #0 of wavelength $\lambda_0$ is input.

Thereby, as a time length during which the switch ON/OFF signal 211 is kept in an ON state in case II, at minimum a time that corresponds to "(optical packet length L of optical packet #0 of wavelength $\lambda_0$)+(maximum variation time T)" is preferable. In other words, the optical switch controller 202 keeps the switch ON/OFF signal 211 depicted in FIG. 8E turned off until a time later by maximum variation time T than the time at which optical packet #0 of wavelength $\lambda_0$ has passed through the N×N optical switch 203 completely. Thereby, in case II, where optical packet #0 of wavelength $\lambda_0$ is received earliest, the time at which the switch ON/OFF signal 211 is turned off is adjusted to the time at which optical packet #X of wavelength $\lambda_x$ that was received latest passes through the N×N optical switch 203 completely.

Considering cases I and II above, a period of time obtained by adding maximum variation time T to the fixed processing time 801 in the optical switch controller 202 is treated as the delay time in the delay fiber 206 as illustrated as (E) through (I) in FIG. 8. In the meanwhile, the optical switch controller 202 turns on the switch ON/OFF signal 211 immediately after the fixed processing time 801 has elapsed, and keeps the signal in an ON state during the time length of "(optical packet length L of optical packet #0 of wavelength $\lambda_0$)+(maximum variation time T)×2".

As described above, the typically conceivable configuration of the optical packet transmission device 102 illustrated in FIG. 2 through FIG. 5 needs, as a time during which the N×N optical switch 203 is kept in an ON state, an extra period of time of "(maximum variation time T)×2" in addition to optical packet length L. These factors cause a problem wherein the switching of the N×N optical switch 203 is delayed and the efficiency of transmitting optical signals decreases.

As described above, in the typically conceivable configuration of the optical packet transmission device 102 illustrated in FIG. 2 through FIG. 5, the following problems are caused in relation to the switch ON/OFF signal 211 and the delay fiber 206. First, the optical extraction clock 502 and the local clock 506 are in asynchronousness when routing information headers are analyzed, extending the ON time of the switch ON/OFF signal 211 and the delay time by the delay fiber 206, by variation time S for one cycle of the local clock. Also, an ON time of the switch ON/OFF signal 211 of the switch ON/OFF signal 211 is extended by "(maximum variation time T)×2".

Considering the above discussion, the typically conceivable configuration of the optical packet transmission device 102 illustrated in FIG. 2 through FIG. 5 needs an extra time of "S+T×2" in addition to the ideal time (=optical packet length L) as the ON time of the switch ON/OFF signal 211.

Figure 9:
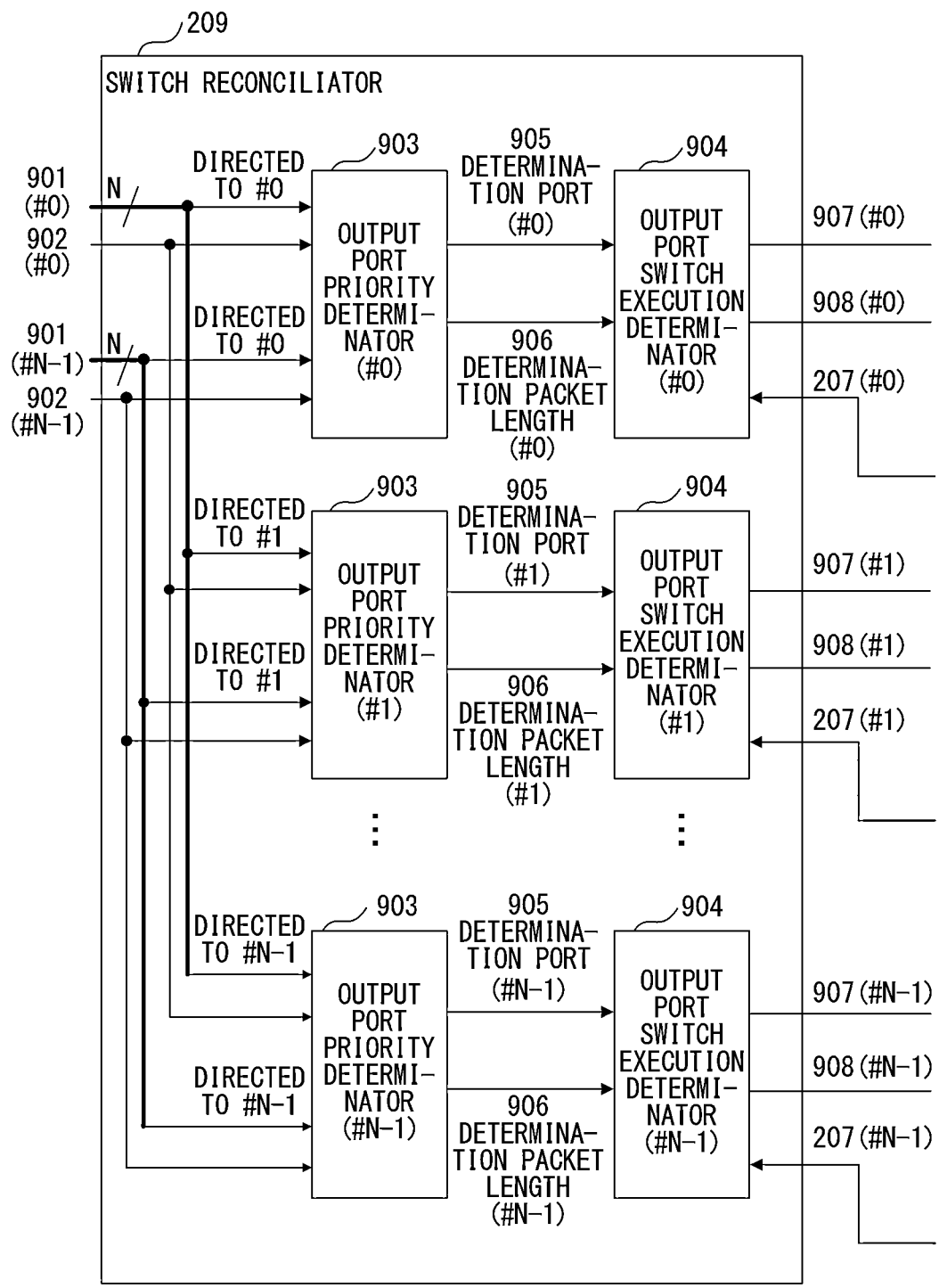
FIG. 9 illustrates a configuration example of a switch reconciliator 209 in the optical switch controller 202 illustrated in FIG. 2.

FIG. 9 illustrates a configuration example of the switch reconciliator 209 in the optical switch controller 202 illustrated in FIG. 2.

The switch reconciliator 209 includes an output port priority determinator 903 and an output port switch execution determinator 904 for each of the output ports for destinations of #0, #1, . . . , #N-1.

As described above, the switch reconciliator 209 inputs each pair of a destination output port number 901 and an Ethernet packet length 902 from the respective routing information header analyzers 208 of #0, #1, . . . , #N-1.

The routing information header analyzer 208 (#i) illustrated in FIG. 2 that analyzes the routing information header of the WDM optical signal 105 received by an arbitrary input port #i ($0 \leq i \leq N-1$) outputs N pieces of output port number information as the destination output port number 901 (#i). These N pieces of output port number information are input to the output port priority determinators 903 of #0, #1, ..., #N−1. The routing information header analyzer 208 (#i) analyzes the routing information header, and obtains an analysis result that the transmission destination of the WDM optical signal 105 received through the input port #i is, for example, the output port of #j (0≤h≤N−1). As a result of this, the routing information header analyzer 208 (#i) only activates the #j-th piece of output port number information from among the N pieces of output port number information that constitute the destination output port number 901 (#i).

Also, the routing information header analyzer 208 (#i) outputs, as the Ethernet packet length 902 (#i), the Ethernet packet length extracted from the routing information header. This Ethernet packet length 902 (#i) is input commonly to the respective output port priority determinators 903 of #0, #1, ..., #N−1.

The output port priority determinators 903 determine whether or not the output port information corresponding to themselves in the destination output port number 901 (#i) from the routing information header analyzer 208 (#i) are active. Thereby, the output port priority determinators 903 determine whether or not the transmission destinations of the WDM optical signals 105 received through input port #i are output ports that correspond to themselves.

When the output port priority determinator 903 has determined that the destination of the WDM optical signal 105 received through input port #i is an output port corresponding to itself, the output port priority determinator 903 performs the following determination. The output port priority determinator 903 determines the Ethernet packet length 902 (#i) output from the routing information header analyzer 208 (#i), as the Ethernet packet length of the Ethernet packet 104 transmitted by the WDM optical signal 105 and received through input port #i.

The output port priority determinator 903 performs the above determination for each pair of the destination output port number 901 and the Ethernet packet length 902 received from all of the routing information header analyzers 208 (#i) (O≤i≤N−1).

Here, a case is discussed where the output port priority determinator 903 has received, from a plurality of routing information header analyzers 208 and at one time, a plurality of pairs of the destination output port numbers 901 and the Ethernet packet lengths 902 with the output port number information corresponding to the output port priority determinator 903 being active. In such a case, the output port priority determinator 903 performs reconciliation so as to select one of the above pairs, and selects an input port that corresponds to the selected pair.

Then, as a priority determination condition, the output port priority determinator 903 selects, for example, the pair output from the routing information header analyzer 208 that corresponds to the input port having the smallest number among #0, #1, ..., #N−1 from among the plurality of pairs of the destination output port numbers 901 and the Ethernet packet lengths 902 that activated the output port number information of the output port that corresponds to the output port priority determinator 903 itself.

The output port priority determinator 903 outputs, as a determination port 905 and a determination packet length 906, the input port and the Ethernet packet length corresponding to the determined pair.

The switch reconciliator 209 includes the plurality of output port priority determinators 903 of #0, #1, ..., #N−1 each having the above described functions, for each of the output ports of destinations of #0, #1, ..., #N−1.

The respective output port switch execution determinators 904 of #0, #1, ..., #N−1 each input pairs of the determination ports 905 and the determination packet lengths 906 from the respective output port priority determinators 903 of #0, #1, ..., #N−1.

Also, each of the output port switch execution determinators 904 of #0, #1, ..., #N−1 inputs the switch ON/OFF signals 211 of #0, #1, ..., #N−1 output from the switch control signal generators 210 of #0, #1, ..., #N−1.

The output port switch execution determinator 904 monitors a state of switching to the output port that corresponds to the output port switch execution determinator 904 itself by determining whether the switch ON/OFF signal 211 input to the output port switch execution determinator 904 itself is in an ON state or an OFF state.

As a result of this, when the output port switch execution determinator 904 has determined that the switching to the output port corresponding to the output port switch execution determinator 904 itself is not being executed (i.e. the switch ON/OFF signal 211 is in an OFF state), the output port switch execution determinator 904 executes the following processes. The output port switch execution determinator 904 reports to the switch control signal generator 210 an output port switch execution instruction 907 instructing that the input port specified by the determination port 905 input from the output port priority determinator 903 be switched to the output port corresponding to the determination port 905 itself. Also, the output port switch execution determinator 904 reports to the switch control signal generator 210 the determination packet length 906 input from the output port priority determinator 903, as an output port execution packet length 908.

FIG. 10 illustrates a configuration example of the switch control signal generator 210 in the optical switch controller 202 illustrated in FIG. 2.

The switch control signal generator 210 includes a switch-ON time calculator 1001 and a switch ON/OFF signal generator 1002 for each of the output ports of destinations of #0, #1, ..., #N−1.

As described above, switch control signal generator 210 inputs respective pairs of the output port switch execution instructions 907 and the output port execution packet lengths 908 from the respective output port switch execution determinators 904 of #0, #1, ..., #N−1 in the switch reconciliator 209 illustrated in FIG. 9.

When the switch-ON time calculator 1001 has received the output port switch execution instruction 907, the switch-ON time calculator 1001 executes the following processes. The switch-ON time calculator 1001 calculates, as a switch ON time 1003, a period of time during which the input port specified by the output port switch execution instruction 907 is connected to the output port corresponding to the switch-ON time calculator 1001 itself. The expression of the switch ON time 1003 is as below.

The switch ON time=(output port execution packet length 908+routing information header length)/M+(S+T×2) where fractions of "(output port execution packet length 908+routing information header length)/M" are rounded up. Also, "(S+T×2)" is an extra time preferable for turning on the switch ON/OFF signal 211, which was described as a problem caused by the typically conceivable configuration of the optical packet transmission device 102 illustrated in FIG. 2 through FIG. 5. As described above, "S" is a variation time corresponding to one cycle of the local clock, and "T" is a maximum variation time between wavelengths of the received WDM optical signals 105.

The switch ON/OFF signal generator 1002 generates the switch ON/OFF signal 211 that is kept in an ON state during the switch ON time 1003 calculated by the switch-ON time calculator 1001. The process time from the start of the analysis of routing information headers in the header analyzer 503 (FIG. 5) to the start of outputting of the switch ON/OFF signal 211 in the switch ON/OFF signal generator 1002 is adjusted to be a consistent time specified as the fixed processing time 801 described in FIG. 8.

The switch ON/OFF signal generator 1002 outputs the above switch ON/OFF signal 211 to an optical switch (SOA) in the N×N optical switch 203 that connects the input port specified by the output port switch execution instruction 907 to the output port corresponding to the switch ON/OFF signal generator 1002.

As described above, the output port priority determinators 903 and the output port switch execution determinators 904 (FIG. 9) in the switch reconciliator 209 execute an earlier arrival priority process on the basis of the reports of the destination output port numbers 901 from the header analyzers 503 (FIG. 5).

The timing of reporting the destination output port number 901 is after a prescribed time has elapsed since the header analyzer 503 detected, in synchronization with the local clock 506, the routing information header on wavelength $\lambda_0$ output from the optical packet detector 501 in synchronization with the optical extraction clock 502 in FIG. 5.

Accordingly, the reporting of the destination output port numbers 901 on the basis of the detection of routing information headers causes variation time S caused by the asynchronousness between the optical extraction clock 502 and the local clock 506 during the analysis of the routing information headers.

Also, the detection of the routing information header on wavelength $\lambda_0$ alone does not permit the recognition of the arrival order of all of the WDM optical signals 105 because the above described maximum variation time T exists between values $\lambda_0, \lambda_1, \ldots, \lambda_{M-1}$ of the received WDM optical signal 105 that has undergone wavelength division multiplexing.

As a result of this, the typically conceivable configuration of the optical packet transmission device 102 illustrated in FIG. 2 through FIG. 5, FIG. 9, and FIG. 10 causes a problem wherein an accurate earlier arrival priority process is impossible.

Figure 11:
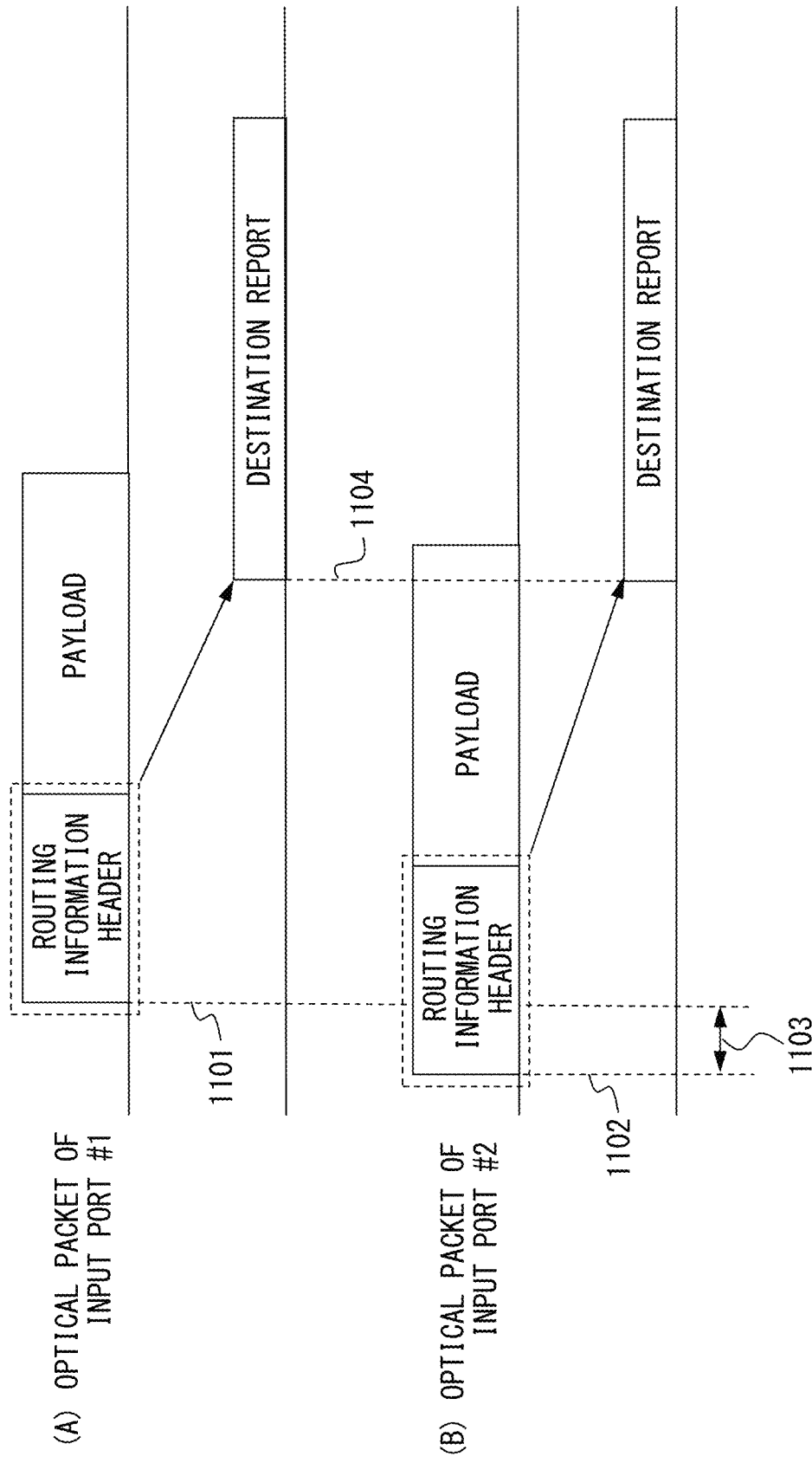
FIG. 11 explains a problem of an earlier arrival priority process in the typically conceivable configuration example of the optical packet generator 201 illustrated in FIG. 2 (first)

FIG. 11 explains the above problem of an earlier arrival priority process (first).

It is now assumed in FIG. 5 that the timing at which the routing information header on the optical signal of wavelength $\lambda_0$ in input port #1 is detected by the optical packet detector 501 of #0 on the basis of the optical extraction clock 502 of #1 extracted by the O/E converter 207 of #1 is 1101 in (A) of FIG. 11. It is also assumed that the timing at which the routing information header on the optical signal of wavelength $\lambda_0$ in input port #2 is detected by the optical packet detector 501 of #2 on the basis of the optical extraction clock 502 of #2 extracted by the O/E converter 207 of #2 is 1102 in (B) of FIG. 11. Further, it is assumed that the detection timing 1101 of the routing information header on input port #1 is later than the detection timing 1102 of the routing information header in input port #2 by the timing denoted by 1103. Also, the timing difference 1103 is smaller than variation time S caused because the optical extraction clock 502 and the local clock 506 are out of synchronization. It is also assumed that for example a #j-th piece of the output port number information that corresponds to the same destination output port is activated in the two destination output port numbers 901 of #1 and #2 from the respective routing information headers of input ports #1 and #2.

In such a case, the timing difference 1103 is smaller than variation time S caused by the asynchronousness between the optical extraction clock 502 and the local clock 506. Accordingly, there is a possibility that the two header analyzers 503 of #1 and #2 will take in, at the same timing, the routing information headers that were detected at different timings as described above. When the header analyzers 503 of #1 and #2 take in the routing information headers at the same timing, the subsequent processing timings coincide for the two routing information headers. Accordingly, the output timing of the destination output port number 901 of #1 that is output from the header analyzer 503 of #1 to the switch reconciliator 209 and the output timing of the destination output port number 901 of #2 that is output from the header analyzer 503 of #2 to the switch reconciliator 209 coincide. Also, as described above, in the two destination output port numbers 901 of #1 and #2, the #j-th piece of output port number information corresponding to the output ports of the same destinations is activated. Thereby, the output port priority determinator 903 (#j) in the switch reconciliator 209 receives the two destination output port numbers 901 of #1 and #2 at the same timing. As a result of this, the output port priority determinator 903 (#j) selects the destination output port number 901 (#1) that corresponds to port #1, which is the smaller number, as a priority determination condition as described above.

As described above, when a priority determination is executed on the basis of the reporting of the destination output port number 901 based on the analysis of a routing information header in the typically conceivable configuration of the optical packet transmission device 102 illustrated in FIG. 2 through FIG. 5, FIG. 9, and FIG. 10, the following problem is caused. A problem is caused in which an optical packet of input port #1 that arrived slightly later than an optical packet of input port #2 is determined to be a packet that arrived earlier, preventing an accurate earlier arrival priority process.

Figure 12:
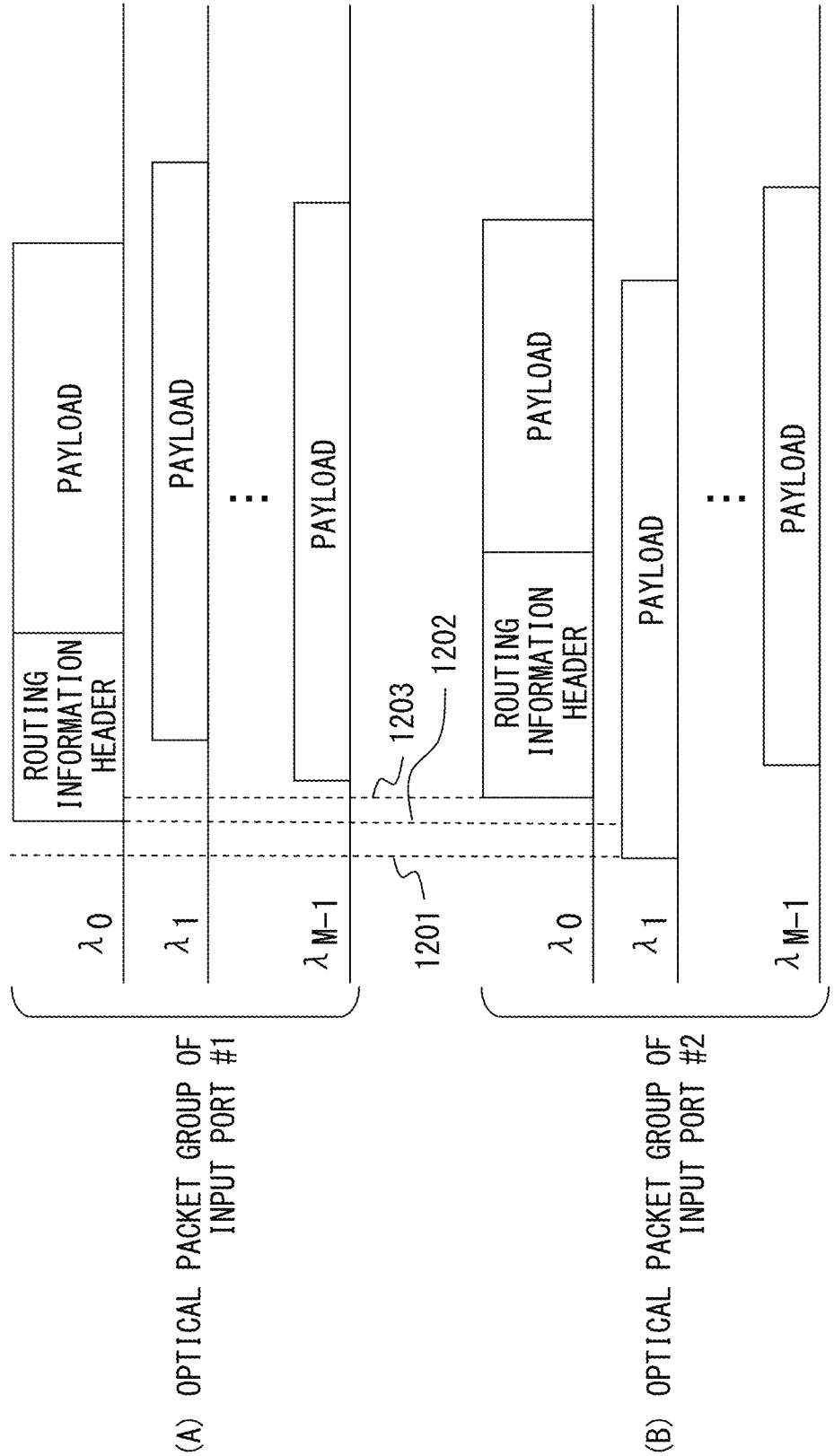
FIG. 12 explains a problem of an earlier arrival priority process in the typically conceivable configuration example of the optical packet generator 201 illustrated in FIG. 2 (second)

FIG. 12 explains the problem of an earlier arrival priority process (second).

In FIG. 12, (A) illustrates respective optical packet groups (WDM optical signals 105) of wavelengths $\lambda_0, \lambda_1, \ldots, \lambda_{M-1}$ received through input port #1, and (B) illustrates respective optical packet groups of wavelengths $\lambda_0, \lambda_1, \ldots, \lambda_{M-1}$ received through input port #2. The respective reception timings include maximum variation time between the wavelengths. As depicted as a timing 1201, the optical packet of wavelength $\lambda_1$ received through input port #2 arrived earlier. Also, as depicted as timings 1202 and 1203, the reception timing of a routing information header of wavelength $\lambda_0$ through input port #1 is earlier than that through input port #2.

In such a case, the optical packet of wavelength $\lambda_1$ received through input port #2 first flows into the N×N optical switch 203 through the delay fiber 206 illustrated in FIG. 2. Therefore, in FIG. 12, when the optical packet group received through input port #1 illustrated as (A) and the optical packet group received through input port #2 illustrated as (B) have the same destination port for their respective destinations, the optical packet group received through input port #2 will receive a priority process.

However, in such a case, the routing information header of wavelength $\lambda_0$ through input port #1 arrives earlier as depicted by the timings 1202 and 1203.

Accordingly, when the difference between the two timings is greater than variation time S described above, input port #1 is first processed and the switching is started in the output port priority determinator 903 that corresponds to the destination output port determined from the routing information header of input port #1. Thereafter, even when input port #2 is processed by the same output port priority determinator 903 as that of input port #1, the situation is determined in the output port switch execution determinator 904 to be a situation where switching by the switch ON/OFF signal 211 is being executed, and the input port #2 is not processed.

Also, when the difference between the two timings is smaller than variation time S described above, in the output port priority determinator 903 that corresponds to the destination output port determined from the routing information headers of input ports #1 and #2, the destination output port numbers 901 of input ports #1 and #2 are input at the same time. In such a case, the situation is the case illustrated in FIG. 11, where input port #1, having the smaller number, receives a priority process.

As described above, when the case illustrated in FIG. 12, where the entire arrival order and the arrival order of the routing information headers are different, occurs in the typically conceivable configuration of the optical packet transmission device 102 illustrated in FIG. 2 through FIG. 5, FIG. 9, and FIG. 10, the following problem is caused. The problem is that while it is preferable that optical packet group of input port #2, which arrived earliest among all, receives a priority process, the optical packet group of input port #1, whose routing information headers arrived earlier, receives the priority process.

Consideration of all of the above described problems caused by the typically conceivable configuration of the optical packet transmission device 102 illustrated in FIG. 2 through FIG. 5, FIG. 9, and FIG. 10 leads to the following.

1. Asynchronousness between the optical extraction clock 502 and the local clock 506 during the analysis of routing information headers and a process time delay caused by the maximum variation time between wavelengths in a WDM optical signal As the ON time of the switch ON/OFF signal 211, a time longer than the ideal time (=optical packet length L) by the time of "S+T×2" is preferable.

As a delay time caused by the delay fiber 206, a time longer than the ideal time (=routing information header analysis time) by the time of "S+T" is preferable.

2. A wrong priority process in a case when the priority determination is executed on the basis of the analysis of a routing information header added to wavelength $\lambda_0$.

When the arrival timings of routing information headers to a plurality of input ports converge within one cycle time S of the local clock and an input port to which a header arrived later has a smaller number, that input port is determined to be the port to which a header arrived earlier. This is because the analysis process of a routing information header is synchronized with the local clock, leading to the same timing for processing both of the routing information headers.

When the arrival of a routing information header in the optical packet group to input port #1 is earlier than the arrival to input port #2 while a wavelength in the optical packet group of input port #2 was the earliest to arrive, input port #1 is regarded as the earlier to arrive. This is caused by variation in arrival times between a plurality of wavelengths in a WDM optical signal.

The present embodiment described below solves the conventional problems and achieves the following objects.

1. Reduction in delay in timings of optical switching caused by asynchronousness between the optical extraction clock and the local clock and by variations between wavelengths of a WDM optical signal. This makes it possible to transmit optical packets efficiently between optical transmission devices.

2. Making it possible to perform a correct priority process on the basis of actual arrival timings of optical signals that received wavelength division multiplexing.

Figure 13:
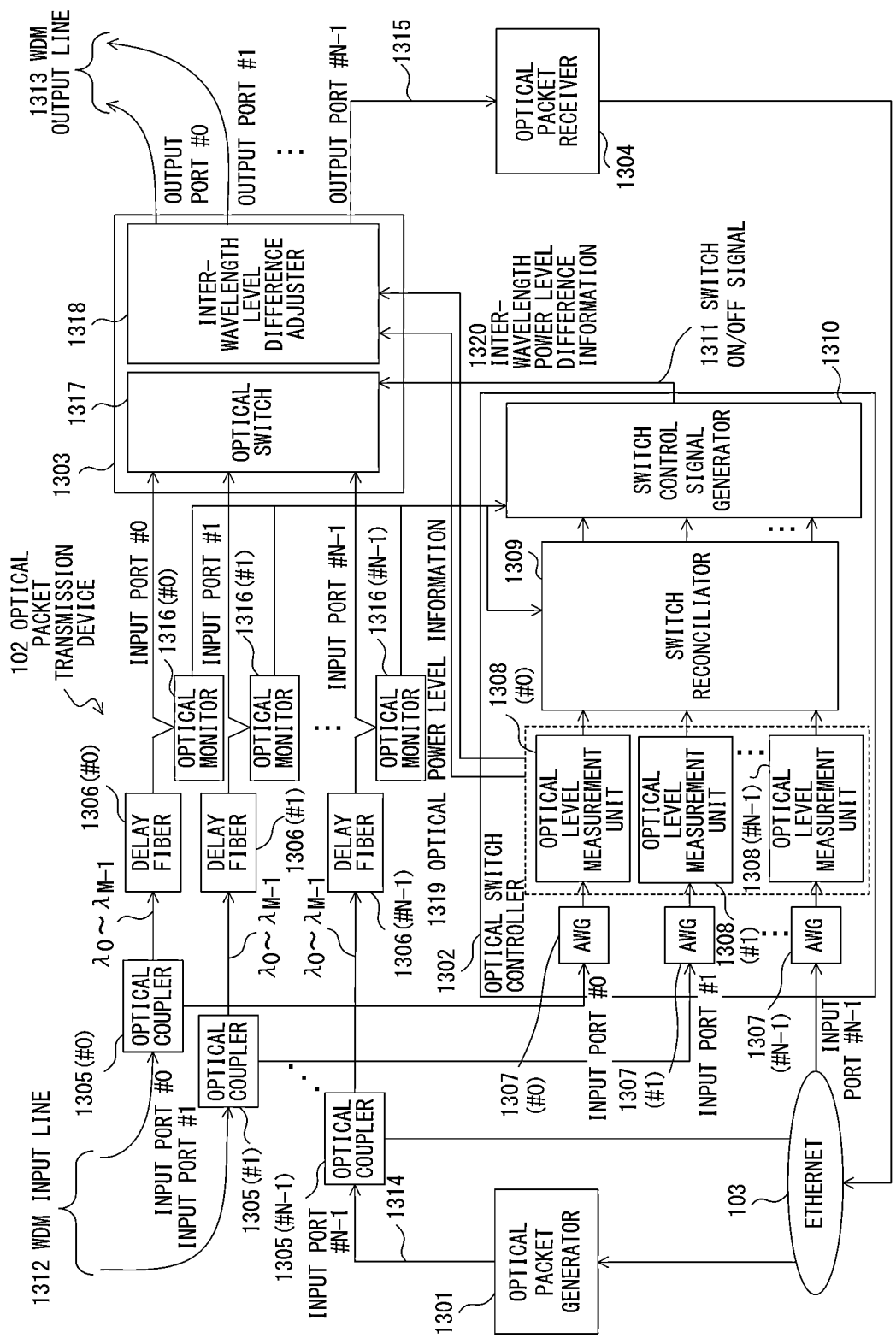
FIG. 13 illustrates a configuration of the optical packet transmission device 102 of FIG. 1 according to the present embodiment.

FIG. 13 illustrates a configuration of the optical packet transmission device 102 of FIG. 1 according to the present embodiment. Blocks included in this optical packet transmission device 102 are categorized into roughly four blocks; specifically, an optical packet generator 1301, an optical switch controller 1302, an N×N optical switch 1303, and an optical packet receiver 1304.

The optical packet transmission device 102 having the configuration of FIG. 13 receives WDM optical signals (that correspond to the WDM optical signal 105 in FIG. 1) through WDM input lines 1312 and 1314. The WDM input line 1312 is an input-side optical line that is connected to a different optical packet transmission device 102. The WDM input line 1314 is an optical line that is connected to the optical packet generator 1301 at the node including that optical packet generator 1301 (internal optical packet transmission device).

A received WDM optical signal includes a plurality (M) of wavelengths of $\lambda_0$ through $\lambda_{M-1}$ in a multiplexed state. In other words, the number of wavelength division multiplexing is M. The optical packet of each wavelength stores data obtained by dividing the Ethernet packet 104 received from the Ethernet 103 in FIG. 1 into M pieces.

In this example, routing information representing a route through which a WDM optical signal is transmitted has a following configuration. Routing information is configured to have a bit string of M bits, where M is the same number as a prescribed number of pieces of information including transmission source node identification information (referred to as a "transmission source node ID" hereinafter) and destination node identification information (referred to as a "destination node ID" hereinafter), e.g., the above described number M, as the number of wavelength division multiplexing. Note that it is no matter for an Ethernet length not to be included in routing information, which is different from the typically conceivable configuration of the optical packet transmission device 102 illustrated in FIG. 2 through FIG. 5, FIG. 9, and FIG. 10.

In the present embodiment, respective optical power levels of the respective optical signals of the above prescribed number (M, for example) of wavelengths in a WDM optical signal are made to correspond to respective bits of the above bit string in routing information.

Further, the present embodiment performs control in such a manner that the values of power levels correspond to the values of respective bits of routing information that correspond to the optical power levels.

Alternatively, routing information may be configured to include a bit string having a number (M−1, for example) of bits, the number being smaller by one than the number of bits corresponding to the above prescribed number (M bits, for example) including transmission source IDs and destination node IDs. In such a case, each pair of two optical power levels selected from among respective optical power levels of respective optical signals of the prescribed number (M bits, for example) of wavelengths is made to correspond to each bit of the above bit string in routing information. In such a case, control is further performed so that the difference value between the respective power levels in each pair corresponds to a value of each bit that corresponds to each pair.

In the above method of transmitting routing information, a wavelength for transmitting a data signal, which is the main body of communication data such as the Ethernet packet 104 or the like that has been divided into M pieces, is made to correspond, as an optical power level, to each bit value of routing information, instead of making a wavelength dedicated to routing information correspond to each bit value. A data signal used herein is a packet to be transmitted on an optical transmission route.

Also, in the above method of transmitting routing information, it is no matter not to make routing information correspond to the optical power levels of all of the M wavelengths of a WDM optical signal, instead of this, routing information may be made to correspond to M or a fewer optical power levels.

In the following explanation of the present embodiment, so as to facilitate understanding, an example is explained in which routing information is made to correspond to the optical power levels of all of the M wavelengths of a WDM optical signal and the above prescribed number is M.

The optical packet transmission device 102 receives WDM optical signals through the WDM input lines 1312 and 1314 illustrated in FIG. 13, and transmits the signal to WDM output lines 1313 or a WDM output line 1315 that corresponds to the routing information extracted from the WDM optical signals, from among a plurality of routes. The WDM output line 1313 is an optical line on the output side connected to a different optical packet transmission device 102. The WDM output line 1315 is an optical line connected to the optical packet receiver 1304 at the node including the optical packet transmission device 102.

Optical couplers 1305 of #0, #1, . . . , #N−1 are provided for respective input ports of #0, #1, . . . , #N−1 of the WDM input lines 1312 and 1314.

Each optical coupler 1305 branches a WDM optical signal input through the WDM input line 1312 or 1314 with the signal being kept in an optical division multiplexed state, and assigns the signals to the main signal line connected to the respective delay fibers 1306 and to the optical switch controller 1302.

Respective WDM optical signals whose plurality of wavelengths from $\lambda_0$ through $\lambda_{M-1}$ that have passed through the respective optical couplers 1305 of #0, #1, . . . , #N−1 on the main lines for respective input ports #0, #1, . . . , #N−1 are input to the respective delay fibers 1306 of #0, #1, . . . , #N−1. The delay fibers 1306 delay input WDM optical signals by a prescribed time before a switch ON/OFF signal 1311 (switch control signal) corresponding to that WDM optical signal starts to be input to an N×N optical switch 1303.

The delay fiber 1306 generates a signal delay that corresponds to a time obtained by adding the maximum transmission variation time between optical signals of a plurality of wavelengths of $\lambda_0$ through $\lambda_{M-1}$ to the time the optical switch controller 1302 spends to generate the switch ON/OFF signal 1311.

The respective WDM optical signals output from the respective delay fibers 1306 of #0, #1, . . . , #N−1 are input to respective input ports of #0, #1, . . . , #N−1 of the N×N optical switch 1303.

Respective optical monitors 1316 of #0, #1, . . . , #N−1 provided on the output side of the delay fibers 1306 of #0, #1, . . . , #N−1 execute the following process. The optical monitor 1316 measures the optical packet length of a WDM optical signal of optical signals of a plurality of wavelengths of $\lambda_0$ through $\lambda_{M-1}$ in a multiplexed state on the basis of a power level variation of WDM optical signals output from the delay fiber 1306.

The optical switch controller 1302 includes AWGs 1307 of #0, #1, . . . , #N−1, optical level measurement units 1308 of #0, #1, . . . , #N−1, a switch reconciliator 1309, and a switch control signal generator 1310.

Respective WDM optical signals separated from the WDM input line 1312 or 1314 in the respective optical couplers 1305 of #0, #1, . . . , #N−1 are input to the respective AWGs 1307 of #0, #1, . . . , #N−1. The AWG 1307 separates a WDM optical signal input from the corresponding optical coupler 1305, into optical signals having the above prescribed number (M, for example) of wavelengths of $\lambda_0, \lambda_1, \ldots, \lambda_{M-1}$.

Outputs from the AWGs 1307 of #0, #1, . . . , #N−1 are input to respective optical level measurement units 1308 of #0, #1, . . . , #N−1. The optical level measurement unit 1308 has a function of an optical power level measuring instrument that measures respective levels of optical power of the respective optical signals having wavelengths $\lambda_0, \lambda_1, \ldots, \lambda_{M-1}$ input from the AWGs 1307.

Further, the optical level measurement unit 1308 has a function of a routing information determinator that determines routing information on the basis of respective power levels of the measured wavelengths $\lambda_0, \lambda_1, \ldots, \lambda_{M-1}$.

As a result of this, the optical level measurement unit 1308 outputs a destination output port number that specifies which of output ports of #0, #1, . . . , #N−1 of the N×N optical switch 1303 a WDM optical signal received through the input port corresponding to the optical level measurement unit 1308 itself is to be output to.

In the optical level measurement units 1308, a plurality of pieces of routing information specifying the same one of the WDM output lines 1313 or 1315 may sometimes be determined at the same timing, corresponding to WDM optical signals from the plurality of WDM input lines 1312 or 1324. Specifically, the plurality of optical level measurement units 1308 may sometimes output the same destination output port number at the same timing. In such a case, the switch reconciliator 1309 executes a priority determination process including earlier arrival determination of input timings of a plurality of optical packet lengths measured by the plurality of optical monitors 1316 that correspond to the above plurality of pieces of routing information. As a result of this, the switch reconciliator 1309 selects one of the plurality of pieces of routing information (destination output port numbers).

When only one piece of routing information (destination output port number) specifying one of the WDM output lines 1313 and 1315 as a destination has been determined at a given timing, the switch reconciliator 1309 selects that one piece of routing information (destination output port number).

Thereafter, the switch reconciliator 1309 makes the switch control signal generator 1310 (which will be explained later) generate the switch ON/OFF signal 1311 that corresponds to the above selected routing information. Specifically, the switch reconciliator 1309 outputs a following switch execution instruction to the switch control signal generator 1310. This switch execution instruction specifies switching from the WDM input line 1312 or 1314 corresponding to the optical level measurement unit 1308 that output the above selected destination output port number, to the WDM output line 1313 or 1315 specified by the above selected destination output port number. For the switching specification, a switch execution instruction includes an input port number (transmission source input port number), from which the switch is performed, and an output port number (destination output port number), to which the switching is performed.

The switch control signal generator 1310 generates the following switch ON/OFF signal 1311, and outputs the signal to the N×N optical switch 1303.

The switch ON/OFF signal 1311 is in an ON state during a time that corresponds to the optical packet length measured by the optical monitor 1316 for the WDM optical signal, including the routing information selected by the switch reconciliator 1309 that was determined by the optical level measurement unit 1308. The switch ON/OFF signal 1311 makes the N×N optical switch 1303 connect the WDM input line 1312 or 1314 that corresponds to the routing information to the WDM output line 1313 or 1315 that corresponds to the routing information.

Specifically, the switch ON/OFF signal 1311 is in an ON state during a time that corresponds to the optical packet length measured by the optical monitor 1316 connected to the input port specified by the transmission source input port number specified by a switch execution instruction that was input through the switch reconciliator 1309. The switch ON/OFF signal 1311 makes the N×N optical switch 1303 connect to the output port that corresponds to the destination output port number specified by the switch execution instruction, from the input port corresponding to the transmission source input port number specified by the above switch execution instruction.

The N×N optical switch 1303 includes an optical switch 1317 and an inter-wavelength level difference adjuster 1318.

For each of output ports #0, #1, . . . , #N−1, the optical switch 1317 includes N×N SOAs for connecting the output port to each of #0, #1, . . . , #N−1. The optical switch 1317 controls each of the SOAs on the basis of the switch ON/OFF signals 1311 that correspond to the input port and the output port that correspond to the SOA output from the optical switch controller 1302.

The inter-wavelength level difference adjuster 1318 performs the following operation on the basis of information of respective optical power levels of respective optical signals of a prescribed number of wavelengths (M wavelengths, for example) included in WDM optical signals, measured by the optical level measurement unit 1308, received through the WDM input line 1312 or 1314. The inter-wavelength level difference adjuster 1318 restores the optical levels of the time of the transmission of WDM optical signals from the respective optical power levels of respective optical signals of the above-prescribed number (M for example) of wavelengths included in WDM optical signals output to the WDM output line 1313 or 1315.

The optical packet generator 1301 illustrated in FIG. 13 divides the Ethernet packet 104 (see FIG. 1) received from the Ethernet 103 into M optical packets, and outputs them as respective optical signals of M wavelengths.

Also, the optical packet generator 1301 controls the respective optical power levels of the respective optical signals existing in the above prescribed number (M for example) of wavelengths in accordance with the routing information that corresponds to the Ethernet packet 104 and transmits the signals, as WDM optical signals, to the WDM input line 1314.

Figure 14:
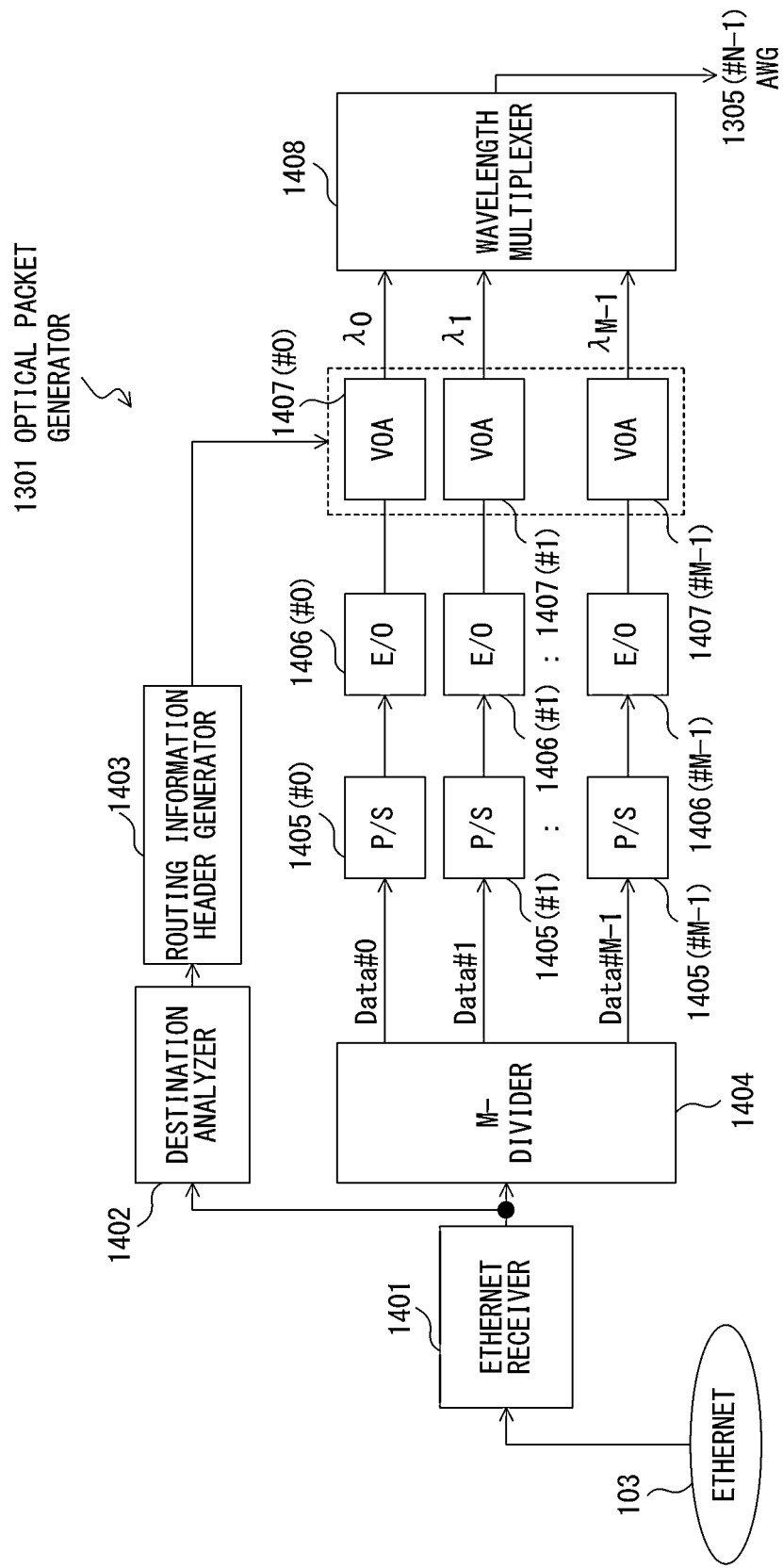
FIG. 14 illustrates a configuration example of an optical packet generator 1301 illustrated in FIG. 13 according to the present embodiment.

FIG. 14 illustrates a configuration example of the optical packet generator 1301 illustrated in FIG. 13.

The Ethernet packet 104 (see FIG. 1), which is an optical signal received from the Ethernet 103, is received by an Ethernet receiver 1401, and is converted into an electric signal.

This electric signal of the Ethernet packet 104 is converted into parallel data ("Data#0", "Data#1", "Data#M−1", etc., in FIG. 14) of M electric signals of #0, #1, . . . , #M−1 by an M-divider 1404.

Respective pieces of parallel data of #0, #1, . . . , #M−1 are input to parallel/serial (P/S) converters 1406 of #0, #1, . . . , #M−1, and are converted into pieces of serial data of #0, #1, . . . , #M−1 of electric signals.

Respective pieces of serial data of electric signals output from the respective P/S converters 1406 of #0, #1, . . . , #M−1 are input to electric/optical (E/O) converters 1407 of #0, #1, . . . , #M−1. The electric/optical (E/O) converters 1407 of #0, #1, . . . , #M−1 generate optical packet signals having wavelengths of $\lambda_0, \lambda_1, \ldots, \lambda_{M-1}$, respectively.

An electric signal of the Ethernet packet 104 output from the Ethernet receiver 301 is also input to a destination analyzer 1402, where the destination of the Ethernet packet 104 is analyzed.

A routing information header generator 1403 generates a routing information header in accordance with the destination analyzed by the destination analyzer 1402. As described above, a routing information header according to the present embodiment includes at least a destination node ID representing identification information of the destination node of a WDM optical signal output from a wavelength multiplexer 1408, and a transmission source node ID representing the identification information of a transmission source node, which is the node that transmitted the signal including that header.

The routing information header generator 1403 generates respective optical power levels of M wavelengths on the basis of the generated routing information header, and outputs them to variable optical attenuators (VOAs) 1407 of #0, #1, . . . , #M−1, respectively.

The VOAs 1407 control the optical power levels of optical packet signals of respective wavelengths $\lambda_0, \lambda_1, \ldots, \lambda_{M-1}$ on the basis of the respective optical power levels of the above M wavelengths, respectively.

The optical packet signals having respective wavelengths $\lambda_0, \lambda_1, \ldots, \lambda_{M-1}$ output from the respective VOAs 1407 are wavelength division multiplexed by the wavelength multiplexer 1408, and are sent out, as a WDM optical signal, to the optical coupler 1305 of #N−1 through the WDM input line 1314 illustrated in FIG. 13.

When it has been determined in one of the optical level measurement units 1308 of the optical switch controller 1302 illustrated in FIG. 13 that the destination node ID specified in the routing information header in a WDM optical signal received through the input port corresponding to the optical level measurement unit 1308 is directed to the node that includes the optical level measurement unit 1308, the following control is performed. The switch control signal generator 1310 in the optical switch controller 1302 generates the switch ON/OFF signal 1311 that makes the N×N optical switch 1303 switch from the above input port to output port #N−1, and supplies the signal 1311 to the N×N optical switch 1303.

As a result of this, the WDM optical signal received through an input port of one of the WDM input lines 1312 is switched by the N×N optical switch 1303, and thereafter is input to the optical packet receiver 1304 from input port #N−1 through the WDM output line 1315.

The configuration example of the optical packet receiver 1304 illustrated in FIG. 13 is similar to that illustrated in FIG. 4, which was explained above. The optical packet receiver 1304 assembles the original Ethernet packet 104 from the respective optical packet signals of wavelengths $\lambda_0, \lambda_1, \ldots, \lambda_{M-1}$ in the received WDM optical signal. The optical packet receiver 204 outputs the assembled Ethernet packet 104 to the Ethernet 103 that is connected to the node including the optical packet receiver 204.

In the configuration of the optical packet transmission device 102 according to the present embodiment illustrated in FIG. 13, routing information is transmitted while the respective optical power levels of the respective optical signals of a prescribed number (M, for example) of wavelengths in a WDM optical signal are controlled in accordance with respective bits of the bit string, including the M bits of the routing information. Alternatively, routing information is transmitted while the difference in each pair between two optical power levels selected from the respective optical power levels of the respective optical signals of a prescribed number (M for example) of bits is controlled in accordance with respective bits of a bit string, including M−1 bits of routing information. In other words, routing information is not added as a routing information header to the head of an optical packet of wavelength $\lambda_0$. Also, the wavelength whose optical power level is controlled is not a wavelength dedicated exclusive for routing information, but a wavelength that transmits a data signal, which is the communication module data main body of optical packets divided into M pieces. As described above, by analyzing a header, a time for obtaining routing information becomes needless. Specifically, a header includes management information, and is usually several tens of bytes (20 through 40 bytes for example) in length. In conventional methods for extracting routing information, electric conversion of the entire header portion and analysis of the header are applied and the time for the electric conversion and analysis causes transmission delay. By contrast, according to the present embodiment, the respective optical power levels of respective optical signals correspond to respective bits of a bit string including M bits of routing information. These M optical signals are transmitted parallelly in circuits and their arrivals are almost simultaneous, reducing a time for analysis. Thereby, the present embodiment reduces a transmission delay of switching in optical transmission.

Further, according to the present embodiment, the optical power levels of respective optical signals correspond to the respective bits of a bit string of M bits of routing information, and accordingly, M optical signals including an optical signal of wavelength $\lambda_0$ are detected. In other words, the first moment that M optical signals arrived is detected. By performing this detection, the ON time of the switch ON/OFF signal 1311 needed to turn on the N×N optical switch 1303 is "optical packet length L+the maximum variation time T between wavelengths". An ON time needed for conventional techniques is "optical packet length L+variation time S of one cycle of the local clock+(maximum variation time T between wavelengths)×2". Accordingly, the present embodiment reduces the ON time of the switch ON/OFF signal 1311 by the time of "S+T" in comparison with the conventional techniques. This makes it possible to increase the density of optical packet signals that can be transmitted in a line. Accordingly, the present embodiment enables efficient transmission, between optical transmission devices, of M optical signals (optical packet signals) that are wavelength multiplexed.

In the configuration of the above present embodiment, the switch reconciliator 1309 executes a priority determination process including the earlier-arrival determination of input timings of a plurality of optical packet lengths measured by the plurality of optical monitors 1316 corresponding to a plurality of coinciding pieces of routing information. Thereby, it is possible to avoid an erroneous determination in which a header that is of an input port of a smaller number and that arrived later is determined to have arrived earlier when the arrival times of routing information headers to a plurality of input ports coincide within the scope of one cycle time S of the local clock. It is also possible to avoid an erroneous determination in which a header of input port #1 that arrived earlier than a header of input port #2 is determined to have arrived earlier when a wavelength among the optical packet group of input port #2 arrived earliest among all packets while a routing information header in the optical packet group through input port #1 arrived earlier than that through input port #2. Accordingly, it is possible to perform an accurate priority process based on actual arrival timings of respective WDM optical signals by performing an earlier-arrival determination on the basis of periods during which optical packet signals of respective wavelengths in respective WDM optical signals input through the respective delay fibers 1306 actually exist.

In the above configuration of the present embodiment, the switch ON/OFF signal 1311 output from the optical switch controller 1302 to the N×N optical switch 1303 is in an ON state during a time that corresponds to the optical packet length measured by the optical monitor 1316 for the WDM optical signal including the routing information. Thereby, in the present embodiment, the N×N optical switch 1303 can be kept in an ON state during a period during which respective optical packet signals of wavelengths $\lambda_0, \lambda_1, \ldots, \lambda_{M-1}$ in a WDM optical signal input from the delay fibers 1306 actually exist. As a result of this, even when the optical extraction clock and the local clock are not synchronized when routing information is determined in the optical level measurement unit 1308, or even when there are variations between wavelengths in a WDM optical signal, it is needless to take these factors into consideration and to keep the signal in an ON state for a time that is longer by an extra time.

As described above, the present embodiment reduces time variation in optical switch control signals caused by the analysis of routing information headers. Further, by combining with an optical packet length detection performed by detecting optical power levels of M-wave-multiplexed optical packet signals, an optical switch control signal can be generated in accordance with the packet length, improving the transmission efficiency. As a result of this, collisions of optical packet signals also are reduced.

Also, the number of electric circuits used for performing O/E conversion and header analysis are reduced and the power consumption per one device also is reduced, suppressing increases in power consumption accompanying an increase in the amount of transmitted information. Further, reduced processing time also reduces transmission delay time, enabling more real-time communication.

Further, by including a function of recovering a power level difference, deteriorations of headers are suppressed even in multi-node ring transmission (a method of transmission through a plurality of nodes), leading to optical packet transmission of higher quality.

FIG. 15 illustrates in more detail the configuration example of the optical packet generator 1301 illustrated in FIG. 13.

An optical packet frame generation circuit 1501 converts the optical signal of the Ethernet packet 104 (see FIG. 1) received from the Ethernet 103, and thereafter converts the signal into parallel data of M electric signals of #0, #1, . . . , #M−1. Thereafter, these signals are further converted by E/O converters 1502 of #0, #1, . . . , #M−1 into optical packet signals respectively having wavelengths $\lambda_0, \lambda_1, \ldots \lambda_{M-1}$. These optical packet signals of the respective wavelengths are input to VOAs 1503 of #0, #1, . . . , #M−1.

Meanwhile, a routing information header of a WDM optical signal is generated from the received Ethernet packet 104 by referring to a routing table 1505. This routing information is input to an optical power level controller 1506. The optical power level controller 1506 generates optical power levels of M wavelengths on the basis of the above routing information header and inputs the levels to the VOAs 1503 of #0, #1, . . . , #M−1.

The respective VOAs 1503 control the optical power levels of optical packets of respective wavelengths $\lambda_0, \lambda_1, \ldots, \lambda_{M-1}$ on the basis of the respective optical power levels of the above M wavelengths. The optical packet signals having the respective wavelengths $\lambda_0, \lambda_1, \ldots, \lambda_{M-1}$ output from the VOAs 1503 respective wavelength division multiplexing, and are sent out, as a WDM optical signal, to the optical coupler 1305 of #N−1 through the WDM input line 1314 illustrated in FIG. 13.

An optical monitor 1507 monitors, through respective photo diodes (PDs) 1504, the optical power levels of optical packet signals output from the respective VOAs 1503. A power level adjuster 1506 realizes more accurate optical power level control by performing feedback control on the basis of optical power level outputs of respective optical packet signals monitored by the optical monitor 1507.

FIG. 16 illustrates a data configuration example of the routing table 1505 illustrated in FIG. 15 (first). As illustrated in FIG. 16, the routing table 1505 stores, for each combination of a destination node ID and a transmission source node ID, digital values in the form of 1 or 0 that correspond to the optical power levels of wavelengths $\lambda_0, \lambda_1, \ldots, \lambda_{M-1}$. While performing the above feedback control, the optical power level controller 1506 performs control in such a manner that the optical power levels of the respective wavelengths correspond to the optical power level values of the respective wavelengths in the routing table 1505.

Figure 17:
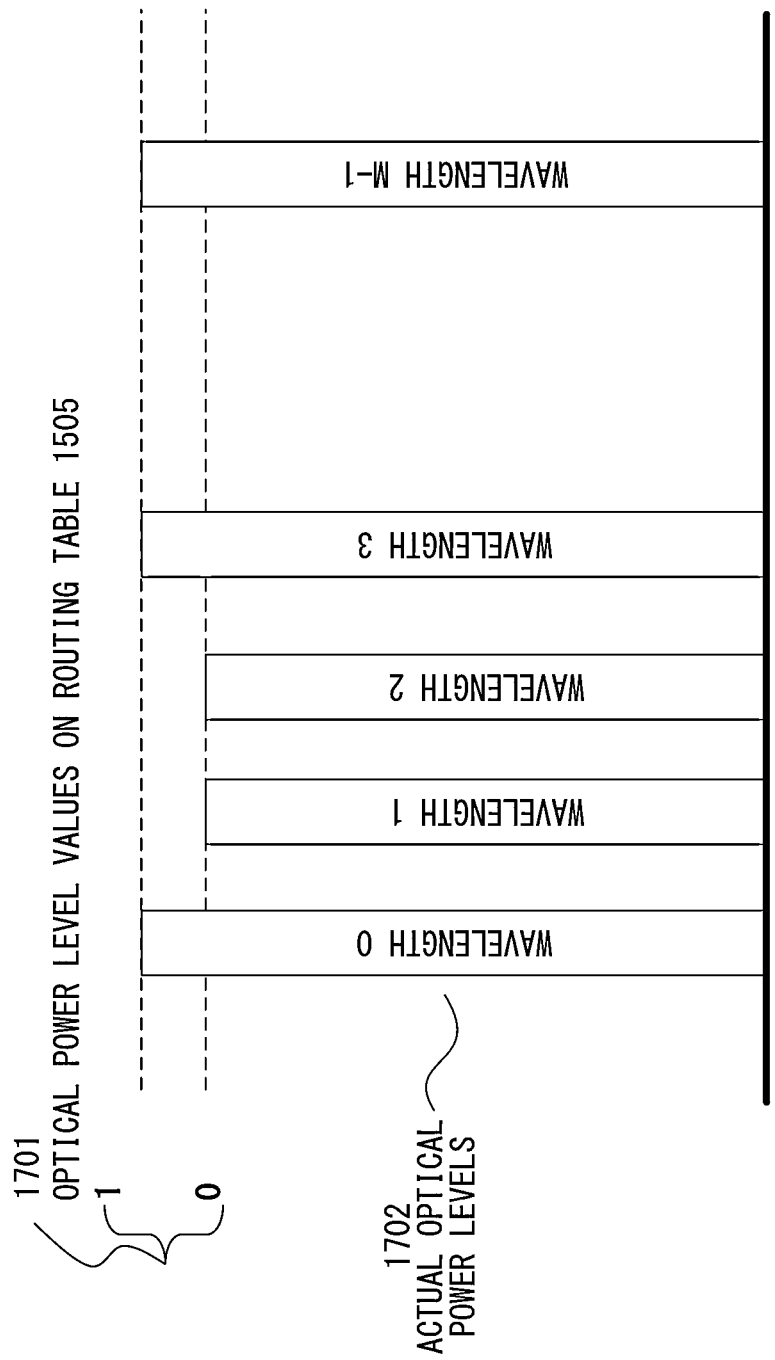
FIG. 17 explains power level control that corresponds to the data configuration example of the routing table 1505 illustrated in FIG. 16.

FIG. 17 explains power level control that corresponds to the data configuration example of the routing table 1505 illustrated in FIG. 16. The optical power level controller 1506 illustrated in FIG. 15 sets a digital value "0" or "1", denoted by 1701 in FIG. 17, that corresponds to the optical power level value in the routing table 1505 as a given optical power level 1702 illustrated in FIG. 17 so as to generate power level differences between the wavelengths. FIG. 17 illustrates an example of an actual setting situation of optical power levels that correspond to the optical packet values in the routing table 1505 illustrated in FIG. 16 when the destination node ID is "1" and the transmission source node ID is "4". This method can represent combinations of destination node IDs and transmission source node IDs of $2^M$ bits.

Figure 19:
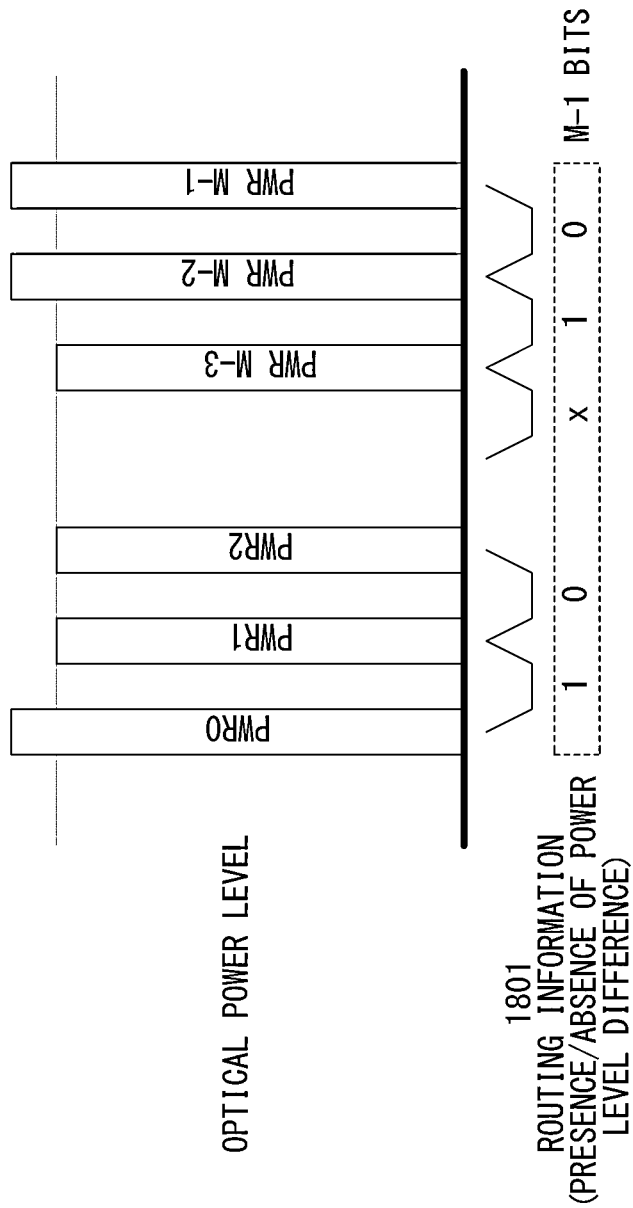
FIG. 19 explains optical power level control that corresponds to the data configuration example of the routing table 1505 illustrated in FIG. 18.

FIG. 18 illustrates another data configuration example of the routing table 1505 illustrated in FIG. 15 (second), and FIG. 19 explains optical power level control that corresponds to the data configuration example of the routing table 1505 illustrated in FIG. 18.

The first half and the last half of a bit string of M−1 bits are as signed to a destination node ID and a transmission source mode ID, respectively. Each pair of two optical power levels selected from among respective optical power levels of optical signals of M wavelengths is made to correspond to a bit in the bit string of the routing information, and control is performed in such a manner that the difference value between the optical power levels in each pair corresponds to the value of each bit that corresponds to the pair.

Specifically, as illustrated in FIG. 18 and FIG. 19, relative power level differences are generated between adjacent wavelengths, and a power level difference equal to or greater than a prescribed level is given "1" as a symbol and a power level difference smaller than the prescribed level is given "0" as a symbol, and these symbols are merged so that routing information 1801 of a total of M−1 bits is generated.

In FIG. 18, when the destination node ID is F0, the transmission node ID is 11, digital values corresponding to the optical power levels of wavelengths from $\lambda_0$ through $\lambda_{M-1}$ are 1010 . . . 110, and pieces of routing information expressed by power level differences are 111 . . . 01.

In FIG. 19, when digital values of optical power levels are 100 . . . 011, pieces of routing information based on power level differences are 10 . . . 10.

Figure 20:
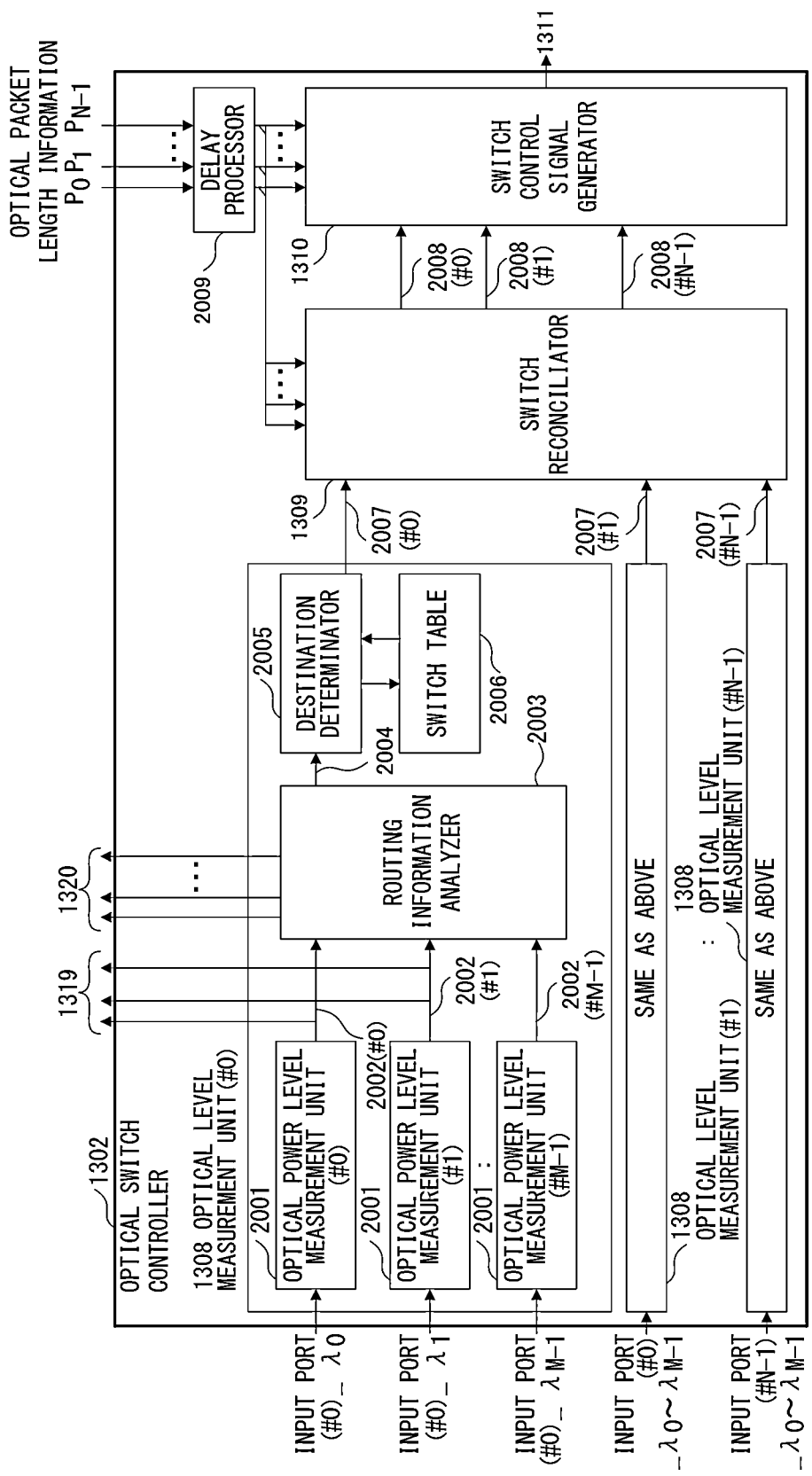
FIG. 20 illustrates in more detail a configuration of an optical switch controller 1302, mainly illustrating an optical level measurement unit 1308 illustrated in FIG. 13 according to the present embodiment.

FIG. 20 illustrates in more detail a configuration of the optical switch controller 1302, mainly illustrating the optical level measurement unit 1308 illustrated in FIG. 13. Note that the AWGs 1307 of #0, #1, . . . , #N−1 illustrated in FIG. 13 are omitted in FIG. 20.

The optical level measurement units 1308 of #0, #1, . . . , #N−1 are connected to respective input ports of #0, #1, . . . , #N−1.

Each of the optical level measurement units 1308 includes optical power level measurement units 2001 of #0, #1, . . . , #M−1. Each of the optical power level measurement units 2001 of #0, #1, . . . , #M−1 measures the optical power level of one of the optical signals having wavelengths $\lambda_0, \lambda_1, \ldots, \lambda_{M-1}$ that is input via the AWG 1307 (see FIG. 13) through the input port to which the optical level measurement unit 1308 including the optical power level measurement unit 2001 is connected. Optical power level computation results 2002 (#0, #1, . . . , #M−1) for the wavelengths $\lambda_0, \lambda_1, \ldots, \lambda_{M-1}$ are input to a routing information analyzer 2003.

The timing at which the optical power level computation results 2002 of all wavelengths finish being input to the routing information analyzer 2003 is always determined by the timing of the wavelength that was input latest. Accordingly, "maximum variation time T between wavelengths" may be treated as the time to be taken into consideration as an extra time for turning on the N×N optical switch 1303. In the typically conceivable configuration, the optical packet transmission device 102 illustrated in FIG. 2 takes into consideration an extra time of "maximum variation time T×2" as explained in FIG. 8. Accordingly, it is possible to reduce, by T, the switch-on time to be taken into consideration as an extra time.

The routing information analyzer 2003 executes an inverse conversion process of the generation process of routing information headers in the embodiment of the optical power level controller 1506 explained in FIG. 15.

For example, when an optical power level has been set for each wavelength corresponding to routing information by using the routing table 1505, the following process is executed. The routing information analyzer 2003 detects the optical power level for each wavelength from the optical power level computation result 2002, determines the optical power level value ("0" or "1") for each wavelength, and generates routing information of a total of M bits. Thereafter, the routing information analyzer 2003 refers to, for example, a routing table (not illustrated) similar to the routing table 1505 illustrated in FIG. 16 so as to determine routing information 2004 as a combination of a destination node ID and a transmission source node ID.

As another example, when an optical power level has been set for the relative difference in power levels between adjacent wavelengths corresponding to routing information by using the routing table 1505 illustrated in FIG. 15, the following process is executed. The routing information analyzer 2003 detects a presence or absence of a relative difference in optical power levels between wavelengths from the optical power level computation result 2002, and gives "1" as a symbol to a power level difference equal to or greater than a prescribed level and gives "0" as a symbol to a power level difference smaller than the prescribed level, and merges the symbols so as to generate routing information of a total of M−1 bits. Thereafter, the routing information analyzer 2003 refers to for example a routing table (not illustrated) similar to the routing table 1505 illustrated in FIG. 17 so as to determine the routing information 2004 as a combination of a destination node ID and a transmission source node ID.

A destination determinator 2005 determines a destination output port of the N×N optical switch 1303, which is the sending destination of the optical packet, on the basis of the destination node ID and the transmission source node ID included in the routing information 2004.

Figure 21:
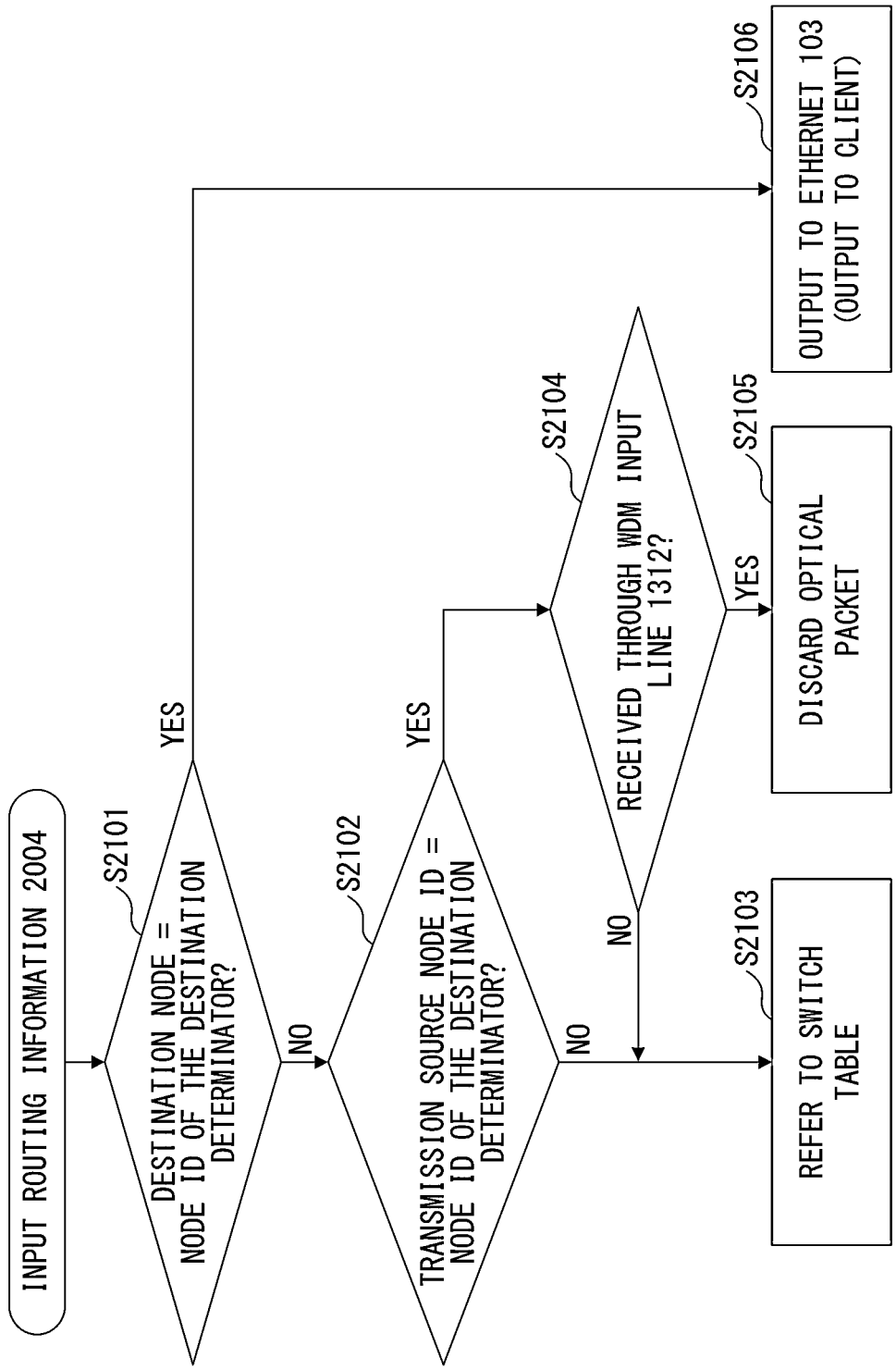
FIG. 21 is a flowchart explaining a control process executed by a destination determinator 2005.

FIG. 21 is a flowchart explaining a control process executed by the destination determinator 2005. This control process is implemented as, for example, an operation in which a central processing unit (CPU) (not illustrated) that constitutes the optical switch controller 1302 executes a control program stored in a memory (not illustrated).

When the routing information 2004 has been input, the destination determinator 2005 first determines whether or not the destination node ID included in that routing information 2004 is the ID of the node including the destination determinator 2005 (step S2101).

When the destination node ID is not identical to the ID of the node including the destination determinator 2005, so that the determination result in step S2101 is NO, the destination determinator 2005 determines whether or not the transmission source node ID included in the routing information 2004 is the ID of the node including the destination determinator 2005 (step S2102).

When the transmission source node ID is also not identical to the ID of the node including the destination determinator 2005, so that the determination result in step S2102 is NO, the destination determinator 2005 refers to a switch table 2006 and determines the output port number as the sending destination. Thereafter, the destination determinator 2005 outputs that number to the switch reconciliator 1309 (FIG. 20) as a destination output port number 2007 (step S2103). FIG. 22 illustrates a data configuration example of the switch table 2006. As illustrated in FIG. 22, the switch table 2006 stores, for each destination node ID, the number of the output port of N×N optical switch 1303 as the sending destination corresponding to each destination node ID. Also, the numbers of a plurality of output ports may be stored and referred to as sending destinations in order to be applicable to multicast communication or broadcast communication. In such a case, the N×N optical switch 1303 connects one input port to a plurality of output ports, and copies input optical packets to send out them to the plurality of output ports.

When the transmission source node ID is identical to the ID of the node including the destination determinator 2005 so that the determination result in step S2102 is YES, the destination determinator 2005 determines whether or not a WDM optical signal including the routing information 2004 has been received from the WDM input line 1312 (step S2104). In other words, whether or not a WDM optical signal that the node including the destination determinator 2005 has transmitted has been returned after passing through other optical packet transmission devices 102 is determined.

When the determination result in step S2104 is YES, the destination determinator 2005 discards the optical packet of the WDM optical signal (step S2105).

When the WDM optical signal including the routing information 2004 is the signal that was transmitted by the optical packet generator 1301 in the node including the destination determinator 2005 and the determination result in step S2104 is NO, the destination determinator 2005 executes the above process in step S2103, and outputs the destination output port number 2007.

When the destination node ID is identical to the ID of the node including the destination determinator 2005 and the determination result in step S2101 is YES, the destination determinator 2005 specifies, as the destination output port number 2007, number #N−1 of the output port of the N×N optical switch 1303 illustrated in FIG. 13 (step S2106). As a result of this, the received WDM optical signal is received by the optical packet receiver 1304 illustrated in FIG. 13 through output port #N−1 from the N×N optical switch 1303 and is output to the Ethernet 103 connected to the node so as to be transmitted to the client device.

When congestion has been caused because of the plurality of optical level measurement units 1308 outputting the same destination output port number 2007 at the same timing, the switch reconciliator 1309 executes an output reconciliation process. As examples of criteria for reconciliation, the following factors are possible.

Optical packet earlier-arrival priority process
Priority process by a reception port
Priority process by a destination node ID
Priority process by a transmission source node ID
Combination of above processes Particularly in an optical packet earlier-arrival priority process, the earlier-arrival determination is performed on a plurality of pieces of optical packet length information $P_0$, $P_1, \ldots, P_{N-1}$ that were measured by the plurality of optical monitors 1316 (see FIG. 13) corresponding to the plurality of coinciding input ports and that were input via a delay processor 2009 (which will be described later) illustrated in FIG. 20.

Thereby, an earlier-arrival determination is performed on the basis of a period during which optical packet signals of respective wavelengths in respective WDM optical signals input from the delay fibers 1306 actually exist, making it possible to perform a correct priority process on the basis of actual arrival timings of respective WDM optical signals.

By employing the above examples of the respective reconciliation criteria together with this optical packet earlier-arrival priority process, a more accurate reconciliation process is realized.

In FIG. 20, the switch reconciliator 1309 outputs, to the switch control signal generator 1310, a switch execution instruction 2008 including an input port number (transmission source input port number), which is the switching source, and an output port number (destination output port number), which is the switching destination.

The switch control signal generator 1310 generates the switch ON/OFF signal 1311 as below, and outputs it to the N×N optical switch 1303.

The switch ON/OFF signal 1311 is in an ON state during a period that corresponds to the optical packet length information (one of the $P_0, P_1, \ldots, P_{N-1}$) of the transmission source input port number specified by the switch execution instruction 2008 input from the delay processor 2009.

During this ON time, the switch ON/OFF signal 1311 makes the N×N optical switch 1303 perform connection from the input port of the transmission source input port number specified by the switch execution instruction 2008 to the output port of the destination output port number specified by the switch execution instruction 2008.

Then, the delay processor 2009 in FIG. 20 delays pieces of optical packet length information $P_0, P_1, \ldots, P_{N-1}$ (arrival information) reported from the respective optical monitors 1316 in FIG. 13, until the switch execution instruction 2008 (switch reconciliation result) is output from the switch reconciliator 1309. Thereby, the delay processor 2009 performs delay adjustment in such a manner that a switch reconciliation result and arrival information exist at the same timing.

Figure 23:
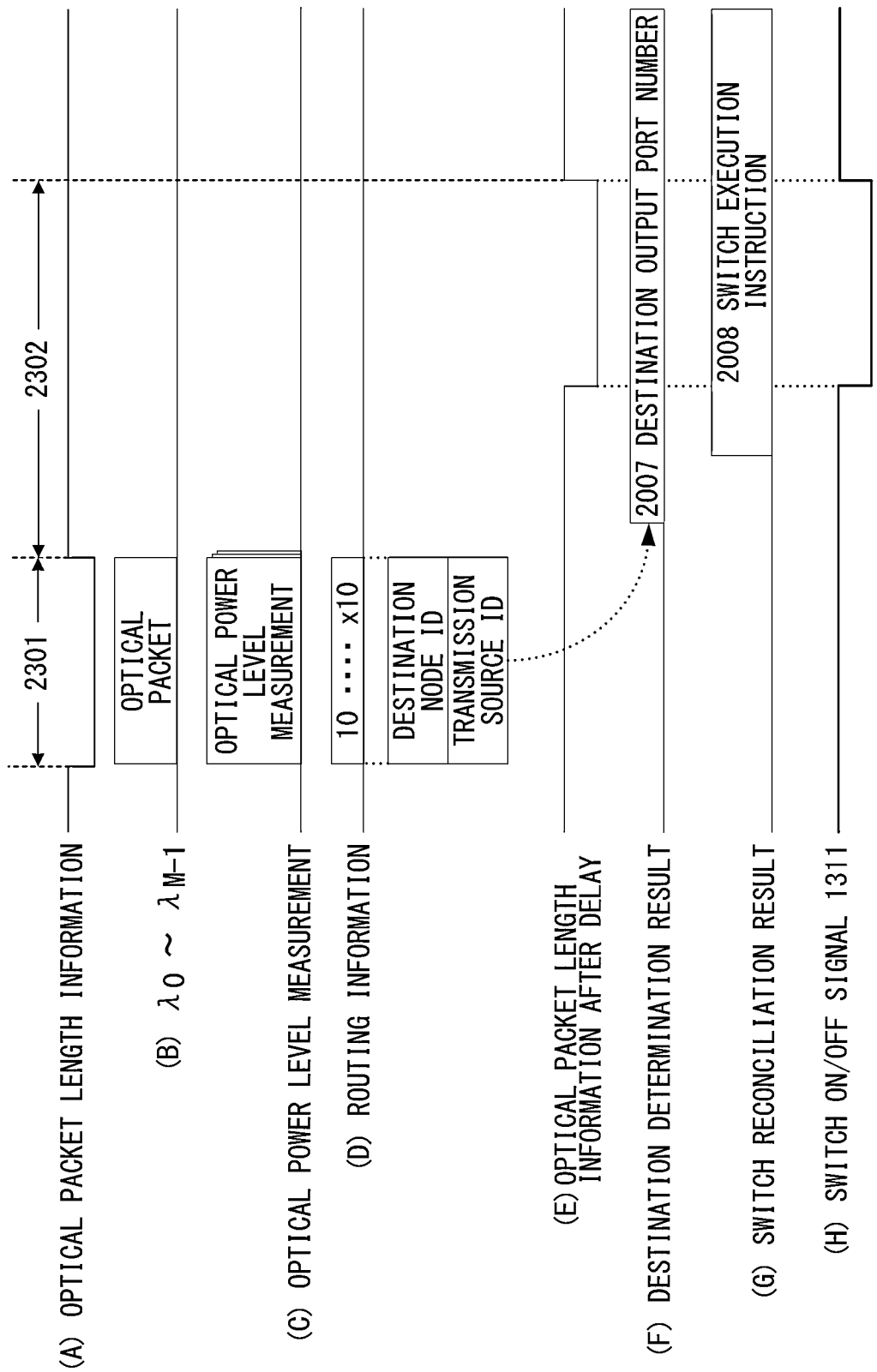
FIG. 23 is a timing chart illustrating operations of a delay fiber 1306 and a delay processor 2009.

FIG. 23 is a timing chart illustrating operations of the delay fibers 1306 in FIG. 13 and the delay processor 2009 in FIG. 20.

The optical packet of wavelengths $\lambda_0, \lambda_1, \ldots, \lambda_{M-1}$ that received wavelength division multiplexing, illustrated as (B)

in FIG. 23, is received by the WDM input line 1312 or 1314 in FIG. 13 at the timing depicted in (B) of FIG. 23.

By contrast, the routing information 2004 obtained on the basis of the optical power level measurement performed in the optical power level measurement unit 2001, illustrated in FIG. 20, of the optical level measurement unit 1308 illustrated in FIG. 13 and the following route analysis performed by the routing information analyzer 2003 are at the timings illustrated as (c) and (D) in FIG. 23.

Further, the destination output port number 2007 (destination determination result) output from the destination determinator 2005 illustrated in FIG. 20 and the switch execution instruction 2008 (switch reconciliation result) output from the N×N optical switch 1303 are at the timings illustrated as (F) and (G) in FIG. 23.

Meanwhile, pieces of optical packet length information $P_0$, $P_1, \ldots, P_{N-1}$ output from the optical monitors 1316 illustrated in FIG. 13 in response to optical packets output from the delay fibers 1306 are at the timing illustrated as (A) in FIG. 23. They are delayed, by a delay time 2301 in the delay fibers 1306, from the output timings of optical packet length information $P_0, P_1, \ldots, P_{N-1}$ and the reception timing of the optical packet illustrated as (B) in FIG. 23.

The delay processor 2009 illustrated in FIG. 20 delays pieces of optical packet length information $P_0, P_1, \ldots, P_{N-1}$ by a time denoted by 2302 illustrated as (A) in FIG. 23. As a result of this, it is possible to cause a coincidence between the timing of outputting pieces of optical packet length information $P_0, P_1, \ldots, P_{N-1}$ illustrated as (A) in FIG. 23 and the timing of performing the switch reconciliation results illustrated as (G) in FIG. 23. Thereby, the timing at which the switch ON/OFF signal 1311 is output from the switch control signal generator 1310 is adjusted as illustrated as (H) in FIG. 23.

It is possible for the delay processor 2009 to delay pieces of optical packet length information $P_0, P_1, \ldots, P_{N-1}$ (arrival information) by a sufficiently long time for the destination determination result of optical packets ((F) in FIG. 23) and the switch reconciliation result ((G) in FIG. 23) to become fixed. Thereby, the pulses of pieces of optical packet length information $P_0, P_1, \ldots, P_{N-1}$ can be used as the switch ON/OFF signals 1311 (switch control signals) from the optical switch controller 1302 illustrated in FIG. 13 or FIG. 20 to the N×N optical switch 1303 illustrated in FIG. 13 as they are. As a result of this, the switch ON/OFF signal 1311 having the width corresponding to the optical packet length detected by the optical monitor 1316 can be generated so as to be used for the N×N optical switch 1303 effectively.

FIG. 24 illustrates a configuration example of the optical power level measurement units 2001 illustrated in FIG. 20.

Optical power level monitors 2401 of #0, #1, . . . , #M−1 include optical elements such as a PD that can perform optical/electric conversion based on an electric effect.

Each optical power level monitor 2401 converts the optical power levels of input wavelengths $\lambda_0, \lambda_1, \ldots, \lambda_{M-1}$ into optical power level monitor values 2404 of #0, #1, . . . , #M−1 as electric signals (voltage values or current values).

A computation unit 2402 calculates a received optical power level for each of wavelengths $\lambda_0, \lambda_1, \ldots, \lambda_{M-1}$ from the optical power level monitor values 2404 of #0, #1, . . . , #M−1, and outputs the results as the optical power level computation results 2002 (see FIG. 20) of #0, #1, . . . , #M−1.

Figure 25A:
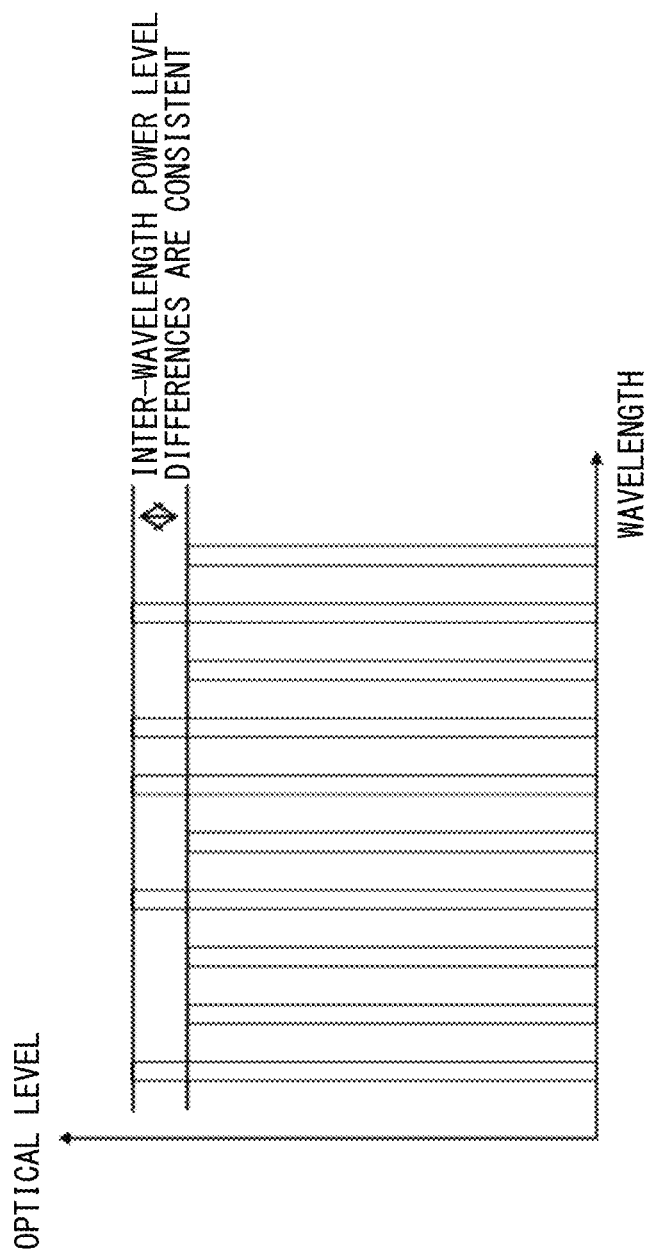

FIG. 25A and FIG. 25B explain operations of the computation unit 2402.

As illustrated in FIG. 25A, when a WDM optical signal is to be transmitted from the optical packet generator 1301, the power level differences between wavelengths are adjusted to be consistent. However, the amount of decrease caused by optical components in the respective optical packet transmission devices 102 and the amount of amplification caused by optical amplifiers are dependent on wavelengths, so multiple connection of the optical packet transmission devices 102 will make the difference between wavelengths inconsistent in the manner illustrated in FIG. 25B.

Accordingly, the computation unit 2402 illustrated in FIG. 24 reads and adds inter-station fiber information (decreased amount and wavelength dispersion amount), WDM optical amplifier information (wavelength-dependency amount of amplification ratio), and demultiplexer information (the number of demultiplexers when they exist in plural, and decreased amount for each wavelength) that are stored in a storage unit 2403. Thereby, the computation unit 2402 restores the inter-wavelength power level information at the time of transmission, and outputs the restored information.

Also, values that are stored beforehand are used as inter-station fiber information, WDM optical amplifier information and demultiplexer information to be stored in the storage unit 2403. Alternatively, information measured by transmission device including the optical packet transmission devices 102 may be input.

Figure 26:
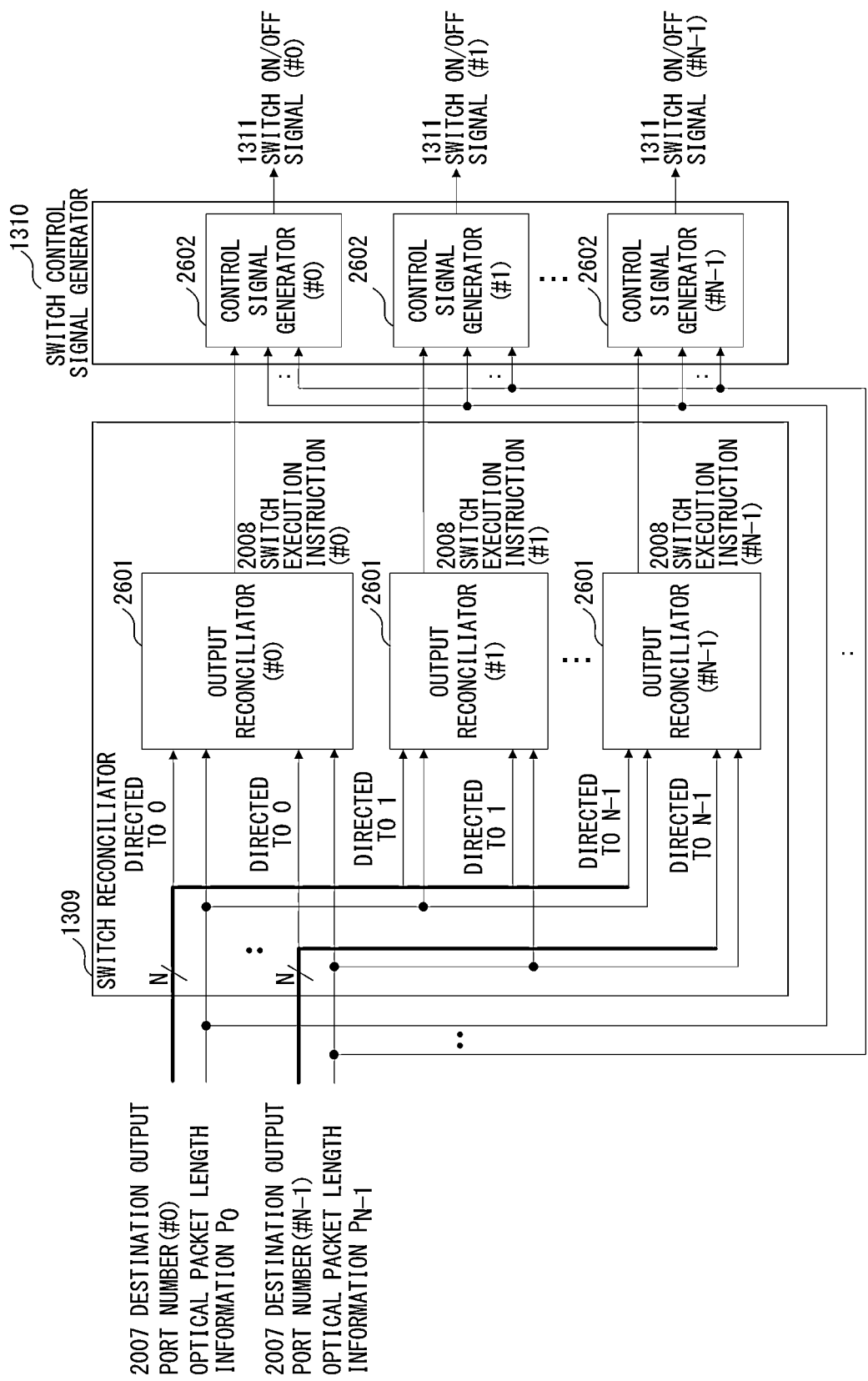
FIG. 26 illustrates a configuration example of a switch reconciliator 1309 and the switch control signal generator 210 illustrated in FIG. 20.

FIG. 26 illustrates a configuration example of the switch reconciliator 1309 and the switch control signal generator 1310 illustrated in FIG. 20.

Respective output reconciliators 2601 of #0, #1, . . . , #N−1 that constitute the switch reconciliator 1309 perform priority determination and earlier-arrival priority determination of optical packets when pieces of optical packet length information $P_0, P_1, \ldots, P_{N-1}$ are input simultaneously from the respective input ports of #0, #1, . . . , #N−1. As a priority determination criterion for a case of simultaneous input, determination based on input ports (smaller numbers are given priority) or the like may be adopted.

Respective control signal generators 2602 of #0, #1, . . . , #N−1 in the switch control signal generator 1310 input the respective switch execution instructions 2008 (output #0 through N−1_input port number) of #0, #1, . . . , #N−1, which are respective reconciliation results from the respective output reconciliators 2601. The switch execution instructions 2008 give instructions to the respective output ports about which of the input ports the optical packets are to be output to.

On the basis of the respective switch execution instructions 2008, the control signal generators 2602 output the switch ON/OFF signals 1311 of #0, #1, . . . , #N−1 for performing control of ON and OFF of the target optical switch element disposed for each output port in the N×N optical switch 1303.

As described above, in the output reconciliation process of the respective output ports, the earlier-arrival determination is performed on the basis of pieces of optical packet length information $P_0, P_1, \ldots, P_{N-1}$. Accordingly, accurate earlier-arrival determination is realized, without being influenced by variation time S dependent upon the local clock at the time of the route information header analysis of optical packets (at the time of destination determination) or the maximum variation time T between wavelengths.

Figure 27:
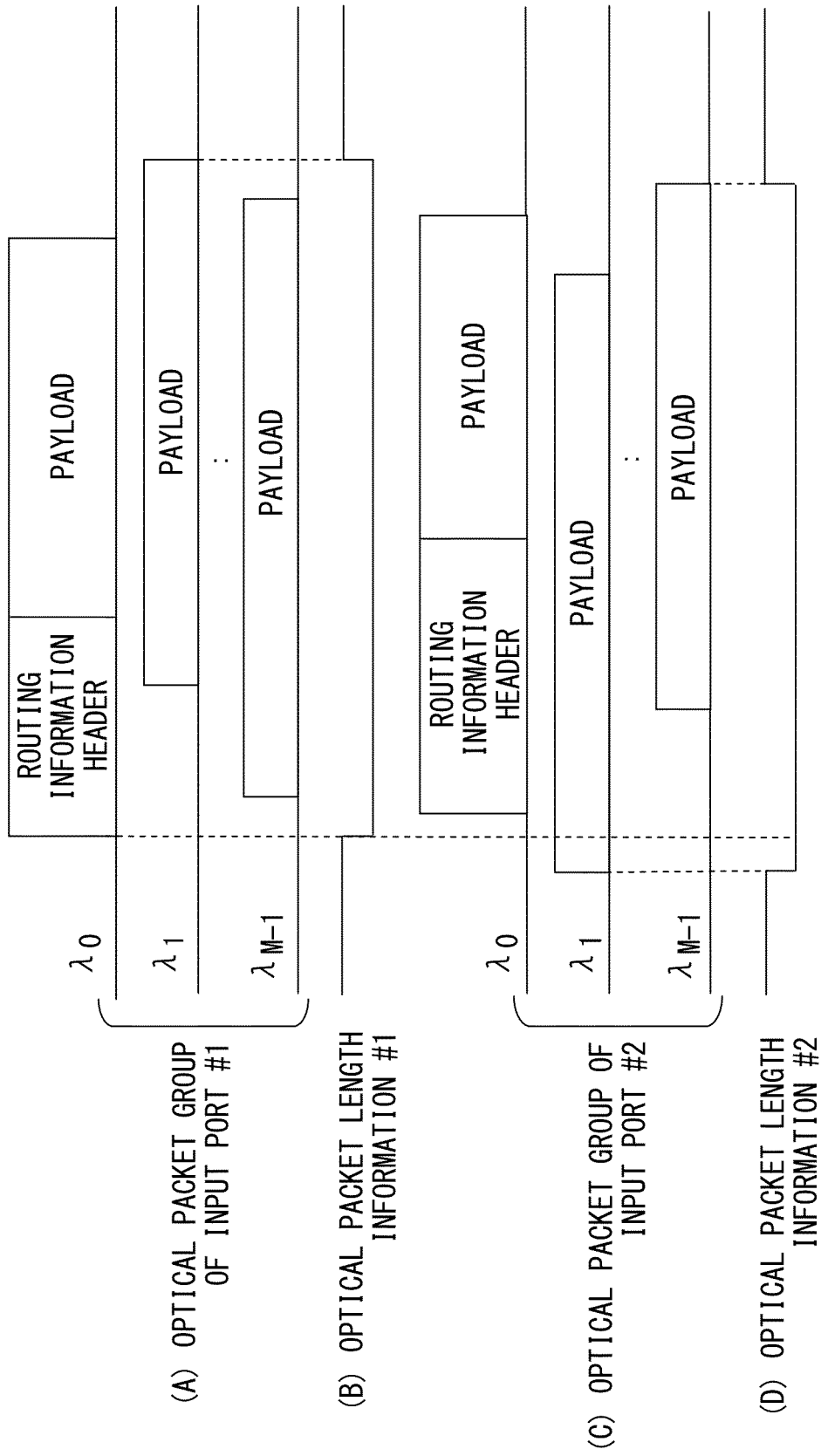
FIG. 27 explains an earlier-arrival determination process according to the present embodiment.

FIG. 27 explains an earlier-arrival determination according to the present embodiment. FIG. 27 corresponds to FIG. 12, which explained the problems of the earlier-arrival process performed by the typically conceivable configuration of the optical packet generator 201 illustrated in FIG. 2.

According to the present embodiment, also in the case of FIG. 27A, which corresponds to FIG. 12A, and in the case of FIG. 27C, which corresponds to FIG. 12B, it is possible to perform accurate earlier-arrival priority determination on the basis of pieces of optical packet length information #1 and #2 including variations between wavelengths as illustrated in FIG. 27B and FIG. 27D.

Figure 28:
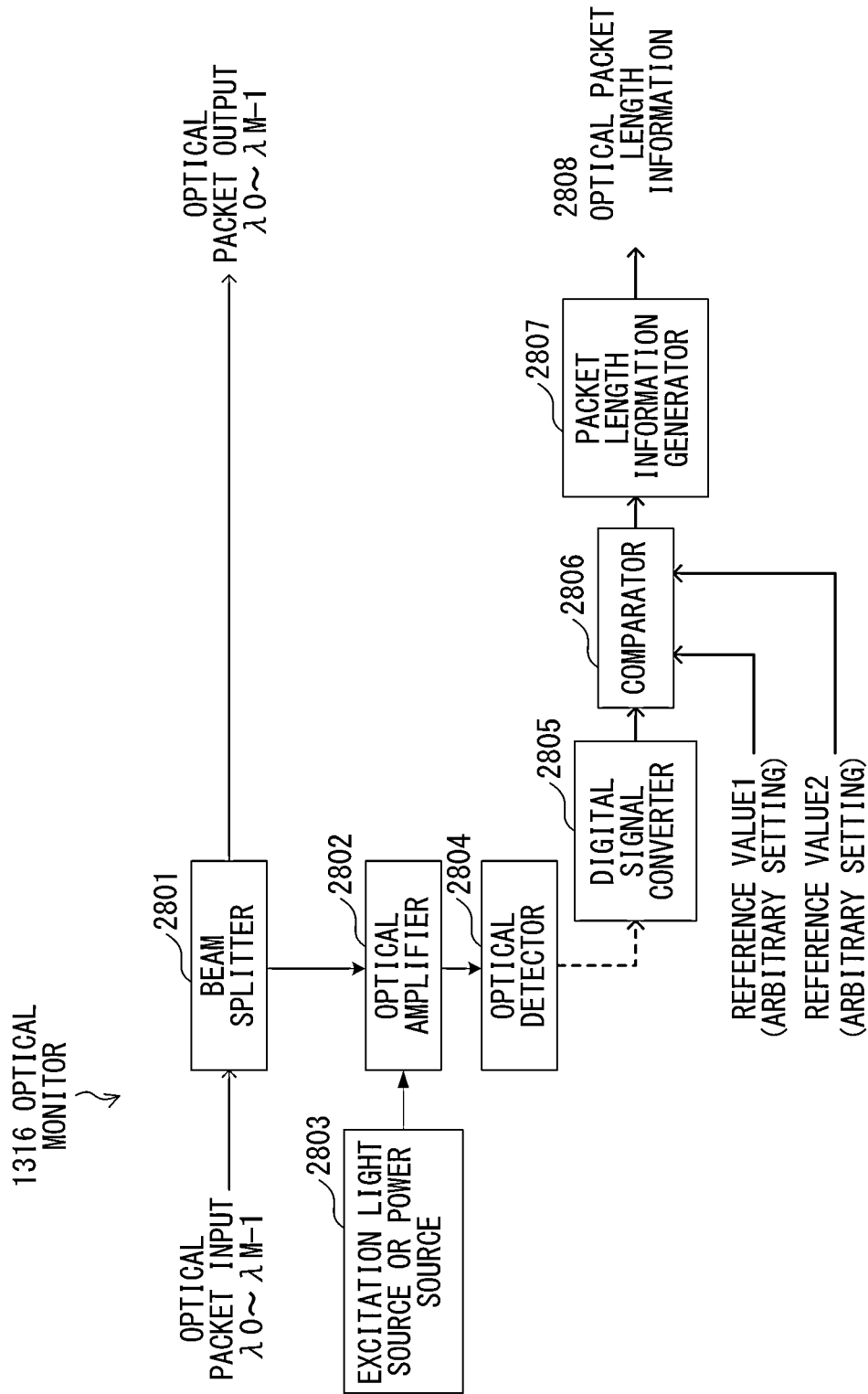
FIG. 28 illustrates a configuration example of an optical monitor 1316 illustrated in FIG. 13 according to the present embodiment.

FIG. 28 illustrates a configuration example of the optical monitor 1316 illustrated in FIG. 13.

First, a beam splitter 2801 splits a beam of an optical packet input including wavelengths $\lambda_0, \lambda_1, \ldots, \lambda_{M-1}$ in a wavelength division multiplexed state from the delay fibers 1306 illustrated in FIG. 13, and inputs the results to an optical amplifier 2802.

The optical packet output including respective wavelengths $\lambda_0, \lambda_1, \ldots, \lambda_{M-1}$ in a wavelength division multiplexed state as one of the results of the splitting in the beam splitter 2801 is a signal on the main signal line directed to the N×N optical switch 1303 illustrated in FIG. 13.

The optical amplifier 2802 is a semiconductor optical amplifier such as an SOA or an optical amplifier such as an Erbium Doped Fiber Amplifier (EDFA), which has a configuration in which erbium ion has been doped to the core portion of an optical fiber. The optical amplifier 2802 operates on an excitation light source or a power source 2803.

An optical detector 2804 is a device such as a photo diode (PD) that can detect variations in optical power levels on the basis of optical/electric conversion. An optical detector 2804 detects the optical intensity of a beam of an optical packet input in a state where respective wavelengths $\lambda_0, \lambda_1, \ldots, \lambda_{M-1}$ have received wavelength division multiplexing. Because input optical power levels are expected to be low, it is desirable to use a highly sensitive device as the optical detector 2804.

A digital signal converter 2805 converts an optical intensity output from the optical detector 2804 into a digital signal.

A comparator 2806 compares an output from the digital signal converter 2805 with reference value1 (first threshold) and reference value2 (second threshold) so as to detect overshooting and undershooting of an optical surge, as described later.

A packet length information generator 2807 detects optical packet length information 2808 on the basis of output from the comparator 2806.

The optical monitors 1316 having the above configuration are arranged in respective input ports of #0, #1, ..., #N−1 as illustrated in FIG. 13. As a result of this, the optical packet length information 2808, illustrated in FIG. 28, output from the optical monitors 1316, is input to the delay processor 2009 illustrated in FIG. 20 as pieces of optical packet length information $P_0, P_1, \ldots, P_{N-1}$.

Figure 29:
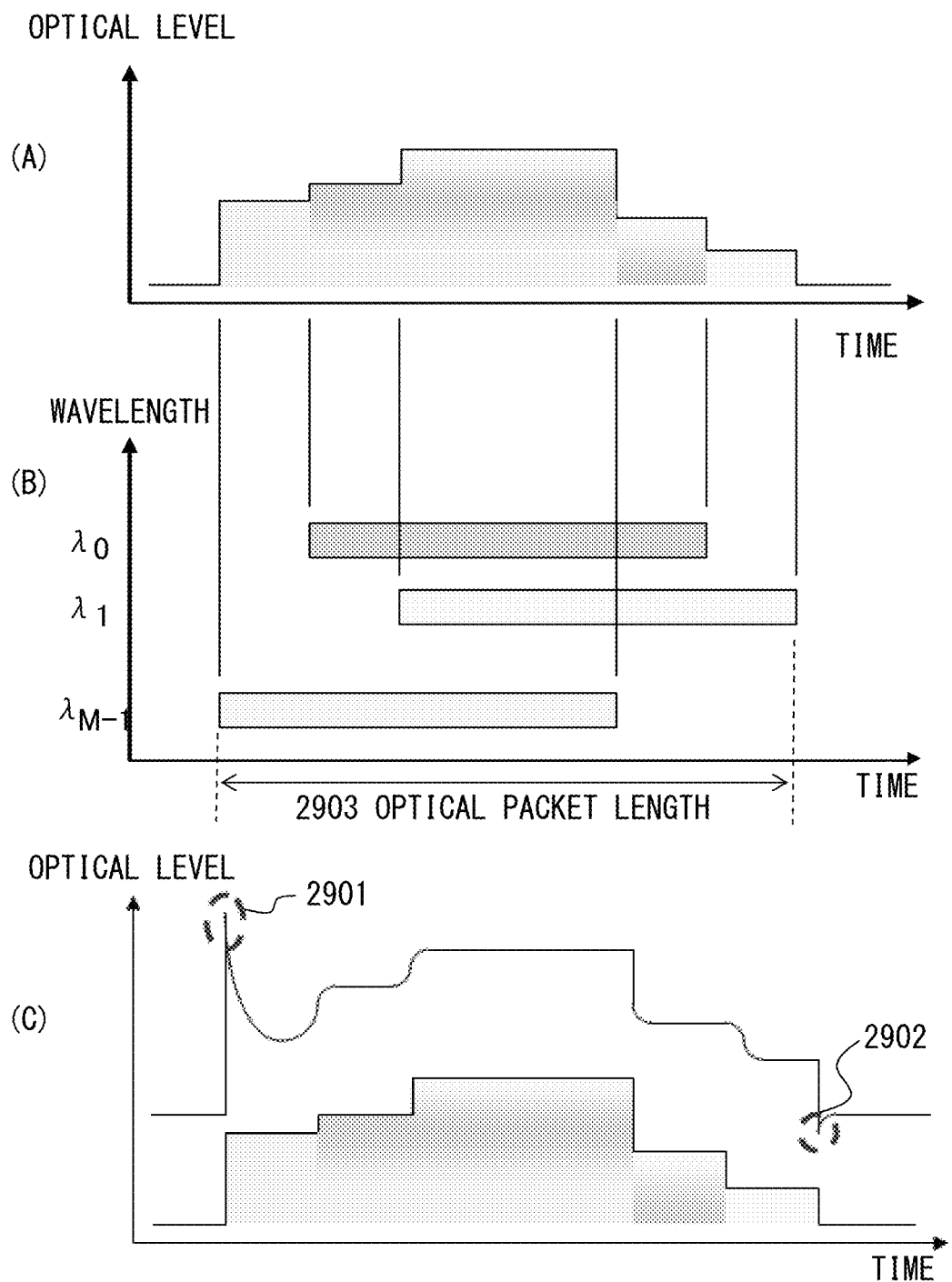
FIG. 29 explains operations of the optical monitor 1316 having the configuration illustrated in FIG. 28.

FIG. 29 explains operations of the optical monitor 1316 having the configuration illustrated in FIG. 28.

It is known as a general rule that when an optical signal that received wavelength multiplexing is propagated through an optical fiber, a characteristic named wavelength dispersion causes differences in propagation speeds between wavelengths.

Also, variation in transmission timing between wavelengths and variation in the length of optical fibers in devices cause temporal differences in optical signals.

When each wavelength has a different optical power level and there is a difference between timings of inputting to the optical detector 2804, the monitor detection value changes in a stepwise manner as illustrated as (A) in FIG. 29.

However, the variation amount of an optical power level value detected by the optical detector 2804 when an optical packet signal is input during a period when there are no optical packet signals is expected to be equal to or greater than a prescribed value (equal to or greater than a power level difference based on the extinction ratio).

However, when an input optical power level is equal to or lower than −20 dBm/channel (the optical power level per wavelength is 0.01 mw) at its peak, it is difficult to extract the difference from a condition where there are no signals.

Regarding an output from the optical amplifier 2802, it is known that an optical surge as denoted by 2901 in (C) of FIG. 29 (overshoot) or an optical surge as denoted by 2902 in (C) FIG. 29 (undershoot) occur at the moment of a sudden change in an optical power level.

From the optical detector 2804 that received an output light from the optical amplifier 2802, voltage (or current) is output. This voltage (or current) is converted by the digital signal converter 2805 into a digital signal, and the digital signal is compared by the comparator 2806 with reference value1, which can be set arbitrarily and externally, so that the occurrence of an optical surge (overshoot etc.) 2901 is detected. Also, by comparing the digital signal with reference value2, which can also be set arbitrarily and externally, an optical surge (undershoot) 2902 is detected. Thereby, wavelengths $\lambda_0, \lambda_1, \ldots, \lambda_{M-1}$ receive wavelength division multiplexing, making it possible to measure the entire length of an optical packet signal with respective wavelengths $\lambda_0, \lambda_1, \ldots, \lambda_{M-1}$ in a wavelength division multiplexed state as illustrated as (B) in FIG. 29 even when the input optical level of an optical packet has become stepwise as illustrated as (A) in FIG. 29.

As described above, the optical switch controller 1302 illustrated in FIG. 13 generates the switch ON/OFF signal 1311 for the N×N optical switch 1303 on the basis of pieces of optical packet length information $P_0, P_1, \ldots, P_{N-1}$ measured by the optical monitor 1316. This makes it possible to measure the maximum length (time) including time variation between wavelengths, and the ON time of the switch ON/OFF signal 1311 needed to turn on the N×N optical switch 1303 is "optical packet length L+maximum variation time T between wavelengths". According to conventional techniques, as explained in FIG. 6 through FIG. 8, the ON time of "optical packet length L+variation time S of one cycle of local clock+ (maximum variation time T between wavelengths)×2" has been preferable. Accordingly, in the present embodiment, it is possible to reduce the ON time of the switch ON/OFF signal 1311 by the time of (S+T), compared with the conventional techniques.

Figure 30:
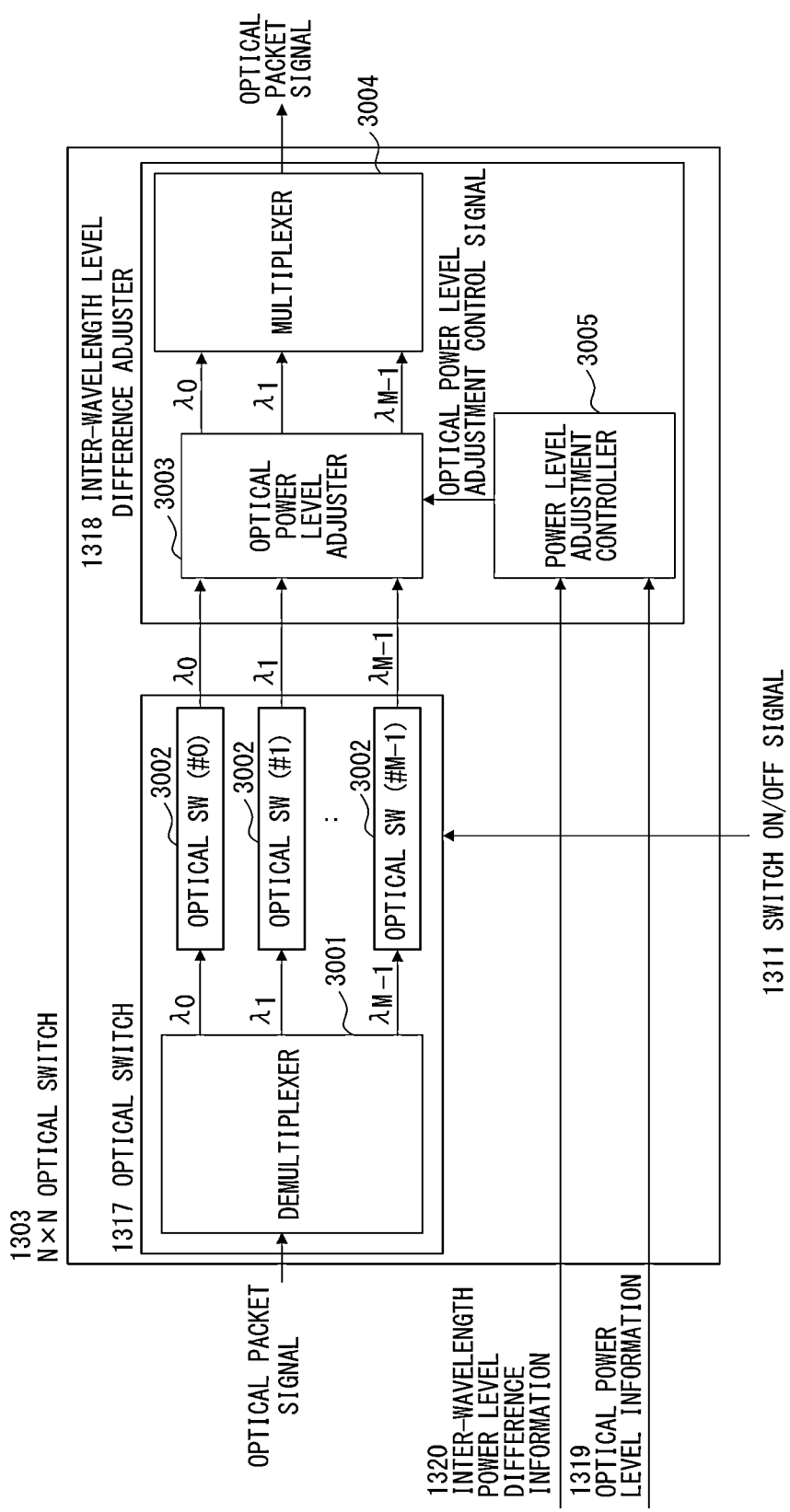
FIG. 30 illustrates a configuration example of an N×N optical switch 1303 illustrated in FIG. 13 according to the present embodiment.

FIG. 30 illustrates a configuration example of the N×N optical switch 1303 illustrated in FIG. 13.

The optical switch 1317 includes a demultiplexer 3001 and optical switching elements ("optical SW" in FIG. 30) 3002 for wavelengths #0, #1, ..., #M−1.

The demultiplexer 3001 separates, for each wavelength, optical signals of wavelengths $\lambda_0, \lambda_1, \ldots, \lambda_{M-1}$ in an optical packet signal input from the delay fibers 1306 illustrated in FIG. 13. As a demultiplexing method, there is a method that uses an AWG, a method in which an arbitrary wavelength is only extracted by using a variable wavelength filter from a beam that has been branched by an optical coupler into M beams, a method that uses a Wavelength Select Switch (WSS), and others.

The respective optical switching elements 3002 of #0, #1, ..., #M−1 connect optical signals of respective wavelengths $\lambda_0, \lambda_1, \ldots, \lambda_{M-1}$ output from the demultiplexer 3001, to the WDM output lines 1313 or the WDM output line 1315 specified by the switch ON/OFF signal 1311. The switch ON time is then also specified by the switch ON/OFF signal 1311. As the optical switching elements 3002 for this example, semiconductor elements that can perform high-speed response are used so that turning on and off can also be performed for high-speed signals equal to or higher than 10 Gbps (gigabits/second). For example, a semiconductor optical amplifier such as an SOA, a semiconductor resonator such as a Laser Diode (LD), etc., can be employed.

The inter-wavelength level difference adjuster 1318 includes an optical power level adjuster 3003, a multiplexer 3004, and a power level adjustment controller 3005.

The optical power level adjuster 3003 restores the optical power level at the time of transmission on the basis of the optical power level of each wavelength by adjusting the optical power level of each optical signal of respective wavelengths $\lambda_0, \lambda_1, \ldots, \lambda_{M-1}$ output from the optical switch 1317 to the WDM output lines 1313 or the WDM output line 1315. As an example of a method of adjusting power levels, a method that uses a VOA and an optical amplifier in combination can be used.

The multiplexer 3004 multiplexes optical signals of wavelengths $\lambda_0, \lambda_1, \ldots, \lambda_{M-1}$ output from the optical power level adjuster 3003, and outputs the resultant signal to the WDM output lines 1313 or the WDM output line 1315 as a WDM optical signal. As examples of a multiplexing method, there is a method that uses AWG, a method in which an optical coupler is used for multiplexing, a method that uses a WSS, and others.

The power level adjustment controller 3005 receives information of an optical power level (optical power level information 1319 or inter-wavelength power level difference information 1320), measured by the optical level measurement unit 1308 in FIG. 13, of each of wavelengths $\lambda_0, \lambda_1, \ldots, \lambda_{M-1}$ in a WDM optical signal on the WDM input line 1312 or 1314. On the basis of these pieces of information, the power level adjustment controller 3005 makes the optical power level adjuster 3003 restore the optical power level of optical signals of respective wavelengths at the time of the transmission of the WDM driving signal, on the basis of the optical power levels of optical signals of wavelengths $\lambda_0, \lambda_1, \ldots, \lambda_{M-1}$ output to the WDM output lines 1313 or the WDM output line 1315.

Figure 31:
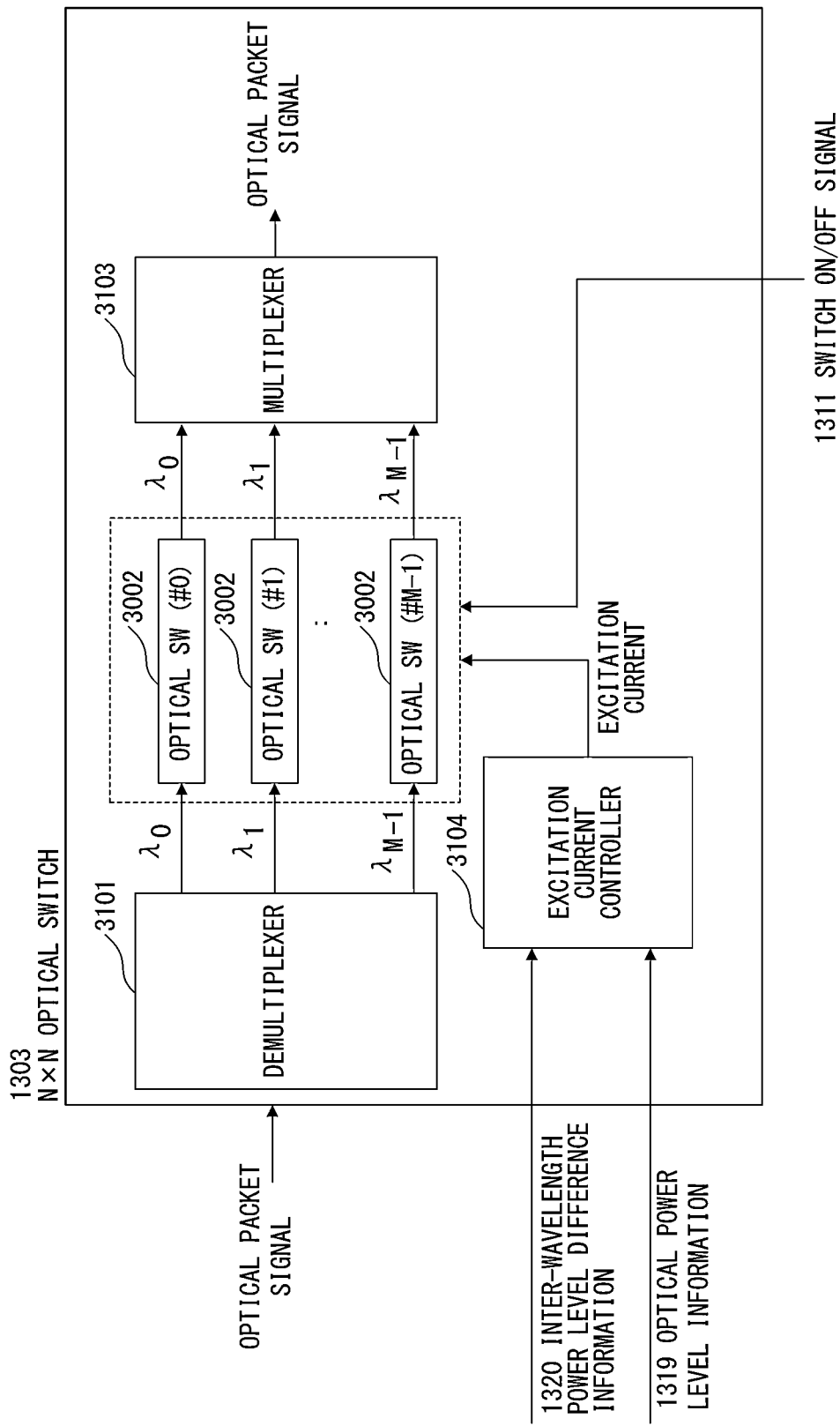
FIG. 31 illustrates another configuration example of the N×N optical switch 1303 illustrated in FIG. 13 according to the present embodiment.

FIG. 31 illustrates another configuration example of the N×N optical switch 1303 illustrated in FIG. 13.

The N×N optical switch 1303 includes a demultiplexer 3101, optical switch elements 3102 of #0, #1, ..., #M−1, a multiplexer 3103, and an excitation current controller 3104.

The demultiplexer 3101 separates, for each wavelength, optical signals of wavelengths $\lambda_0, \lambda_1, \ldots, \lambda_{M-1}$ in optical packet signals input from the delay fibers 1306 illustrated in FIG. 13. The same demultiplexing method as that in the case of the demultiplexer 3001 illustrated in FIG. 30 is used.

Optical switch elements 3102 of #0, #1, ..., #M−1 connect optical signals of wavelengths $\lambda_0, \lambda_1, \ldots, \lambda_{M-1}$ output from the demultiplexers 3101 to the WDM output lines 1313 or the WDM output line 1315 specified by the switch ON/OFF signal 1311. The present embodiment employs a configuration that uses a semiconductor optical amplifier such as an SOA as the optical switch element 3102 so that optical power levels can be controlled simultaneously with the performing of switching. Also, the optical switch elements 3102 are arranged for the wavelengths #0, #1, ..., #M−1, respectively, because power level control is needed to be performed for each wavelength.

The multiplexer 3103 multiplexes optical signals of wavelengths $\lambda_0, \lambda_1, \ldots, \lambda_{M-1}$ output from the respective optical switch elements 3102 of #0, #1, ..., #M−1, and outputs the resultant signal as a WDM optical signal to the WDM output lines 1313 or the WDM output line 1315. The same multiplexing method as that in the case of the multiplexer 3004 illustrated in FIG. 30 is used.

The excitation current controller 3104 receives information (the optical power level information 1319 or the inter-wavelength power level difference information 1320) on the respective optical power levels, measured by the optical level measurement unit 1308 in FIG. 13, of respective wavelengths $\lambda_0, \lambda_1, \ldots, \lambda_{M-1}$ of a WDM optical signal on the WDM input line 1312 or the WDM input line 1314. On the basis of this information, the excitation current controller 3104 generates an excitation current for restoring the optical power levels of optical signals of wavelength at the time of the transmission of the WDM optical signal on the basis of the optical power levels of optical signals of respective wavelengths $\lambda_0, \lambda_1, \ldots, \lambda_{M-1}$ input to the optical switch elements 3102 of #0, #1, ..., #M−1. The excitation current controller 3104 supplies a thus-generated excitation current to the optical switch elements 3102.

According to the above aspects, the transmission delay in optical switching of optical signals is reduced and the transmission efficiency of optical signals is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device that receives a wavelength division multiplexed optical signal obtained by dividing an optical packet signal and performing wavelength multiplexing and that transmits via an optical switch the received wavelength division multiplexed optical signal, the optical transmission device comprising:
   an optical power level measurement unit configured to measure respective optical power levels of respective optical signals of wavelengths included in the wavelength division multiplexed optical signal; and
   a routing information determinator configured to determine routing information of the wavelength division multiplexed optical signal on the basis of the measured optical power levels.

2. The optical transmission device according to claim 1, wherein
   the routing information contains a bit string including transmission source node identification information and destination node identification information,
   the respective optical power levels of the respective optical signals are made to correspond to respective bits of the bit string, and
   control is performed in such a manner that values of the respective optical power levels correspond to values of the respective bits that correspond to the respective optical power levels.

3. The optical transmission device according to claim 1, wherein
   the routing information determinator determines the routing information of the wavelength division multiplexed optical signal in accordance with a difference between the measured optical power levels.

4. The optical transmission device according to claim 1, wherein
   the routing information contains a bit string including transmission source node identification information and destination node identification information, two optical power levels in a pair selected from among respective optical power levels of the respective optical signals are made to correspond to respective bits of the bit string, and control is performed in such a manner that difference values between the optical power levels in the respective pairs correspond to values that correspond to the respective bits corresponding to the respective pairs.

5. The optical transmission device according to claim 1, wherein the optical power level measurement unit includes:
- a demultiplexer configured to separate, for each wavelength, the optical signals included in the received wavelength division multiplexed optical signal;
- optical power level monitors configured to convert optical power levels of the separated optical signals into electric signals, respectively; and
- a computation unit configured to receive outputs from the respective optical power level monitors, and to compute optical power levels of respective optical signals.

6. The optical transmission device according to claim 1, wherein the optical switch includes an inter-wavelength level difference adjuster configured to restore each level at a time of transmission of the wavelength division multiplexed optical signal on the basis of information on respective optical power levels of the respective optical signals included in the received wavelength division multiplexed optical signal.

7. The optical transmission device according to claim 6, wherein the optical switch further includes:
- a demultiplexer configured to separate, for each wavelength, the optical signals included in the input wavelength division multiplexed optical signal; and
- respective optical switch elements respectively configured to output the respective optical signals output from the demultiplexer for the prescribed switch ON time in accordance with a switch control signal; and the inter-wavelength level difference adjuster includes:
- an optical power level adjuster configured to adjust respective optical power levels of the output respective optical signals;
- a power level adjustment controller configured to receive information on respective optical power levels, measured by the optical power level measurement unit, of the respective optical signals included in the received wavelength division multiplexed optical signal, and to control the optical power level adjuster so that the optical power level adjuster restores respective optical power levels of the respective optical signals at a time of transmission of the wavelength division multiplexed optical signal from the respective optical power levels of the output respective optical signals; and
- a multiplexer configured to multiplex the respective optical signals output from the optical power level adjuster, and to output a resultant signal as the wavelength division multiplexed optical signal.

8. The optical transmission device according to claim 1, wherein the optical switch includes:
- a demultiplexer configured to separate, for each wavelength, optical signals of the plurality of wavelengths included in the input wavelength division multiplexed optical signal;
- respective switch elements configured to connect respective optical signals of the plurality of wavelengths output from the demultiplexer to an output line corresponding to a switch ON/OFF signal that is controlled on the basis of the routing information, for a time during which the switch ON/OFF signal is in an ON state;
- an excitation current controller configured to receive information on respective output power levels of the respective optical signals included in the wavelength division multiplexed optical signal, to generate an excitation current that restores respective power levels of the respective optical signals at a time of transmission of the wavelength division multiplexed optical signal from respective optical power levels of the respective optical signals input to the respective optical switch elements, and to supply the excitation current to the respective optical switch elements; and
- a multiplexer configured to multiplex the respective optical signals output from the respective optical switch elements, and to output a resultant signal as the wavelength division multiplexed optical signal.

9. The optical transmission device according to claim 1, wherein the optical packet signal is an Ethernet packet, and the optical transmission device further comprises an optical packet generator configured to divide the Ethernet packet into the plurality of optical packets and output resultant packets as respective optical signals of the plurality of wavelengths, and to control respective optical power levels of the respective optical signals in accordance with routing information corresponding to the Ethernet packet and transmit the signals as the wavelength division multiplexed optical signal.

10. The optical transmission device according to claim 1, further comprising:
- a delay fiber configured to delay the received wavelength division multiplexed optical signal by a prescribed time;
- an optical monitor configured to measure an optical packet length of the wavelength division multiplexed optical signal in which optical signals of the plurality of wavelengths are kept in a multiplexed state, on the basis of a power level of the wavelength division multiplexed optical signal output from the delay fiber; and
- a switch control signal generator configured to generate the switch ON/OFF signal that is in an ON state during a time corresponding to the optical packet length measured by the optical monitor for the wavelength division multiplexed optical signal including routing information determined in accordance with the wavelength division multiplexed optical signal and that makes the optical switch connect an input line corresponding to the routing information to an output line corresponding to the routing information.

11. The optical transmission device according to claim 10, wherein the delay fiber generates a signal delay that corresponds to a time obtained by adding a maximum transmission variation time among optical signals of the plurality of wavelengths to a time to generate the switch ON/OFF signal.

12. The optical transmission device according to claim 10, further comprising:
- a switch reconciliator configured to select one of a plurality of pieces of routing information on the basis of a priority determination process and to make the switch control signal generator generate the switch ON/OFF signal corresponding to the selected routing information, when the plurality of pieces of routing information having one output line as a destination are determined at a same timing for the respective wavelength division multiplexed optical signals from the plurality of input lines.

13. The optical transmission device according to claim 10, wherein the optical monitor includes:
- a beam splitter configured to split a beam of the wavelength division multiplexed optical signal output from the delay fiber;
- an optical amplifier configured to amplify the beams of the wavelength division multiplexed optical signal obtained by splitting by the beam splitter;
- an optical detector configured to detect optical intensity of the beams of the wavelength division multiplexed optical signal amplified by the optical amplifier;
- a digital signal converter configured to convert an output from the optical detector into a digital signal;
- a comparator configured to compare an output of the digital signal converter with first and second thresholds so as to detect overshooting and undershooting of an optical surge; and
- a packet length information generator configured to detect information on the optical packet length on the basis of an output from the comparator.

14. An optical transmission method comprising:
receiving a wavelength division multiplexed optical signal obtained by dividing an optical packet signal;
measuring respective optical power levels of respective optical signals included in the wavelength division multiplexed optical signal;
determining routing information that corresponds to an optical signal transmitted by the wavelength division multiplexed optical signal on the basis of the measured optical power levels; and
transmitting the wavelength division multiplexed optical signal to a route corresponding to the routing information.

15. An optical transmission device that receives a wavelength division multiplexed optical signal and that transmits the received wavelength division multiplexed optical signal, the optical transmission device comprising:
a delay fiber configured to delay the received wavelength division multiplexed optical signal by a prescribed time;
an optical switch configured to transmit the wavelength division multiplexed optical signal output from the delay fiber by connecting an output from the delay fiber to an output line corresponding to a switch control signal for a time during which the switch control signal is in an ON state;
an optical monitor configured to measure an optical packet length of the wavelength division multiplexed optical signal in which optical signals of the plurality of wavelengths are kept in a multiplexed state, on the basis of a power level of the wavelength division multiplexed optical signal output from the delay fiber; and
a switch control signal generator configured to generate the switch ON/OFF signal that is in an ON state during a time corresponding to the optical packet length measured by the optical monitor for the wavelength division multiplexed optical signal including routing information determined in accordance with the wavelength division multiplexed optical signal and that makes the optical switch connect an input line corresponding to the routing information to an output line corresponding to the routing information.

16. The optical transmission device according to claim 15, wherein the delay fiber generates a signal delay that corresponds to a time obtained by adding a maximum transmission variation time among optical signals of the plurality of wavelengths to a time to generate the switch ON/OFF signal.

17. The optical transmission device according to claim 15, further comprising:
a switch reconciliator configured to select one of a plurality of pieces of routing information on the basis of a priority determination process and to make the switch control signal generator generate the switch ON/OFF signal corresponding to the selected routing information, when the plurality of pieces of routing information having one output line as a destination are determined at a same timing for the respective wavelength division multiplexed optical signals from the plurality of input lines.

18. The optical transmission device according to claim 15, wherein the optical monitor includes:
- a beam splitter configured to split a beam of the wavelength division multiplexed optical signal output from the delay fiber;
- an optical amplifier configured to amplify the beams of the wavelength division multiplexed optical signal obtained by splitting by the beam splitter;
- an optical detector configured to detect optical intensity of beams of the wavelength division multiplexed optical signal amplified by the optical amplifier;
- a digital signal converter configured to convert an output from the optical detector into a digital signal;
- a comparator configured to compare an output of the digital signal converter with first and second thresholds so as to detect overshooting and undershooting of an optical surge; and
- a packet length information generator configured to detect information on the optical packet length on the basis of an output from the comparator.

* * * * *